United States Patent [19]
Raymond et al.

[11] 4,254,462
[45] Mar. 3, 1981

[54] HARDWARE/FIRMWARE COMMUNICATION LINE ADAPTER

[75] Inventors: James C. Raymond, Framingham; Richard A. Lemay, Bolton, both of Mass.; Richard P. Kelly, Nashua, N.H.

[73] Assignee: Honeywell Information Systems Inc., Waltham, Mass.

[21] Appl. No.: 911,635

[22] Filed: Jun. 1, 1978

[51] Int. Cl.³ .............................................. G06F 3/00
[52] U.S. Cl. .................................................... 364/200
[58] Field of Search ... 364/200 MS File, 900 MS File; 364/200, 900

[56] References Cited

U.S. PATENT DOCUMENTS

| | | | |
|---|---|---|---|
| 3,833,888 | 9/1974 | Stafford et al. | 364/200 |
| 3,842,405 | 10/1974 | Key et al. | 364/200 |
| 3,967,250 | 6/1976 | Senda et al. | 364/200 |

Primary Examiner—Raulfe B. Zache
Attorney, Agent, or Firm—Gerald E. Lester; Nicholas Prasinos; Ronald T. Reiling

[57] ABSTRACT

A hardware/firmware control system is disclosed for accommodating the concurrent bi-directional transfer of information between a communications channel such as a telephone line and a communications processor in a data processing system.

4 Claims, 10 Drawing Figures

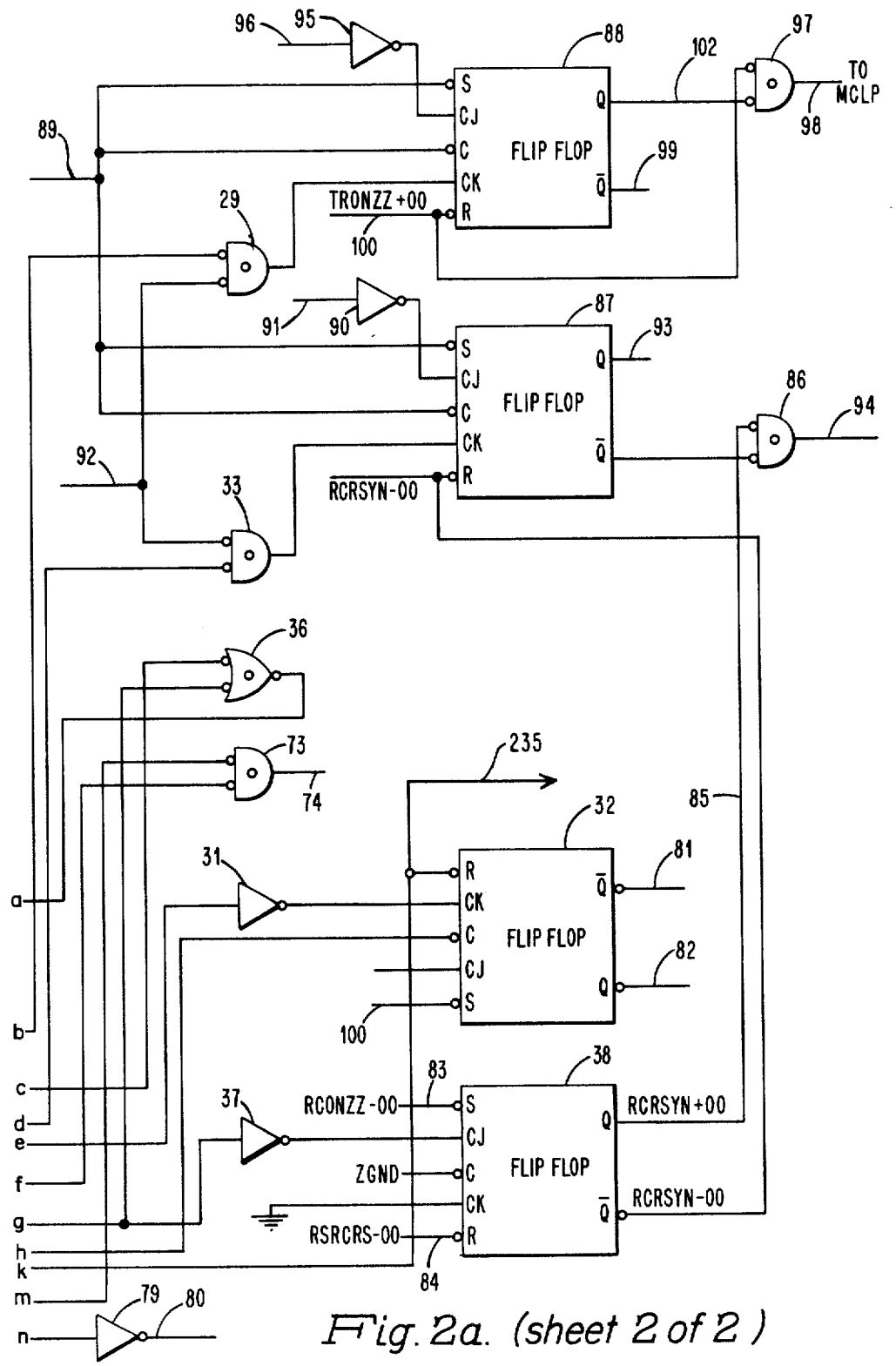
Fig.2a. (sheet 2 of 2)

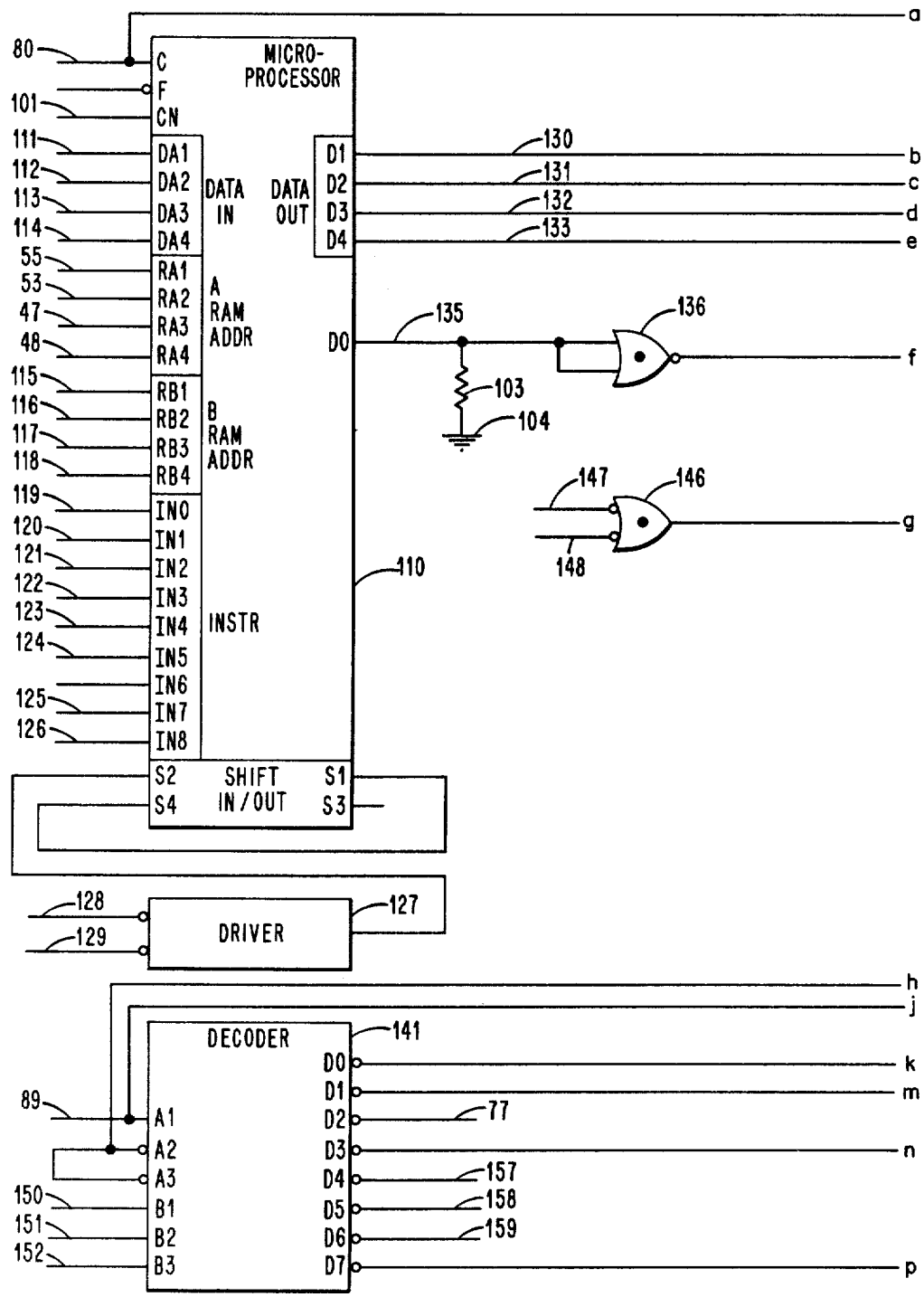
Fig. 2b. (sheet 1 of 2)

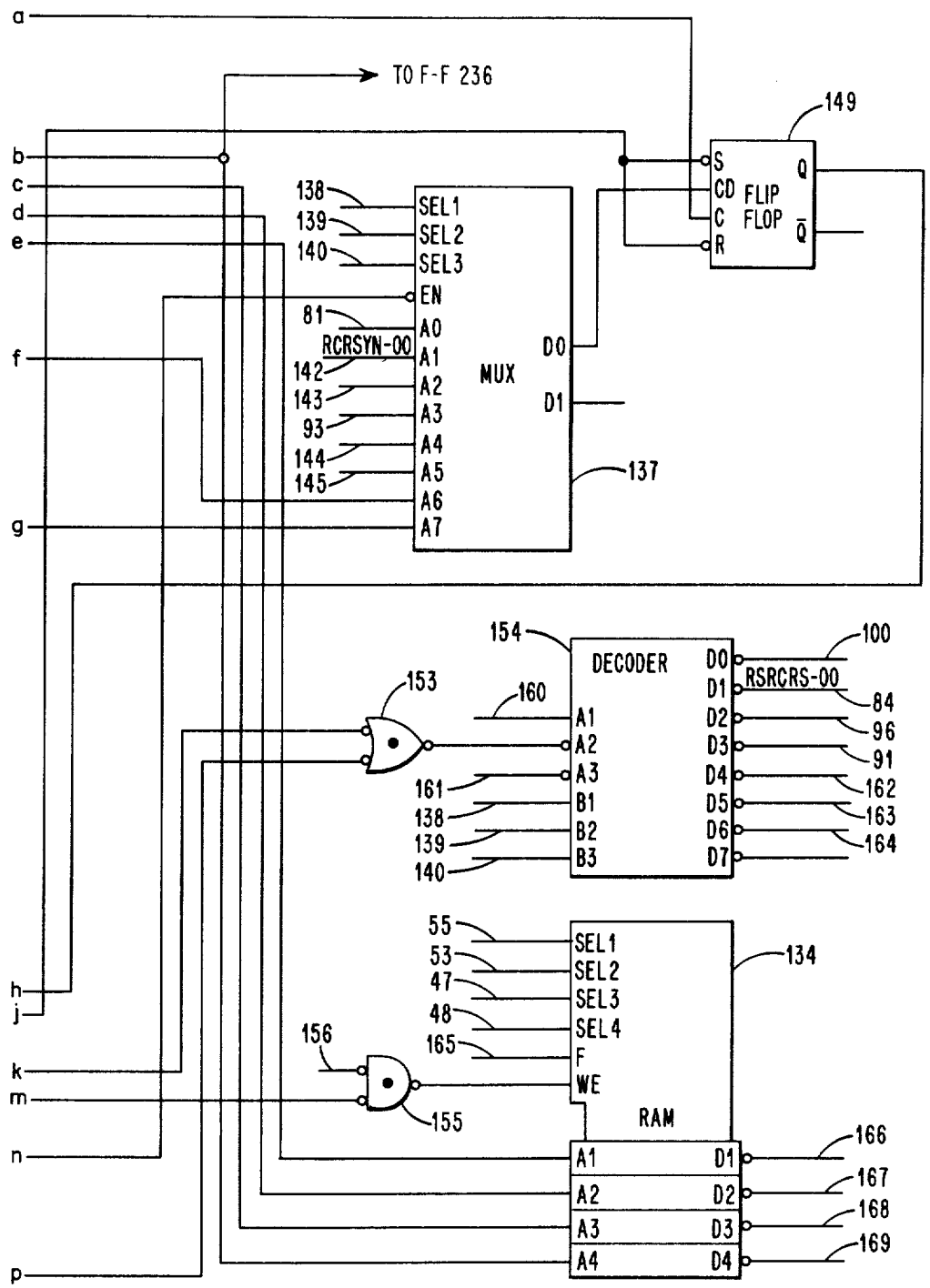
Fig. 2b. (sheet 2 of 2)

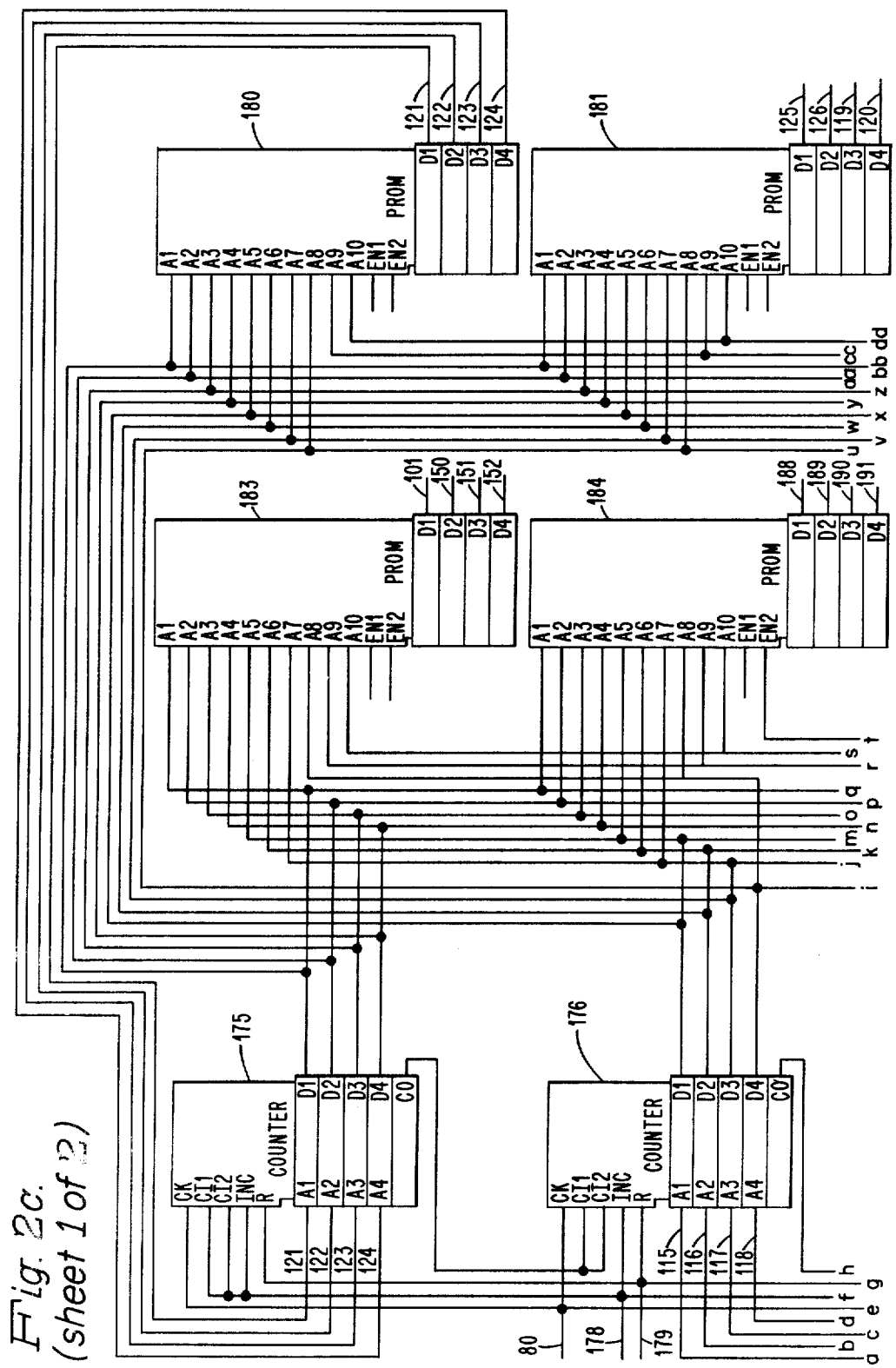
Fig. 2c. (sheet 1 of 2)

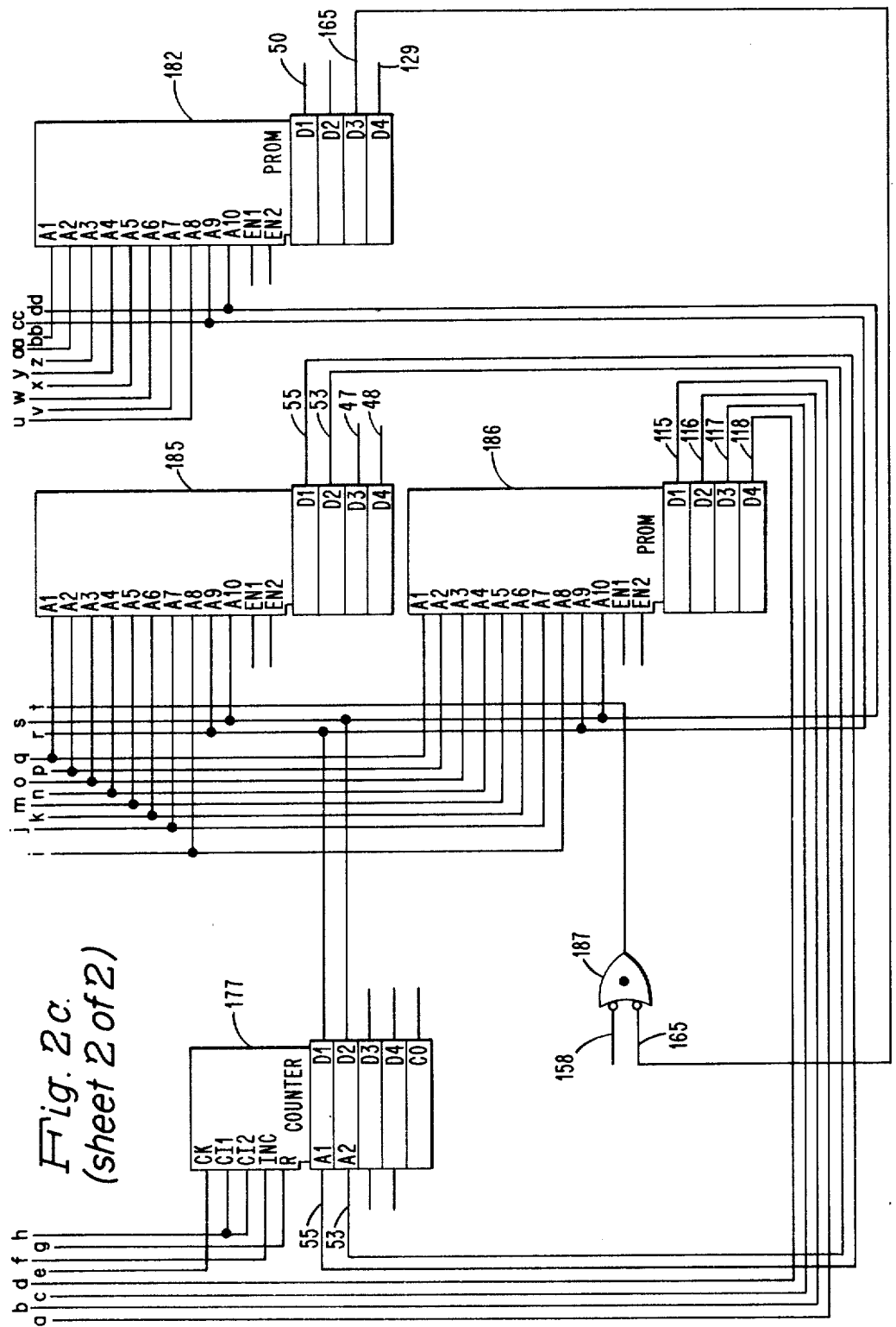
Fig. 2c. (sheet 2 of 2)

HARDWARE/FIRMWARE COMMUNICATION LINE ADAPTER

FIELD OF THE INVENTION

The invention relates to information channel controllers in a computer system, but more directly to communication line adapters for electrically interfacing with a data processing system.

PRIOR ART

Hardware adapters have been used in the communications field to accommodate the transfer of information between a communication transmission line and a data processing system. Changes in communication protocol have placed great demands on the adapters. Such demands have been met by increasing the amount of hardware, thereby increasing manufacturing costs and physical size.

The essence of communication is a concurrent bidirectional transfer of information. Hardware adapters have required two separate systems, one for receive operations and one for transmit operations. It also is recognized that messages may be varying lengths and be comprised of data bytes of varying bit sizes. Hardware has provided a highly limited flexibility at high costs and space sacrifice. The potential for cost effective expansion of hardware functionality is low.

The problems associated with hardware communication adapters have been overcome partially by the advent of communication controllers comprised of hardware and some form of firmware control system. While the duplication of entire systems to accommodate both transmit and receive operations has been obviated, the amount of hardware used is still significant because of an inefficient marriage of firmware and hardware functionalities.

The ineffective marriage of hardware and firmware functionalities also has resulted in a less than achievable capacity for expansion and modification. In addition, information transfer rates have been compromised to an unacceptable degree because of the firmware overhead demands in handling the control and status transfers accompanying a data message. Such overhead demands have been increased by a bit or byte sensitive rather than a message sensitive control architecture.

Unwanted or invalid data messages thus contribute to the overhead requirement to the same degree as valid messages. A further problem encountered with prior systems is the loss of data at the end of a message frame. If a partial data byte is resident in the system at the end of a message frame the system operation terminates when the communication line clock is terminated. The data thereby is lost.

The present invention provides a communication line adapter having a hardware/firmware architecture which exhibits a substantially improved potential for functionality expansion and flexibility. Neither the manufacturing costs nor size obstacles of prior systems are incurred. In addition, the concurrent bidirectional transfer of data messages having varying lengths and byte sizes is accommodated with a reduced firmware overhead. Transfer rates are not substantially affected.

SUMMARY OF THE INVENTION

The invention is directed to a hardware/firmware communication line control system for accommodating the concurrent bi-directional transfer of data messages of varying lengths. The system architecture readily accommodates an expansion of capacity and exhibits a dynamic flexibility.

More particularly, in response to commands from a communications processor, the control system enters into either a receive mode or a transmit mode for transferring data messages between the communications processor and a communication channel. Data transfers occur under the control of a firmware control system acting in concert with a microprocessor to assemble and disassemble whole or partial data bytes of varying bit sizes. Those systems which use general purpose microprocessors also limit a system's capacity to that of the microprocessor. Only data bytes having the microprocessor byte size or less may be accommodated.

The firmware control system and microprocessor further interact to modify the firmware microinstruction set in response to changing conditions, thereby enhancing system flexibility.

Bit sequences in the data flow are sensed to detect the occurrence of data message frames and end-of-frame conditions. Valid data is distinguished from invalid data, and the data flow is resynchronized to the beginning of a frame in the event a data message is invalid or otherwise unwanted.

In the event that partial data bytes are present in the communication line control system when an end of message frame is detected, the data transfer continues without benefit of communication line transmit or receive clock signals.

The architecture of the system readily accommodates the modular expansion of system capacity by the mere combination of microprocessor chips.

DESCRIPTION OF THE DRAWINGS

For a more complete understanding of the present invention and for further objects and advantages thereof, reference may now be had to the following description taken in conjunction with the accompanying drawings in which:

FIGS. 2a-2e are detailed electrical schematics of the invention.

FIG. 1

FIG. 1 illustrates in functional block diagram form a computer system having a multiline communications processor (MLCP) 10 in electrical communication with a central processor unit 11 and a main memory unit 12 by way of a common communication bus hereinafter referred to as megabus 13.

The megabus 13 provides an information path between any two units in the system. The paths are asynchronous in design, thereby enabling units of various speeds to operate efficiently. The bus accommodates information transfers including communication requests, control commands, status signals and data transfers between main memory unit 12 and MLCP 10.

Figure 1:
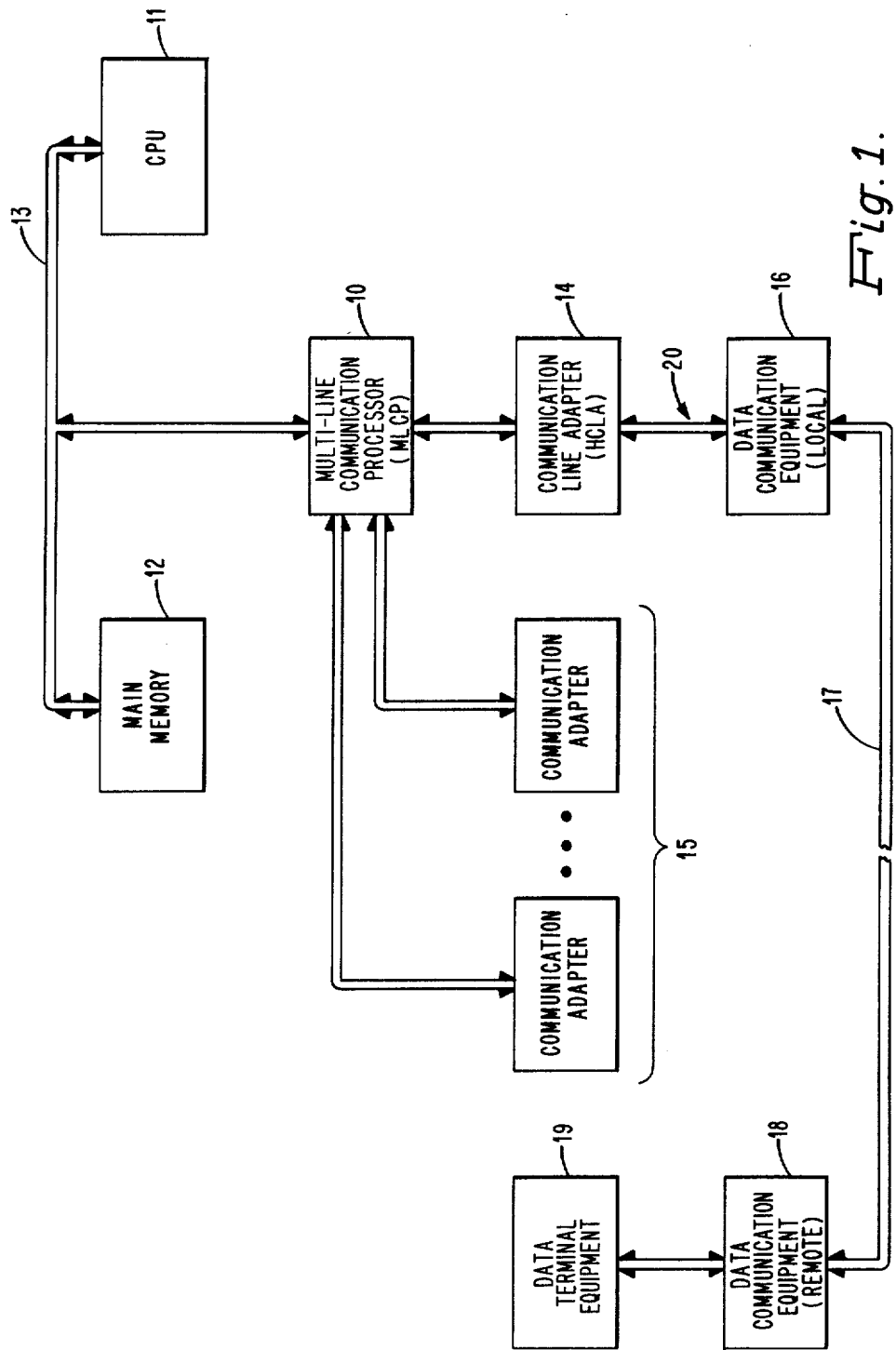
FIG. 1 is a functional block diagram of a system within which the invention may operate.

Any system unit requiring communication with any other system unit issues a bus cycle request. When the bus cycle is granted, the requesting unit becomes the master and the addressed system unit becomes the slave. Some bus interchanges require a response cycle as well as a request cycle. By way of example, the master unit may identify itself to a slave unit and indicate that a response is required. When the required information becomes available, the slave assumes the role of master and initiates a transfer to the requesting unit. A more detailed background description of the megabus system of FIG. 1 is given in U.S. Pat. No. 3,993,981 which is assigned to the assignee of the present invention, and which is incorporated by reference herein.

In the servicing of bus cycle requests, the central processor has the lowest priority, the MLCP 10 has the next to the lowest priority, and the memory unit 12 has the highest priority.

The MLCP 10 further communicates with a high level data link control communications line adapter (HCLA) 14 and other communication adapters 15. The HCLA in turn may be directly connected to data processing equipment such as a CPU, or to any type of data terminal equipment (DTE). In a remote connect mode, the HCLA may be connected by way of a local data communications equipment unit (DCE) 16 and a communications cable 17 to a remote DCE 18. The remote DCE 18 in turn may be connected to a remote DTE 19. The DCEs have a capacity to both modulate and demodulate binary information streams, and thus may either receive or transmit information.

The HCLA 14 in which the present invention is embodied may be used to interface with communications lines such as a line 20 operating at synchronous rates up to 20,000 bits per second. The HCLA may be made compatible with any DCE interface type conforming to the well known EIARS-232C, MIL 188-C or RSXYZ standards merely by changing DCE line driver/receiver circuitry. The preferred embodiment of the invention as described herein is compatible with the EIARS-232C interface standard.

FIGS. 2a-2e

FIGS. 2a-2e illustrate in electrical schematic form the HCLA 14 of FIG. 1.

In referring to the electrical schematics illustrated in the Figures, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

The MLCP 10 supplies a first address signal to a control line 20 leading to the B3 input of an MLCP command decoder 21, a second address signal to a control line 22 leading to the A1 input of the decoder 21, and a third address signal 23 leading to the A3 input of the decoder. The MLCP 10 also supplies a control signal on a control line 24 leading to the B1 input of the decoder, and a second control signal on a control line 25 leading to the B2 input of the decoder. The A2 input to the decoder is connected to ground.

The decoder 21 decodes the logical AND of inputs A1-A3, and the B1-B3 inputs to provide control signals for the operation of the logic system of FIGS. 2a-2d to control the interface between the MLCP 10 and HCLA 14. The decoder 21 is of a 74LS138 type manufactured and sold by Texas Instruments Incorporated of Dallas, Texas.

The D0 output of the decoder is connected to the L2 input of a 4×4 bit tri-state RAM (random access memory) 26. The D1 output of the decoder is connected to one input of an AND gate 27. The D2 output of the decoder is connected to one input of an AND gate 28 and to one input of a NAND gate 29. The D3 output of the decoder 21 is connected to the L1 load input of RAM 26 and to the L1 input of a 4×4 bit tri-state RAM 30. The D3 output also is applied through an inverter 31 to the K input of a J-K flip-flop 32.

The D4 output of decoder 21 is applied to the L2 input of RAM 30, and the D5 output of the decoder is applied to a second input of gate 27. The D6 output of decoder 21 is applied to a second input of gate 28 and to one input of a NAND gate 33. The D7 output of decoder 21 is applied to the SEL 1 select input of a 4×4 bit tri-state RAM 34, and to the output enable input (F) of the RAM 34. The D7 output of decoder 21 further is connected to the SEL 1 input of a 4×4 bit tri-state RAM 35, to one input of an AND gate 36, and through an inverter 37 to the J input of J-K flip-flop 38. The RAMs 26, 30, 34 and 35 are of the TI74LS670 type RAMs manufactured and sold by the Texas Instruments Corporation of Dallas, Texas.

The MLCP 10 further supplies an eight bit byte of data to the RAMs 26 and 30. More particularly, bits 0-3 of the data byte are applied to the A1-A4 inputs of RAM 26, respectively, and bits 4-7 of the data byte are applied to the A1-A4 inputs of RAM 30. The D1 output of RAM 26 is applied to a data line 39, the D2 output to a data line 40, the D3 output to a data line 41 and the D4 output to a data line 42. The D1 output of RAM 30 is applied to a data line 43, the D2 output to a data line 44, the D3 output to a data line 45 and the D4 output to a data line 46.

The control store memory of the HCLA 14, which is to be further described, supplies a binary encoded two-bit word to control lines 47 and 48 respectively leading to the SEL 1 and SEL 2 inputs of RAMs 26 and 30. The control line 48 also is connected to the L2 inputs of RAMs 34 and 35. The control store memory further supplies output enable signals to a control line 49 leading to the F input of RAM 26, and to a control line 50 leading to the F input of RAM 30. The clock inputs to RAMs 26 and 30 are supplied by way of a control line 51 leading to the output of an inverter 52. The control store memory also supplies a load signal to a control line 53 leading to the L1 input of RAM 34, and a load signal to a control line 55 leading to the L1 input of RAM 35.

The clock input to RAM 34 is connected to the clock input of RAM 35 and to the output of an OR gate 56. The SEL 2 input to RAM 34 is connected to the SEL 2 input to RAM 35 and to the output of gate 28. The A1-A4 inputs to RAMs 34 and 35 are connected to data lines 57-60, respectively. The D1-D4 outputs of RAM 34 are applied to data lines 61-64, respectively. The D1-D4 outputs of RAM 35 are applied to the date lines 65-68, respectively. The F input to RAM 35 is connected to the outut of gate 36.

The MLCP 10 supplies a master clear signal to a control line 69, and through an inverter 60 to the reset input of flip-flop 32. A strobe signal supplied by the MLCP 10 is applied by way of a control line 71 through an inverter 72 to the clock input of flip-flop 32. The output of inverter 72 further is applied through inverter 52 to one input of a NAND gate 73, a second input of which is connected to the output of gate 27. The output of gate 73 is applied to a control line 74.

The MLCP 10 also supplies a system clock having a clock rate of the order of 4.0 MHz on control line 75, and through an inverter 76 to one input of gate 56. A second input to gate 56 is connected to a control line 77. The output of inverter 76 also is applied through an inverter 78 and an inverter 79 to a control line 80.

The K input to flip-flop 32 is connected to the output of inverter 31, and the J input to the flip-flop is connected to ground. The set input to the flip-flop is connected to a control line 100. The Q output of the flip-flop 32 is connected to a control line 82, and the $\bar{Q}$ output of the flip-flop is connected to a control line 81. The set input to flip-flop 38 is connected to a control line 83, and the J input to the flip-flop is connected to the output of inverter 37. The clock and K inputs to the flip-flop 38 are connected to ground, and the reset input is connected to a control line 84. The Q output of flip-flop 38 is applied to a control line 85 leading to one input of an OR gate 86, and the $\bar{Q}$ output of the flip-flop is connected to the reset input of a J-K flip-flop 87.

The set and clock inputs to flip-flop 87 are connected to the set and clock inputs of a J-K flip-flop 88, and to a control line 89. The J input to flip-flop 87 is connected to the output of an inverter 90, the input of which is connected to a control line 91. The K input to flip-flop 87 is connected to the output of gate 33, a second input of which is connected to a second input of gate 29 and to a control line 92. The Q output of flip-flop 87 is applied to a control line 93, and the $\bar{Q}$ output of the flip-flop is applied to a second input of gate 86. The output of gate 86 is connected to a control line 94.

The J input to flip-flop 88 is connected to the output of an inverter 95, the input of which is connected to a control line 96. The K input to the flip-flop is connected to the output of gate 29, and the reset input to the flip-flop is connected by way of a control line 102 to one input of a NAND gate 97, the output of which is applied to a control line 98. The Q output of flip-flop 88 is applied to the second input of gate 97, and the $\bar{Q}$ output of the flip-flop is applied to a control line 99. The reset input to flip-flop 88 also is connected to a control line 100.

Referring to FIG. 2b, a microprocessor 110 having a four-bit data input, two four-bit RAM addres inputs and a nine-bit instruction input is illustrated, The carry-in (CN) input to the microprocessor is connected to control line 101. The data inputs DA1-DA4 are connected respectively to data lines 111-114. The RAM A address input RA1 is connected to line 55, and the RA2 input is connected to line 53. The RA3 input is connected to line 47, and the RA4 input is connected to line 48.

The RAM B address input RB1 is connected to an address line 115, and the RB2 input is connected to an address line 116. The RB3 input to microprocessor 110 is connected to an address line 117, and the RB4 input is connected to an address line 118. The instruction input IN0 to microprocessor 110 in connected to a control line 119, and the IN1 input is connected to a control line 120. The IN2 input to microprocessor 110 is connected to a control line 121, the IN3 input to control line 122, the IN4 input to control line 123 and the IN5 input to a control line 124. The IN6 input is connected to ground and the IN7 input is connected to a control line 125. The IN8 input is connected to a control line 126.

The S1, S2 and S4 bidirectional input/outputs to the microprocess 110 provide a data bit input with shift register capability. More particularly, when a data bit is supplied to the S2 input by way of example, a specific instruction code at the In0–IN8 inputs shifts the data bit one position to the right. The S2 input to the microprocessor 110 is connected to the output of a driver 127, one input of which is connected to a data line 128. The output enable input F of the driver 127 is connected to a control line 129.

Figure 2A:
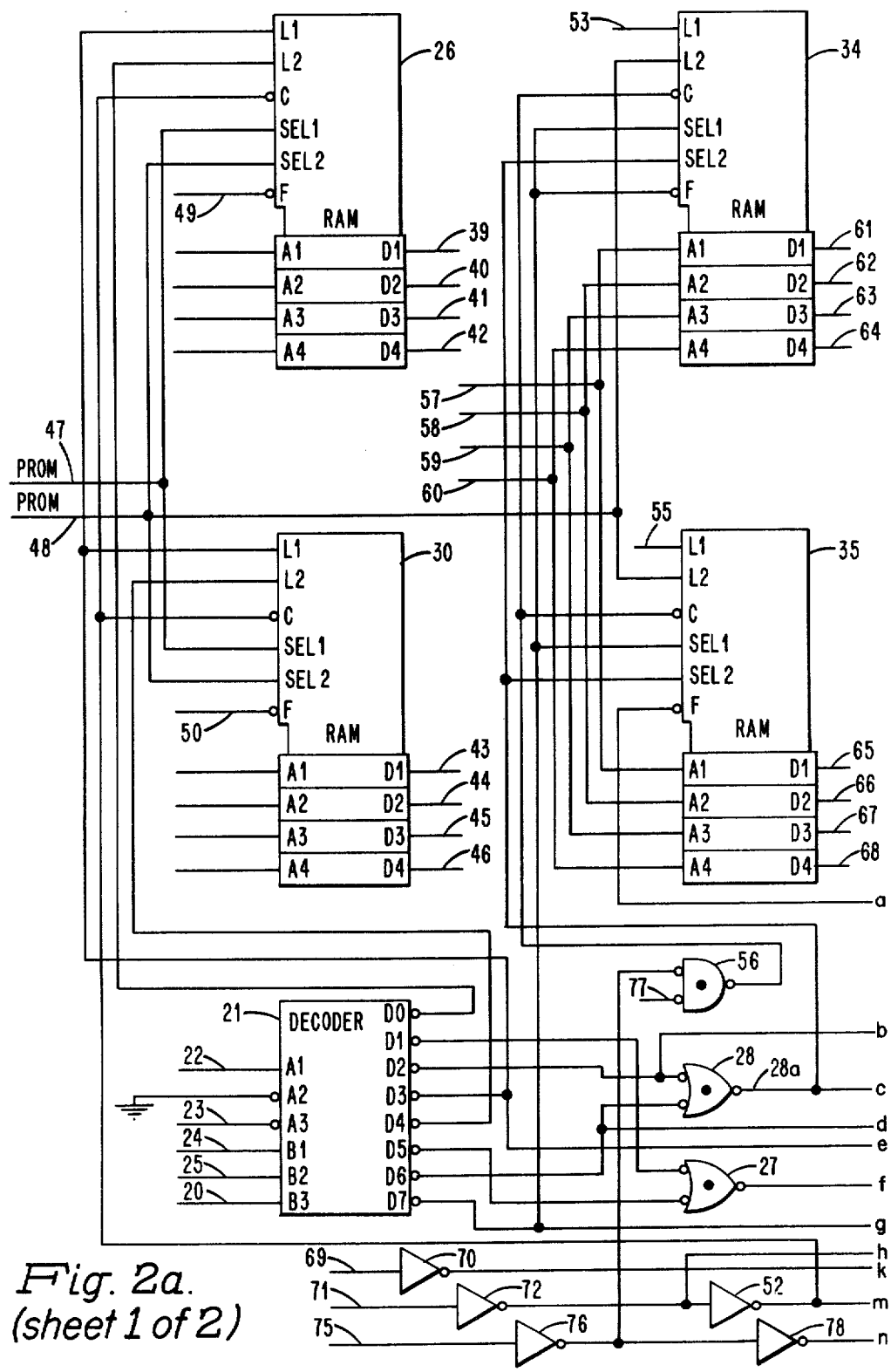

The D1-D4 outputs of microprocessor 110 are applied respectively to lines 130–133 leading to data inputs of a 16×4 bit RAM 134, and to lines 60, 59, 58 and 57 of FIG. 2a. More particularly, line 130 leads to the A4 input to RAM 134, the line 131 is connected to the A3 input to the RAM, the line 132 to the A2 input, and the line 133 to the A1 input.

The microprocessor 110 is of a type manufactured and sold by Advanced Micro Devices Incorporated in Sunnyvale, Calif. as the AM 2901 microprocessor. In normal operation, the microprocessor 110 receives an instruction at the IN0–IN8 inputs which may require manipulation of operands addressed by the RA1-RA4 and RB1-RB4 inputs, or a manipulation of data received at the DA1-DA4 inputs. The results of the manipulation is provided at the D1-D4 outputs. In addition, if the result is a logic zero, a logic one level appears at the D0 output of the microprocessor which is applied to a data line 135 leading to the inputs of a NOR gate 136 and also to a 1.0 K ohm resistor to +5V. The D0 koutput also is applied through a 1.0 K ohm resistor 103 to a +5.0 volt source 104. The output of gate 136 is applied to the A6 input of an eight-to-one multiplexer 137.

the SEL 1, SEL 2 and SEL 3 inputs to the multiplexer 137 are connected to control lines 138–140, respectively. The enable output (EN) input to the multiplexer 137 is connected to the D3 output of an instruction decoder 141. The A0 input to the multiplexer is connected to the control line 81, and the A1 input is connected by way of a control line 142 to the Q output of flip-flop 38 of FIG. 2a. The A2 input to multiplexer 137 is connected by way of a control line 143 to the Q output of flip-flop 88 of FIG. 2a, and the A3 input to the multiplexer is connected to the line 93. The A4–A5 inputs to the multiplexer 137 are connected to lines 144 and 145, respectively. The A7 input to the multiplexer is connected to the output of a NOR gate 146, one input of which is connected to a control line 147. A second input to gate 146 is connected to a control line 148.

The D0 output of multiplexer 137 is applied to the D input of a D-type flip-flop 149. The set and reset inputs to the flip-flop are each connected to control line 89 and to the A1 input of decoder 141. The clock input to the flip-flop is connected to control line 80, and the Q output of the flip-flop is connected to A2 and A3 inputs of decoder 141.

The B1-B3 inputs to the decoder 141 are connected to control lines 150–152, respectively. The D0 output of decoder 141 is connected to one input of an AND gate 153, the output of which is connected to the A2 input of a decoder 154. The D1 output of decoder 141 is connected to one input of an OR gate 155, a second input of which is connected by way of a control line 156 to the output of inverter 76 of FIG. 2a. The output of gate 155 is connected to the write enable (WE) input of RAM 134. The D2 output of decoder 141 is connected to control line 77, and the D4 output is connected to a control line 157. The D5 output of the decoder is connected to a control line 158, and the D6 output is connected to a control line 159. The D7 output of decoder 141 is connected to a second input of gate 153.

The decoders 141 and 154 are of a 74S138 type manufactured and sold by Texas Instruments Incorporated of Dallas, Texas.

The A1 input to decoder 154 is connected by way of a control line 160 to the output of inverter 78 of FIG. 2a, and the A3 input of the decoder is conected to a control line 161. The B1-B3 inputs of decoder 154 are connected to control lines 138-140, respectively. The D0 output of decoder 154 is connected to control line 71, the D1 input to control line 84, the D2 input to control 96 and the D3 input to control line 91. The D4-D6 outputs of decoder 154 are connected to control lines 162-164, respectively.

the SEL 1-SEL 4 inputs to RAM 134 are connected respectively to control lines 55, 53, 47 and 48. The output enable (F) input to RAM 134 is connected to a control line 165, and the D1-D4 outputs of the RAM are connected respectively to control lines 166-169.

Referring to FIG. 2c, four-bit counters 175-177 are configured to provide a ten bit address counter. The clock inputs to each of the counters is connected to control line 80 leading to the output of inverter 79 of FIG. 2a. The CI1 and CI2 carry-in inputs of counter 175 are connected to the increment (INC) inputs to counters 175-177, and connected by way of a control line 178 to the D7 output of decoder 141 of FIG. 2b. The reset input to counter 175 is connected to the reset inputs of counters 176 and 177, and by way of a control line 179 to the output of inverter 70 of FIG. 2a. The A1 input to counter 175 is connected by way of the control line 121 to the D1 output of a programmable read only memory (PROM) 180. The A2 input to counter 175 is connected by way of control line 122 to the D2 output of PROM 180, and the A3 input of the counter is connected by way of control line 123 of the D3 output of the PROM. The A4 input to counter 175 is connected by way of control line 124 to the D4 output of PROM 180.

The D1 output of counter 175 is applied to the A1 address inputs of PROMs 180-186. The D2 output of counter 175 is applied to the A2 inputs of PROMs 180-186, and the D3 output of the counter is applied to the A3 inputs of the PROMs. The D4 output of counter 175 is applied to the A4 input of the PROMs, and the carry out (CO) output of the counter is connected to the CI1 and CI2 carry-in inputs of counter 176.

The A1-A4 inputs to counter 176 are connected to control lines 115-118, and the D1 output of the counter is connected to the A5 inputs of PROMs 180-186. The D2 output of counter 176 is connected to the A6 inputs to the PROMs, and the D3 output of the counter is connected to the A7 inputs of the PROMs. The D4 output of counter 176 is connected to the A8 inputs of the PROMs, and the CO output of the counter 176 is connected to the CI1 and CI2 inputs of counter 177.

The A1 input to counter 177 is connected by way of control line 55 to the D1 output of PROM 185. The A2 input to counter 177 is connected by way of control line 53 to the D2 output of PROM 185. The D1 output of counter 177 is connected to the A9 inputs of PROMs 180-186, and the D2 output of the counter is connected to the A10 inputs of the PROMs.

The EN1 and EN2 enable inputs to PROMs 180-183, 185 and 186 are connected to ground. The EN1 input to PROM 184 also is connected to ground, but the EN2 input to the PROM is connected to the output of a NOR gate 187 having one input connected to control line 158 leading to the D5 output of decoder 141 of FIG. 2b. The second input to gate 187 is connected to control line 165 leading to the D3 output of PROM 182.

The D1 output of PROM 183 is connected to line 101.

The D2-D4 outputs of PROM 183 are applied by way of control lines 150-152 to the B1-B3 inputs respectively of decoder 141 of FIG. 2b. The D1-D4 outputs of PROM 184 are connected respectively to control lines 188-191, and the D3 and D4 outputs of PROM 185 are connected respectively to control lines 47 and 48. The D1 output of PROM 181 is connected to control line 125, and the D2 output is connected to control line 126. The control lines 125 and 126 lead to the IN7 and IN8 inputs of microprocessor 110 of FIG. 2b. The D3 and D4 outputs of PROM 181 are applied respectively to control lines 119 and 120 leading to the IN0 and IN1 inputs of the microprocessor 110.

Each of the PROMs 180-186 are 1024×4 bit tri-state PROMs having the firmware program of Appendix A stored therein. In response to the address signals supplied by the counters 175-177, internal RAM address signals and microinstructions are supplied by the firmware program of PROMs 180-186 to the microprocessor 110.

Figure 2D:
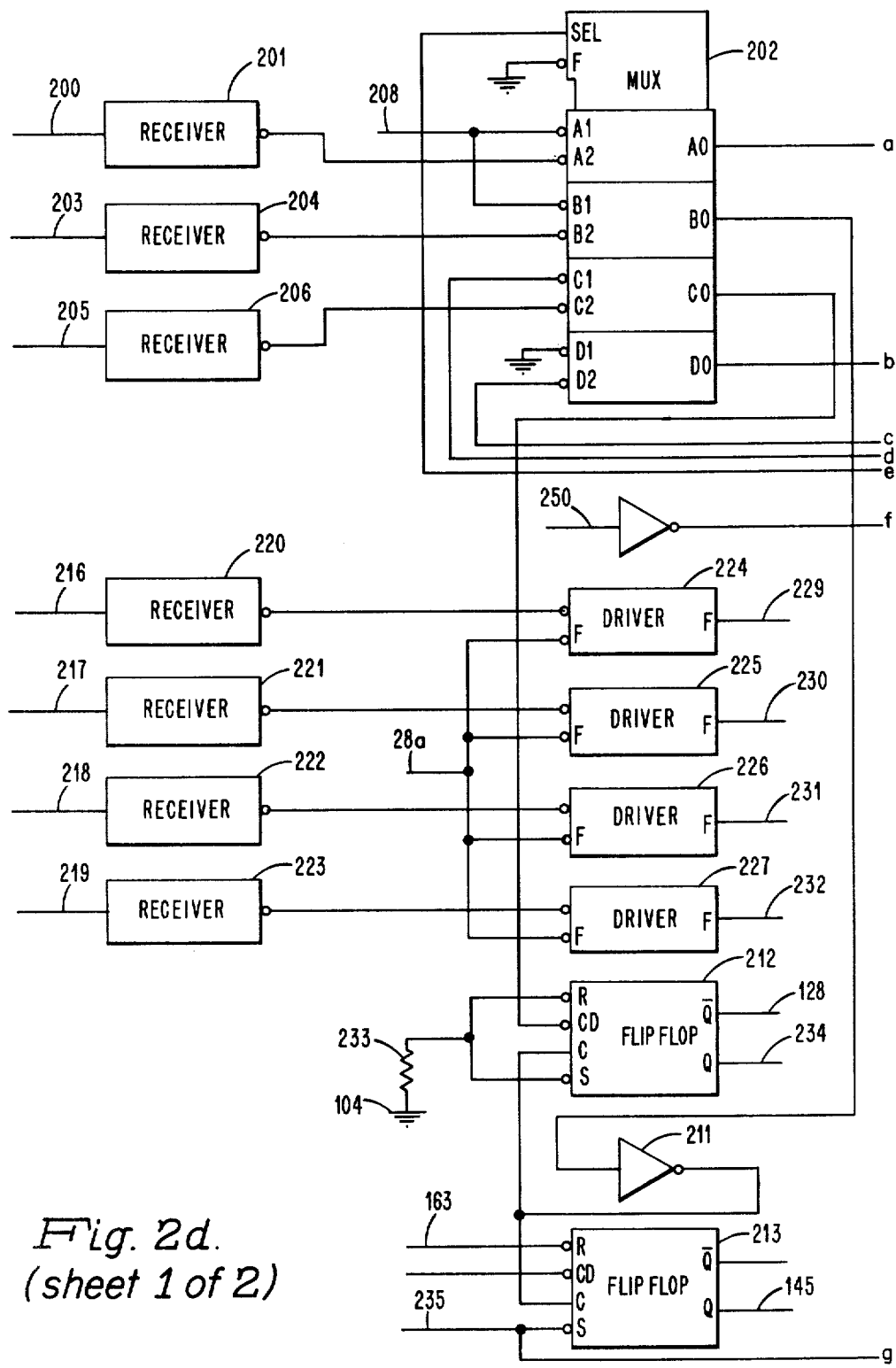
Figure 2D:
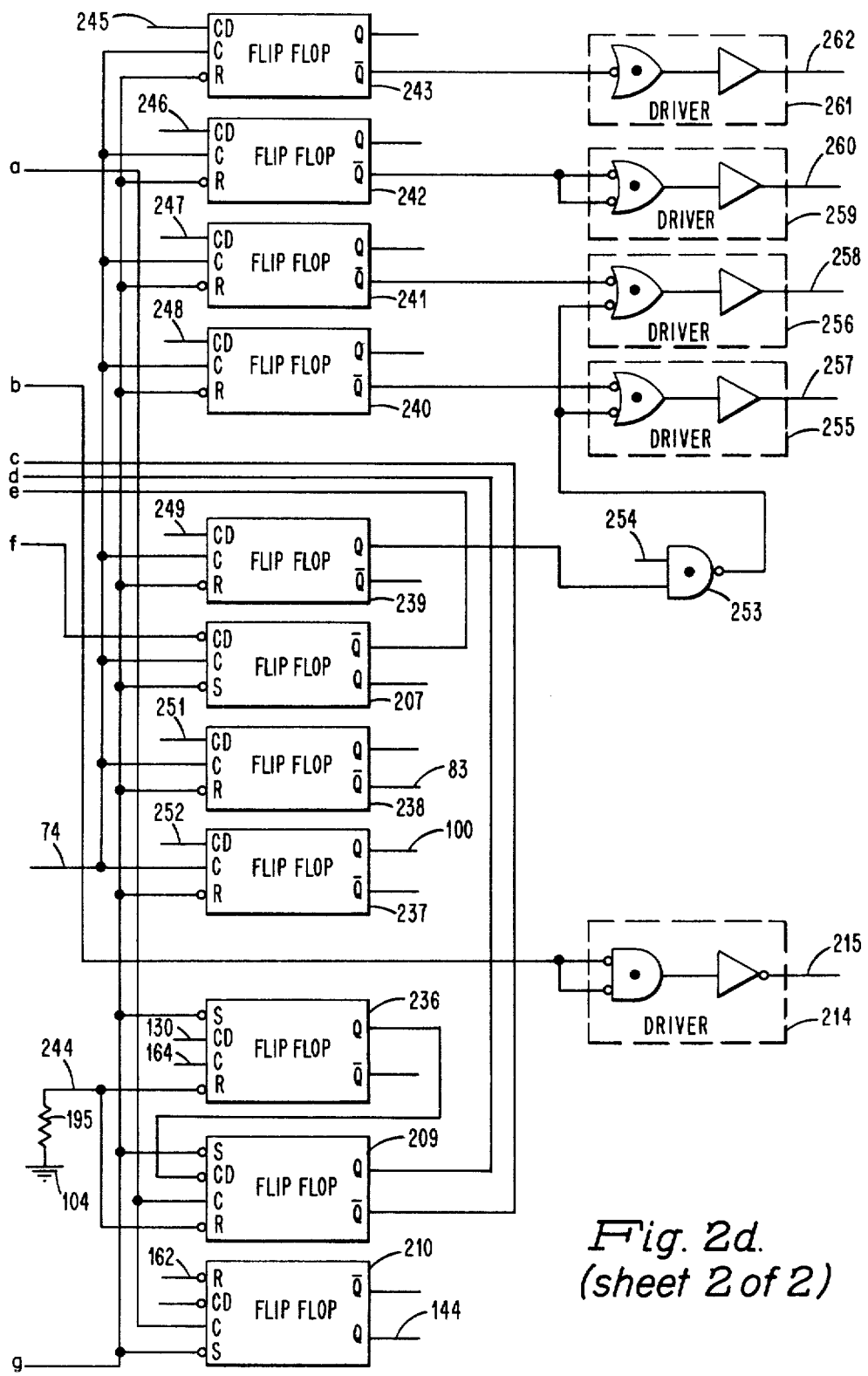

Referring to FIG. 2d, a local DCE such as DCE 16 of FIG. 1 supplies a transmit clock signal by way of a control line 200 and a receiver 201 to the A2 input of a four-stage two-to-one multiplexer 202. The DCE further supplies a receive clock signal by way of a control line 203 and a receiver 204 to the B2 input of the multiplexer 202. The DCE also supplies a serial data bit stream by way of a control line 205 and a receiver 206 to the C2 input of multiplexer 202.

The SEL select input of the multiplexer 202 is supplied by the $\overline{Q}$ output of a D-type flip-flop 207, and the output enable input (F) of the multiplexer is connected to ground. TJhe A1 and B1 inputs of the multiplexer are connected to a control line 208 leading to the MLCP 10. The C1 input to multiplexer 202 is connected to the Q output of a D-type flip-flop 209, and the D1 input to the multiplexer is connected to ground. The D2 input to the multiplexer 202 is connected to the $\overline{Q}$ output of flip-flop 209.

The A0 output of multiplexer 202 is applied to the clock input of flip-flop 209 and to the clock input of a D-type flip-flop 210. The B0 output of multiplexer 202 is applied through an inverter 211 to the clock inputs of a D-type flip-flop 212 and a D-type flip-flop 213. The CO output of multiplexer 202 is connected to the D input of flip-flop 212, and the CO output of the multiplexer is connected to two logically ANDed inputs of a driver 214. The output of driver 214 is applied to a data line 215 leading to the DCE 16 of FIG. 1.

The local DCE 16 supplies status signals by way of control lines 216-219, which are applied through receivers 220-223 to the inputs of tri-state drivers 224-227. More particularly, a data set ready status signal is supplied by the DCE to control line 216, and a clear to send signal is supplied to control line 217 in response to a request from the HCLA 14 to transfer data to the DCE. The local DCE 16 also supplies a carrier detected signal on line 218 to indicate that a communication from the remote DCE 18 has been detected. The DCE 16 also supplies a ring indicator signal on line 219 to indicate that the remote DCE 18 has alerted the local DCE 16 that a communication is forthcoming.

The output enable input (F) of the drivers 224-227 are each connected to control line 28a leading to the output of gate 28 of FIG. 2a, and the output of the drivers 224-227 respectively are applied to control lines 229-232 leading to the MLCP 10.

The reset and set inputs to flip-flop 212 are connected through a 1.0 K ohm resistor 233 to control line 135 leading to the +5.0 volt source 104. The Q output of flip-flop 212 is applied to a data line 234, and the Q̄ output of the flip-flop is connected to data line 128 leading to driver 127 of FIG. 2b.

The reset input to flip-flop 213 is connected to control line 163 leding to the D5 output of decoder 154 of FIG. 2b. The D input to the flip-flop is connected to ground, and the set input is connected to a control line 235 leading to the output of inverter 70 of FIG. 2a. The set input of the flip-flop further is connected to the set input of flip-flop 210, to the set input of flip-flop 209, to the set input of a D-type flip-flop 236, to the reset input of a Γ type flip-flop 237, and to the reset input of a D-type flip-flop 238. The set input to flip-flop 213 also is connected to the set input of flip-flop 207, to the reset input of a D-type flip-flop 239, to the reset input of a D-type flip-flop 240, the reset input of a D-type flip-flop 241, to the reset input of a D-type flip-flop 242 and to the reset input of a D-type flip-flop 243.

The reset input to flip-flop 210 is connected to control line 162 leading to the D4 output of decoder 154 of FIG. 2b, and the D input to the flip-flop is connected to ground. The Q output of flip-flop 210 is supplied to control line 144 leading to the A4 input of multiplexer 137 of FIG. 2b.

The D input to flip-flop 209 is connected to the Q output of flip-flop 236. The reset input to flip-flop 209 is connected to the reset input of flip-flop 236, and to a control line 244 leading through a 1.0 K ohm resistor 195 to +5.0 volt source 104. The Q̄ output of flip-flop 209 is applied to the D2 input of multiplexer 202, and the Q output of the flip-flop is applied to the C1 input of multiplexer 202.

The D input to flip-flop 236 is connected to control line 130 leading to the D1 output of microprocessor 110 of FIG. 2b, and the clock input to the flip-flop is connected to control line 164 leading to the D6 output of decoder 154.

The clock inputs to flip-flops 237-243 and 207 are connected to control line 74 leading to the output of NAND gate 73 of FIG. 2a. The MLCP 10 supplies an eight-bit data byte by way of data lines 245-252 with the least bit applied to line 245 and the most significant bit applied to line 252. Line 245 is connected to the D input of flip-flop 243, line 246 to the D input of flip-flop 242, line 247 to the D input of flip-flop 241 and line 248 to the D input of flip-flop 240. Line 249 is connected to the D input of flip-flop 239, and line 250 is connected by way of an inverter to the D input of flip-flop 207. Line 251 is connected to the D input of flip-flop 238 and line 252 is connected to the D input of flip-flop 237.

The Q output of flip-flop 237 is applied to line 102 leading to the reset input of flip-flop 88 of FIG. 2a, and the Q output of flip-flop 238 is applied by way of control line 83 to the set input of flip-flop 38 of FIG. 2a. The Q output of flip-flop 239 is applied to one input of a NAND gate 253, a second input of which is supplied by the MLCP 10 on a control line 254. The output of gate 253 is supplied to one input of a driver 255 and to one input of a driver 256.

A second input to driver 255 is connected to the Q̄ output of flip-flop 240, and the output of driver 255 is applied to a control line 257 leading to the local DCE 16. A second input to driver 256 is connected to the Q̄ output of flip-flop 241, and the output of the driver is applied to a control line 258 leading to the local DCE 16.

The Q̄ output of flip-flop 242 is applied to each of two logically OR'd inputs of a driver 259, the output of which is applied to a control line 260 leading to the local DCE 16. The Q̄ output of flip-flop 243 is applied to the input of a driver 261, the output of which is connected to a control line 262 leading to the DCE 16.

The flip-flop 239 is a direct connect mode flip-flop for providing a clock signal to the DCE 16 in an environment where no transmit or receive clock is otherwise provided. Flip-flop 207 specifies an internal loop test mode, but for normal operation is reset. The test mode signal controls the selection of the multiplexer 202. More particularly, the test mode signal at the Q̄ output of flip-flop 207 selects multiplexer 202 to the A1-D1 inputs when low, and to the A2-D2 inputs when high. In either a transmit or receive mode, the multiplexer is selected to the A2-D2 inputs. When the Q̄ of flip-flop 207 is at a logic one level. The transmit and receive clocks thereby are selected from the DCE 16, and the receive data is taken from the DCE. In addition, the transmit data to the DCE during a transmit operation is taken from the Q̄ output of flip-flop 209.

In a test mode, the A1-D1 inputs to the multiplexer 202 are selected, and both the transmit and receive clocks are taken from a clock source supplied by the MLCP 10 on line 208. The receive data bit is taken from the Q output of flip-flop 209 and the transmit data bit to the DCE 16 is held at a low state at the output of driver 214.

It is to be understood that the transmit and receive clock signals supplied by the MLCP 10 and DCE 16 in the preferred embodiment of HCLA 14, as illustrated in FIGS. 2a-2e, may have clock rates up to 20 KHz.

When the MLCP 10 is reading status information from the HCLA 14, logic bit signals received on lines 216-219 from the DCE 16 are supplied respectively by way of receivers 220-223 through tri-state drivers 224-227. When the drivers 224-227 are enabled by the read status signal supplied by the MLCP 10 on line 228, the driver outputs surplant the D1-D4 outputs of RAM 34 to provide DCE status information to the MLCP 10. The D1-D4 outputs of RAM 35 provide HCLA status information to the MLCP.

Figure 2E:
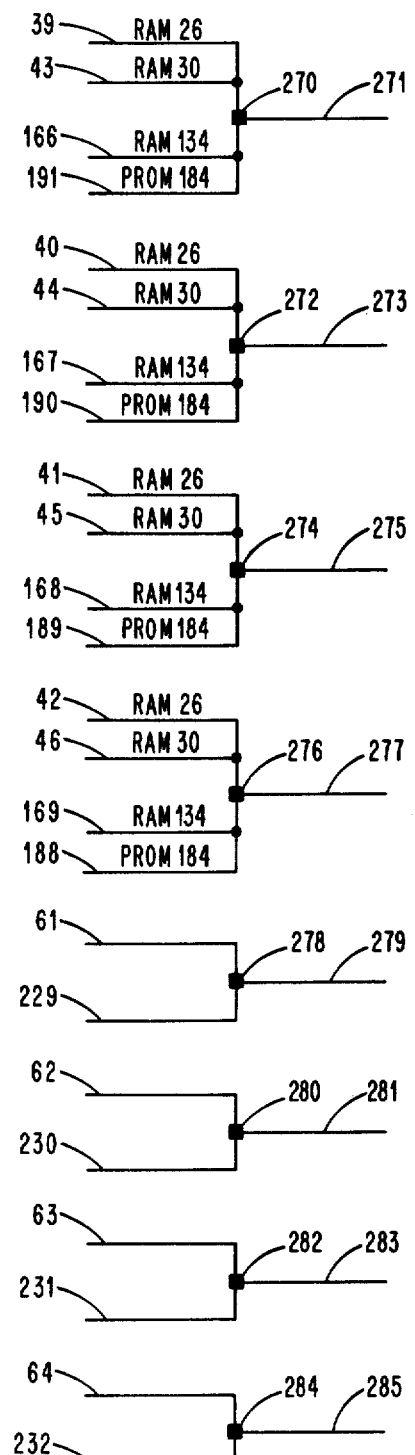

Referring to FIG. 2e, the D1 output of RAM 26 on line 29 and the D1 output of RAM 30 on line 43 are applied to one input of a tri-state node 270, the output of which is applied by way of a data line 271 to lines 114 and 140 of FIG. 2b. The D1 output of RAM 134 on line 166 and the D4 output of PROM 184 on line 191 are connected to a second input of node 270.

The D2 output of RAM 26 on line 40 and the D2 output of RAM 30 on line 44 are connected to one input of a tri-state node 272, the output of which is applied to a data line 273 leading to lines 113 and 139 of FIG. 2b. The D2 output of RAM 184 on line 190 are connected to a second input of node 273.

The D3 output of RAM 26 on line 41 and the D3 output of RAM 30 on line 45 are connected to one input of a tri-state node 274, the output of which is applied to a data line 275 leading to lines 112 and 138 of FIG. 2b. The D3 output of RAM 134 on line 168 and the D2 output of PROM 184 on line 189 also are connected to a second input of node 274.

The D4 output of RAM 26 on line 42 and the D4 output of RAM 30 on line 46 are applied to an input of a tri-state node 276, the output of which is applied to a data line 277 leading to lines 111 and 161 of FIG. 2b. The D4 output of RAM 134 on line 169 and the D1 output of PROM 184 on line 188 are applied to a second input of node 276.

The D1 output of RAM 34 on line 61 and the output of driver 224 on line 229 are connected respectively to the inputs of a tri-state node 278. The output of node 278 is applied to a data line 279 leading to the MLCP 10.

The D2 output of RAM 34 on line 62 and the output of driver 225 on line 230 are connected respectively to the inputs of a tri-state node 280. The output of node 280 is applied to a data line 281 leading to the MLCP 10.

The D3 output of RAM 34 on line 63 and the output of driver 226 on line 231 are connected respectively to the inputs of a tri-state node 282. The output of node 282 is applied to a data line 283 leading to the MLCP 10.

The D4 output of RAM 34 on line 64 and the output of driver 227 on line 232 are connected respectively to the inputs of a tri-state node 284. The output of node 284 is applied to a data line 285 leading to the MLCP 10.

OPERATION

Transmit and receive operations can occur simultaneously within the HCLA 14. A transmit operation is the process wherein the MLCP 10 transfers data in parallel to the HCLA 14. The data is then shifted serially out of the HCLA 14 to the DCE 16 under control of a DCE transmit clock. In support of this transmit operation, the MLCP 10 supplies control information to the HCLA, and receives status information from the HCLA.

A receive operation is the process wherein data from the DCE 16 is shifted serially into the HCLA 14 under the control of a DCE receive clock. The serial data stream is assembled into data bytes, and then transferred in parallel to the MLCP 10 under MLCP control. In support of this receive operation, the MLCP 10 supplies control information to the HCLA, and receives status information from the HCLA.

When the HCLA has a requirement for transmit data, status or control information, and simultaneously receive data, status or control information, the HCLA alternates the generation of transmit and receive service interrupts to the MLCP.

In operation, the HCLA 14 may enter into either or both a transmit mode and a receive mode, or a test mode. If data is to be transitted from the HCLA 14 to the DCE 16, the MLCP 10 issues a logic one signal to line 69 to reset flip-flop 32 of FIG. 2a, and reset flip-flops 237–243 of FIG. 2d. The logic one signal on line 69 further is applied through inverter 70 of FIG. 2a to set flip-flops 207, 209, 210, 213 and 236 of FIG. 2d. The $\overline{Q}$ output of flip-flop 207 thereby transitions to a logic zero to select the multiplexer 202 to the A1–D1 inputs.

The MLCP 10 also supplies binary data to the A1–A4 inputs of RAMs 26 and 30, and logic signals to the A1, A3, and B1–B3 inputs to the command decoder 21. The A1–A3 inputs of the decoder are logically ANDed to enable the decoder, and the B1–B3 inputs are decoded to provide commands at the D0–D7 outputs. If the D3 output of decoder 21 is at a logic zero level, four bits of data are loaded into RAM 26 and four bits of data are loaded into RAM 30 when the MLCP 10 issues a logic zero signal to line 71. In addition, a logic one is applied by way of inverter 31 to the CK input of flip-flop 32 to reset the flip-flop. The Q output of the flip-flop thereupon transitions to a logic zero level to indicate to the firmware that a data byte has been stored in RAMs 26 and 30. More particularly, the logic AND nodes 270, 272, 274 and 276 are controlled by the PROM 184 to select the multiplexer 137 to its A0 input which is applied to the D input of flip-flop 149. This occurs when counters 175–177 address a TAMN instruction in PROMs 180–186 as indicated at location 58000 in the firmware program of Appendix A. Upon the occurrence of a next positive edge of the system clock supplied by the MLCP 10 on line 80, flip-flop 149 is controlled to reflect the set or reset condition of the A0 input to multiplexer 137. Upon the execution of a next instruction, decoder 141 is enabled or inhibited by the Q output of flip-flop 149 to determine whether the instruction is to be executed normally, or modified. If the Q output is at a logic zero level, the instruction shall be executed normally. If the Q output is at a logic one level, however, the instruction shall be modified or skipped. For example, if the instruction succeeding the TAMN instruction is a branch instruction (e.g., location 58100) and the Q output of flip-flop 149 is at a logic zero level, the counters 175–177 shall be loaded in response to a logic zero at the D7 output of decoder 141 with the address provided by the succeeding instruction as indicated at the D2 and D1 outputs of PROM 185, the D1–D4 outputs of PROM 186 and the D1–D4 outputs of PROM 180. If the Q output of flip-flop 149 is at a logic one level, however, the D7 output of decoder 141 transitions to a logic one level. The counters 175–177 thereupon shall increment to a next location 58600 in the firmware program without executing the branch instruction. In this manner, the microprogram continues at a location determined by the tested condition. A total of eight functions may be tested in this manner through the facility of multiplexer 137.

The MLCP 10 prepares to send data by applying a command word to decoder 21 to provide a logic zero at the D1 output, thereby supplying a logic zero at one input of NAND gate 73. The MLCP 10 further supplies a logic zero strobe signal to line 71 to cause control line 74 to transition to a logic one level and clock flip-flops 207 and 237–243. By controlling the data lines 245–252, the MLCP controls the state of flip-flops 207 and 237–243.

For the purpose of sending data, the MLCP 10 sets the Q outputs of flip-flops 237, 242, 243 and resets the Q output of flip-flop 207 by setting data ines 252, 246, 245 and 250 while supplying a clock to control line 74 in the manner previously described.

When the flip-flop 242 is set, a request to send control line 260 transitions to a logic one level to signal the DCE 16. The firmware control system waits for a logic one level on line 267 before requesting data from the MLCP 10. The flip-flop 207 is reset to select the multiplexer 202 of FIG. 2d to its A2–D2 inputs.

Flip-flop 237 raises control line 98 of FIG. 2a to a logic one state. When the flip-flop 88 is set by a firmware signal on line 96, the control line 98 transitions to a logic zero level to signal the MLCP 10 for a next data byte. When data is requested from the MLCP 10, the firmware control system sets the flip-flop 32.

Before a message transmission or reception can begin, the MLCP 10 must supply a DCE control word to flip-flops 207 and 237–243. The MLCP 10 applies a code word to the decoder 21, thereby causing either the D1 or D5 outputs of the decoder to transition to a logic zero level. The MLCP further supplies a logic zero strobe to line 71 to provide a load signal on line 74 leading to the clock inputs of flip-flops 207 and 237–243 of FIG. 2d. The MLCP data on lines 245–252 thereupon is loaded into the flip-flops.

Bits φ-3 on lines 245-248, respectively, provide control information to the DCE by way of drivers 255, 256, 259 and 261. Bit 4 stored in flip-flop 239 indicates whether a direct connect mode is in effect wherein a data transfer clock signal is supplied by the MLCP 10 rather than the DCE 16. Bit 5 stored in flip-flop 207 indicates whether a test mode is in effect. In a transmit or receive operation, the flip-flop must be reset to select the multiplexer 202 to the A2-D2 inputs. MLCP data bits 6 and 7 stored in flip-flops 238 and 237, respectively, determine whether a transmit or a receive operation shall be enabled. It is to be understood that both operations may be enabled simultaneously during a full duplex operation.

During a transfer of transmit control information from the MLCP 10 to the HCLA 14, the MLCP applies a command word to the decoder 21 to cause the DO output of the decoder to transition to a logic zero level. A four bit transmit control byte from the MLCP thereupon is loaded into the RAM 26. Of the four bits, bits 0, 1 and 2 indicate the byte size of the information and bit 3 indicates the occurrence of a last byte of a message to be transmitted.

The firmware control system senses the transmit control byte by applying select control signals and an output enable signal to the RAM 26. The transmit control word thereby is applied to lines 39-42 leading through tri-state nodes 270, 272, 274 and 276 to the DA1-DA4 inputs to the microprocessor 110. The ALU operations within the microprocessor 110 and the multiplexer 137 then are used as before described to accommodate the application of the transmit control word by the firmware control system.

In transferring information through the HCLA 14, the firmware control system of PROMs 180-186 must determine whether a new transmit bit is available for transfer to the DCE 16. This determination is accomplished by sensing the Q output of flip-flop 210 of FIG. 2d. More particularly, the firmware control system selects the multiplexer 137 to its A4 input, which is applied by way of flip-flop 141. Whenever a next bit is ready for transfer as indicated by the A4 input to multiplexer 137 being at a logic zero level, the D1 output of decoder 141 is enabled and applied through OR gate 155 to disable the WE (write enable) input of RAM 134. The firmware control system further supplies select control signals to the SEL 1-SEL 4 inputs to RAM 134 to select one of sixteen four bit words stored in RAM 134, and enables the four bit output of RAM 134 by issuing a logic zero signal to line 165. In response thereto, the output of RAM 134 is applied to lines 166-169 leading to nodes 270, 272, 274 and 276, respectively. The four-bit output of the nodes is applied to the DA1-DA4 inputs of microprocessor 110, and operated upon in accordance with a TAMN instruction supplied by the firmware control system to the IN0-IN8 inputs of the micro processor. The result of the operation is indicated at the D0 output of the microprocessor, and applied through NOR gate 136 to the A6 input of multiplexer 134. The multiplexer is selected to its A6 input as before described to cause new commands to issue from decoders 141 and 154. In response thereto, a reset transmit ready signal is generated at the D4 output of decoder 154 to reset the flip-flop 210 of FIG. 2d.

When the multiplexer 202 of FIG. 2d is selected to its A2-D2 inputs during a transmit mode as before described, a transmit clock signal having a clock rate up to 20.0 KHz is supplied by the local DCE 16 to the A2 input of the multiplexer by way of receiver 201. The clock signal is applied to the clock inputs of flip-flops 209 and 210. Upon each positive going slope of the transmit clock signal, the flip-flop 210 is set and the microprocessor 110 under firmware control senses the output of the flip-flop by selecting the multiplexer 137 as before described. If the flop is set, the firmware branches to a transmit update routine and the decoder 154 issues a reset signal to reset the flop 210. This operation occurs periodically in accordance with the positive going slopes of the DCE transmit clock signal.

During a transmit operation, the data in the RAMs 26 and 30 is fed four bits at a time under firmware control through the AND nodes 270, 272, 274 and 276 of FIG. 2e to the DA1-DA4 inputs of microprocessor 110. More particularly, the firmware control system issues control signals to the SEL 1 and SEL 2 input of RAMs 126 and 30 to alternatively address RAM 26 and RAM 30 data locations to be read. The firmware control system further issues logic zero signals to the F inputs of the RAMs to enable the RAM outputs. When the RAMs 26 and 30 become empty of data during a transmit operation, a logic zero strobe is generated at the D0 output of decoder 154 in response to control signals from the firmware control system. The flip-flop 32 of FIG. 2a thereby is set to indicate that the data locations within the RAMs 26 and 30 are empty.

The firmware control system also generates a second logic zero strobe at the D2 output of decoder 154 which is applied to theCj-input of the flip-flop 88 to set the flip-flop, and thereby signal the MLCP that additional data may be transmitted. The set condition is applied through the AND gate 97 to the MLCP 10 only if the MLCP 10 has loaded the DCE control register comprised of flip-flops 207 and 237-243. Before this occurs, a status condition is loaded from the microprocessor 110 into RAM 35 under firmware control. More particularly, the firmware control system issues control signals to lines 48 and 55 leading to the L2 and L1 inputs of RAM 35, respectively, to select an address for a write operation. When a logic zero clock pulse issues from gate 56, microprocessor 110 status information is applied respectively by way of lines 130-133 and lines 60-57 to the A1-A4 inputs of RAM 35. A non-zero status is loaded into RAMs 34 and 35 if an underrun condition has occured. At the time of receiving the interrupt of flip-flop 88, the MLCP examines the RAM 35 to determine the underrun condition. More particularly, the MLCP 10 issues a control word by way of the decoder 21 to the SEL 1 and SEL 2 inputs of RAM 35 to select a RAM address to be read. The decoder 21 further causes a logic zero level to be applied to the F input of the RAM, thereby enabling the RAM ouputs. If there is no underrun, the MLCP provides a next data byte as above described.

It is to be understood that whenever the MLCP 10 reads status information from the RAM 35 as above described, the output of gate 28 transitions to a logic zero level to enable drivers 224-227 of FIG. 2d. DCE 16 status information from receivers 220-223 thereupon are applied by way of lines 229-232 to tristate modes 278, 280, 282, and 284 of FIG. 2e. The lines 279, 281, 283 and 285 are read by the MLCP 10.

An underrun occurs when the MLCP 10 has not provided a new transmit data byte by the time a previous data byte has been shifted out of RAM 134 by way of microprocessor 110. If the flip-flop 32 remains in a set condition after a data byte has been shifted out of RAM 134 and microprocessor 110, an underrun condition is indicated.

The firmware control system thereupon sends an abort bit sequence to the DCE 16. Further, when a previous interrupt issued by flip-flop 88 has been serviced, the current underrun status is loaded into the RAM 35, and another interrupt is generated by flip-flop 88 to inform the MLCP that an underrun has occurred. The MLCP may then start a next message frame by loading data into the RAMs 26 and 30 as before described.

As soon as the data is transferred from the RAMs 26 and 30 to the mircroprocessor 110, and the MLCP is notified that additional data may be transferred to the HCLA, the MLCP has a time period of n bits where "n" is the byte size of the data in which to respond. When additional data is provided by the MLCP, the flip-flop 32 is reset by the MLCP by generating a logic one strobe at the D3 output of decoder 21 of FIG. 2a when data is to be loaded into the RAMs 26 and 30. The MLCP then resets the flip-flop 88 by generating a logic one strobe at the output of NAND gate 29 which is applied to the K input of the flip-flop.

While the RAMs 26 and 30 are being read, the before described transmit control byte is examined by the microprocessor 110 to determine the current byte size and to sense the occurence of the last byte in a message frame.

After a data byte, which may be of any byte size, is loaded into an input RAM of the microprocessor 110, a right shift operation occurs wherein the data byte is loaded into the RAM 134. The data byte then is reloaded into an internal RAM of the microprocessor 110 shifted right one bit and reloaded into the RAM 134. The rightmost bit of the data byte under firmware control is shifted out of the D1 output of microprocessor 110 to the Cd input of flip-flop 236 of FIG. 2d. Upon the next occurrence of a positive going slope of the DCE transmit clock signal on line 200, the contents of the internal RAM OF microprocessor 110 again is shifted to the right to load another bit into the flip-flop 236. In addition, the contents of the flip-flop 236 are loaded into the flip-flop 209. Upon a next occurrence of a positive going slope in the transmit clock signal, a next transmit data bit is transferred from flip-flop 236 to flip-flop 209. The data bits flow through the flip-flop 209 at the transmit clock rate, and through the D2 input of multiplexer 202 and driver 214 to line 215 leading to DCE 16. This process continues for n bit times wherein the letter "n" refers to the byte size.

After a data byte has been shifted out of the microprocessor 110, the firmware control system executes a TAMN instruction to test the flip-flop 32 of FIG. 2a. If the flip-flop 32 is set, an error condition is indicated wherein the MLCP has failed to transmit data at the HCLA processing rate. Thus an underrun condition has occurred.

Upon the occurrence of an end-of-frame as indicated by bit 3 of the transmit control byte, a status word is as before described loaded into the RAM 35 upon the occurrence of a next flip-flop 88 interrupt to indicate to the MLCP that the previous data message was transmitted correctly to the DCE 16.

Between message frames, either flag sequences or abort sequences are generated by the HCLA and transmitted to the DCE 16. More particularly, the bit 3 of the transmit control byte which specifies an end of a message is sensed between frames to indicate whether a flag or an abort sequence is to be issued to the DCE 16.

The HCLA 14 has a further provision for identifying to a receiver whether data or control bytes are being transferred. More particularly, the flag or abort control bytes are comprised of six or more contiguous logic ones. If five or more contiguous logic ones occur in an information transfer, the HCLA inserts a zero after the occurrence of five contiguous logic ones to flag to the receiver that data is being transferred. The receiver thereupon removes the zero to reconfigure the data message as all ones.

This feature occurs between locations 51300 and 54400 of the firmware program for a transmit operation. When a receive operation occurs, a logic zero is removed as provided between locations 98400 and 101900, and locations 105000 and 105100.

If a data receive operation is requested wherein data is transferred from the DCE 16 to the MLCP 10, the MLCP 10 issues a master clear signal to line 69 of FIG. 2a to reset the flip-flop 238. Whenever flip-flop 238 is reset, the Q output of the flip-flop is at a logic zero level which is applied to the set input of flip-flop 38 of FIG. 2a. The $\overline{Q}$ output of flip-flop 38 thereupon transitions to a logic zero level. This condition can be tested at multiplexer 137 by the TAMN instruction as described previously. During the period that the $\overline{Q}$ output of flip-flop 38 is at a logic zero level, no additional data from the DCE 16 is accepted and no new messages are assembled by the microprocessor 110.

When the MLCP 10 is ready to initiate a receive operation, the MLCP loads flip-flops 207 and 237–243 of FIG. 2d as previously described. In particular, flip-flop 207 is reset to select the multiplexer 202 to its A2–D2 inputs. In addition, the flip-flop 238 is set to allow the flip-flop 38 to be reset. When the firmware control system generates a logic zero at the D1 output of decoder 154 on line 84 to reset the flip-flop 38, a receive operation may be initiated.

The MLCP 10 loads RAM 30 with a four-bit receive control word when data is to be transferred from the DCE 16 to the MLCP 10. More particularly, the MLCP controls the D3 and D4 outputs of decoder 21 and the line 71 to load MLCP data bits 4–7 into the addressed locations of RAM 30. Bits 0, 1 and 2 of the control word indicate the expected byte size of the data byte to be received from the DCE 16.

Under firmware control, the receive control word is applied through to AND nodes 270, 272, 274 and 276 to the data inputs of microprocessor 110. More particularly, the D 3 and D4 outputs of PROM 185 applied respectively to lines 47 and 48 and the D1 output of PROM 182 applied to line 50 enable lines 43–46 leading to nodes 270, 272, 274 and 276 as described above.

The microprocessor operates upon the control word in accordance with a microinstruction supplied by the firmware control system to the IN0–IN8 inputs of the microprocessor. The result of the operation is indicated at the D0 output of the microprocessor, and applied by way of NOR gate 136 to the A6 input of multiplexer 137. If the multiplexer 137 is selected to the A6 input in response to the outputs of AND nodes 274, 272, and 270 on lines 138–140, respectively, the A6 input of the multiplexer is applied through flip-flop 149 to enable decoder 141. In response to firmware control system signals on lines 150–152, the D0 and D7 outputs of decoder 141 are applied through AND gate 153 to enable decoder 154.

When the HCLA 14 is ready to receive data from the DCE 16 as evidenced by a logic one level at the Q output of flip-flop 238 and the Q output of flip-flop 38, data bits from the DCE 16 are accepted. More particularly, a DCE receive clock signal having a clock rate up to 20.0 KHz is received from the DCE 16 on line 203 of FIG. 2d. The clock signal is applied through the B2 input of multiplexer 202 and inverter 211 to the clock inputs of flip-flops 212 and 213. Data bits from the DCE 16 are received on line 205, and applied through receiver 206 and the C2 input of multiplexer 202 to the CD input of flip-flop 212. Upon the occurrence of each rising edge in the DCE receive clock signal at the output of inverter 211, a data bit from DCE 16 is shifted into flip-flop 212 and the flip-flop 213 is set.

The firmware control system monitors the Q output of flip-flop 213 on line 145 by selecting the multiplexer 137 to its A5 input in the manner before described. When the Q output is at a logic one level, the firmware control system resets the flip-flop 213 by issuing a logic zero signal at the D5 output of decoder 154. The firmware control system then executes a routine for receiving data from the DCE 16 as indicated at location 98400 of Appendix A.

The Q output of flip-flop 212 is applied to the tristate driver 127 of FIG. 2b. When the firmware control system issues a logic zero to line 129 to enable the output of driver 127 and a microinstruction to the microprocessor 110 for performing a right shift, the DCE data bit is applied through the driver and right shifted into an input RAM of the microprocessor 110. The above-described process is repeated for each rising slope of the DCE receive clock signal at the output of inverter 211.

In this manner, data bit sequences from the DCE 16 are shifted into the input RAM of the microprocessor 110 for further examination. More particularly, the occurrence of an eight-bit signal including a logic zero followed by six consecutive logic ones and a logic zero indicates a flag sequence. The flag sequence may indicate the start of a message frame, or more accurately that a message frame shall follow. When a flag sequence is followed by a non-flag sequence, the non-flag sequence indicates that the first part of the message has begun. If the non-flag sequence is comprised of seven or more but less than 15 consecutive logic one bits, however, an abort sequence is indicated. The abort sequence occurs when something has gone wrong with a data transfer. The data receiver thereupon should disregard the information transmitted during the current message frame.

If fifteen or more logic one bit signals occur in a sequence, an idle link state is present. The idle link state indicates that no more data shall be forthcoming.

A flag sequence of bits is used to indicate that an end-of-frame has occurred, and a following idle link state sequence would indicate that the receive operation has been completed.

In examining the bit stream shifted into the internal RAM of microprocessor 110, the microprocessor executes a TAMN instruction provided by the firmware control system to test for the occurrence of a particular sequence of bits. If the particular sequence of bits is found, the D0 output of the microprocessor on line 135 transitions to a logic one level to indicate a true condition. If the condition is false, however, the line 135 transitions to a logic zero level. This condition is signalled to the firmware by way of multiplexer 137 as before described. When the D0 output of the microprocessor is at a logic one level, a next instruction in the firmware program of Appendix A is executed. When it is at a logic zero level, however, the next instruction is skipped in the firmware program.

The binary information stream from the DCE 16 initially is sensed to detect a flag sequence indicating the beginning of a frame. Upon detecting a flag sequence, the data bit stream is sensed eight bits at a time to detect a non-flag sequence. The occurrence of a non-flag sequence indicates a first data byte in a frame. If another flag sequence or an abort bit sequence occurs before 24 bits of a non-flag sequence occurs, the indicated message frame is too short and the message frame is unacceptable. If a second flag sequence is detected after the unacceptable message frame is indicated, the start of a second message frame may have occurred. If an abort sequence is detected in an unacceptable message frame, however, the firmware control system continues to look for a second flag sequence or an idle link state condition. It is to be understood that the flag, abort and idle link state bit sequences are never transferred to the MLCP 10. The acceptance of such bit sequences, however, are reported.

If the firmware control system detects an idle link state, the MLCP 10 is informed by a status word transfer. The firmware senses the Q output of flip-flop 88 in FIG. 2b to determine whether the RAM 35 is being used in a transmit operation. If the flip-flop 88 is reset, a transmit operation is not occurring and a status code is transferred to the RAM 35 as previously described. In addition, the firmware control system issues a logic zero signal by way of the D3 output of decoder 154 to the line 91. The signal is applied through inverter 90 of FIG. 2a to the CJ input of flip-flop 87. A logic zero receive service request signal thereby is provided at the Q output of flip-flop 87. Since the Q output of flip-flop 38 is at a logic one level, the output of AND gate 86 transitions to a logic zero level to signal the MLCP 10 to read the status information in RAM 35. In response thereto, the MLCP 10 reads the RAM 35, and resets the flip-flop 87. More particularly, the MLCP decoder 21 issues a logic zero signal at its D6 output and the MLCP issues a logic signal to line 92. The output of gate 33 thereupon transitions to a logic one level which is applied to the CK input of flip-flop 87 to reset the flip-flop. The MLCP 10 thereby is notified that an idle link state is present and in turn notifies the HCLA 14 that the status word has been read.

After 24 bits in a message frame have been detected, a first eight bit data byte is transferred to the MLCP 10. If a transmit operation is not occurring, the data byte is loaded from lines 57–60 into the RAMS 34 and 35 in response to gate 56. More particularly, four data bits are loaded into RAM 34 and four data bits are loaded into RAM 35. In addition to the four data bits, a message frame status byte is loaded into RAM 35 as previously described. An all zero status byte indicates that a data byte exists in the RAMS 34 and 35, and that such byte is not the last byte of a frame. A non-zero status byte indicates that a last data byte has occurred in a frame.

The firmware control system thereafter generates a strobe at the D3 output of decoder 154 which is applied to the Cj-input of flip-flop 87 to generate an interrupt. The MLCP 10 thereby is notified that receive data and status information has been loaded into the RAMs 34 and 35. In response thereto, the MLCP reads the RAMs 34 and 35. More particularly, the SEL 1, SEL 2 and F inputs to RAMs 34 and 35 are controlled by the decoder 21 to supply the received data to lines 61–68. The data on lines 61–64 is applied through tristate nodes 278, 280, 282 and 284 of FIG. 2e to the MLCP 10. The data on lines 65–68 are supplied directly to the MLCP. The MLCP then resets the flip-flop 87 as before described.

In transferring information from the HCLA 14 to the MLCP 10, the first two data bytes are always eight bit bytes. Thereafter, the byte size is indicated by the receive control byte in RAM 30. If a byte size is less than eight bits, the byte is right justified within an eight-bit field by the microprocessor 110 before being loaded into the RAMS 34 and 35. Before each byte is loaded into the RAMS 34 and 35, however, the flip-flop 88 is sensed under firmware control as before described to detect a transmit mode condition. Further, the firmware control system senses the output of flip-flop 87 to detect a receive mode condition. If flip-flop 87 is set, the MLCP 10 is reading the last data bytes stored in the RAMs 34 and 35, and an overrun error is indicated. If an overrun condition occurs, further data byte transmission to the MLCP is inhibited. More particularly, no further data byte transfers are made to the RAMs 34 and 35, and no interrupt is generated to the MLCP to indicate that RAMs 34 and 35 are to be read. The above described operation continues until a flag bit sequence or an abort bit sequence is detected. The occurrence of a flag bit sequence indicates the end of a valid message frame, while the occurrence of an abort sequence indicates the end of an invalid message frame.

It is to be understood that the occurrence of a flag bit sequence at the end of a message frame does not necessarily mean that all information within that message frame has been transferred to the MLCP. Rather, the information may still reside both in the RAMs 34 and 35, and in the internal RAMs of the microprocessor 110. The last two bytes occurring in a message frame are FCS (frame check sequence) bytes. Each of the two bytes occur in an eight bit field to provide a CRC (cyclic redundancy check).

After the occurrence of a flag bit sequence at the end of a message frame, no further activity occursuntil the MLCP 10 has read the data in RAMs 34 and 35, and has reset the flip-flop 87. The data in RAMs 34 and 35 at the time the flip-flop is reset is the next to the last data byte preceding the FCS bytes. Thereafter, the firmware control system right justifies the last data byte, and again checks to insure that a transmit mode condition is not present. The last data byte then is loaded into the RAMs 34 and 35.

The firmware control system supplies a last data byte size indicator to the A1–A3 inputs of RAM 35. A logic one also is supplied to the A4 input of the RAM to indicate that the data byte currently residing in RAMs 34 and 35 is the last data of the message. A receive interrupt then is generated at the output of flip-flop 87 to flag to the MLCP 10 that status information is to be read from RAMs 34 and 35. The MLCP first reads the status in RAMs 34 and 35, and then reads the data in RAMs 34 and 35. The MLCP thereafter resets the flip-flop 87.

Upon detecting the reset condition of flip-flop 87, and sensing flip-flop 88 and 87 to detect the non-occurrence of a transmit mode and the occurrence of the receive mode, the firmware control system loads the RAMs 34 and 35 with the right half of the FCS bit sequence. The firmware control system then loads the RAM 35 with status information which is an all zero indication that a normal message frame has occurred. If a short message frame, an abort frame, or an overrun condition is detected, however, the FCS bit sequence is not transferred to the MLCP. More particularly, bit 4 of the status information signals the occurrence of a short frame, bit 5 signals the occurrence of an abort condition, and bit 6 signals the occurrence of an overrun condition. It is to be understood that a frame having less than twenty-five bits is automatically discarded. A frame having between twenty-five and thirty-one bits is designated a short frame.

When the firmware control system sets the flip-flop 87 to interrupt the MLCP 10 as before described, the above-described operation is repeated for the left half of the FCS bit sequence which is an all zero status word under normal operating conditions. The FCS bit sequence is transferred to the MLCP 10 by the firmware control system independent of the DCE 16 receive clock signals on line 203 of FIG. 2d.

If the MLCP 10 should command a termination of message frame at any time during the transfer of a message from the HCLA 14, the MLCP 10 resets the flip-flop 238 which in turn sets flip-flop 38. In response thereto, the firmware control system inhibits the HCLA 14 from receiving further messages until the flip-flop 238 is once again set by the MLCP.

APPENDIX A DESCRIPTION

The following is an explanation of those parts of the firmware program of Appendix A necessary for an understanding of the invention. The locations 2700 through 3400 of the listing refer to constant fields which are named and followed by a numeral/numeral configuration referring to the first bit and the number of bits in a field. At location 2900, for example, the ISCFLD field begins at bit 7 and is of a one bit size. If bit 7 is at a logic one, the subcomand is inhibited. If bit 7 is at logic zero, however, the subcommand is not inhibited.

It is to be understood that specified bits may be referenced in more than one field. For example, bit 7 is contained within both the K field at location 2800 and the ISCFLD at location 2900. This is permissible as long as the bit is not simultaneously specified to contain conflicting information.

Referring to the instruction dictionary at locations 25800 through 27700, the instructions appearing at the D0–D7 outputs of the instruction decoder 141 of FIG. 2b are defined. The operands for each of the instruction are defined at locations 2300 through 25600. Each operand is comprised of a field type, a field name and a field definition. More particularly, at location 2300, the field type is BRCHFLD which is a branch field. The field name is BRADDR which is a branch address. That part of the operand which follows the branch address is the field definition. The different types of operands include the branch field, the constant field, and the argument definition field.

Looking further at the location 2300, it is seen that the BRADDR field begins with bit 10 and is comprised of 10 bits. These 10 bits correspond to the firmware control store logic signals of RAMs 180, 185 and 186, which are applied to the data inputs of counters 175–177 of FIG. 2c to execute a branch instruction.

Referring again to the instruction d efinitions at locations 26000 through 27300, it is seen that two fields are set out within parenthesis. The first field includes variables which have to be defined by the firmware decoder 154 of FIG.2b. Referring more particularly to location 27200, it is seen that the firmware decoder would have to fill the branch address. An allowable sub field thereafter follows as determined by the sub fields defined between locations 24700 and 25600, inclusively.

The constant fields are defined within the second field. These constant fields shall remain constant throughout the program, and are not again considered by the firmware program.

Referring by way of example to the location 87100, a $ is shown followed by an address tag. An address tag in each instruction is required only if that instruction is addressed during a branch operation. If a step-by-step instruction incrementation occurs, however, then only the $ need occur in the tag field. The next field is a microinstruction field WER, which is followed by an operand field. The field next occurring to the right is a comment field which begins with a back slash mark and ends with a semicolon. Thus, each instruction begins with a $ and ends with a ;.

The hexidecimal equivalent of the tag field, microinstruction and operand fields occurs to the far right.

Relating the firmware listing more particularly with the electrical schematic diagrams of FIGS. 2a-2e, the bits 0 through 2 of the constant field at location 2700 correspond to the microprocessor control memory bits 0-2 applied to the B3-B1 inputs of the instruction decoder 141 of FIG. 2b. The constant field at location 2800 provides a means by which data maybe loaded into the microprocessor 110. The field of four bits correspond to the microprocessor control memory bits supplied by the firmware control system to lines 188-191 of FIG. 2e. The microprocessor input data bits at the output of AND nodes 270, 272, 274, 274 and 276 are applied to the data input of the microprocessor 110.

Referring to location 2900, bit 7 of the inhibit sub field corresponds to the microprocessor control memory bit on line 188 of FIG. 2e. Referring to location 3000, the ALU data control field which begins with bit 19 is used as a check code to insure that other instructions are not written incorrectly. Referring to location 3100, the inhibit microprocessor file write field refers to five bits beginning with bit 20. These bits correspond to the microprocessor control memory bits 20 through 24 applied respectively to lines 120, 119, 126, 125 and 129 of FIG. 2b. This constant field serves to fill in bits within an indicated field to preserve information that is already in the microprocessor 110, and is used only in the execution of branch instructions.

Referring to location 3200, the inhibit external RAM and input buffer file read fields include three bits beginning with bit 25. These bits correspond to microprocessor control memory bits 25-27 which are provided at the D3, D2 and D1 outputs of PROM 182 of FIG. 2c. At location 3300, the inhibit external RAM constant field is comprised of bit 25 only, which is the microprocessor control memory bit 25 provided at the D3 output of PROM 182.

The three bits of the IFRFLD constant field at location 3200 of the firmware program enable the output of RAMs 26, 30 and 134. The bit 25 of the IERFLD constant field at location 3300 enables the output of RAM 134 only. The all bits field at location 3400 comprises all 28 bits of the control memory provided by PROMs 180-186. This constant field is used to set unused memory locations to zero.

The argument definition FA field at location 4700 of the firmware program selects the A file address of the RAM A memory within the microprocessor 110. The FB field at location 5400 selects the B file of the RAM B memory within the microprocessor 110. The FA field bits are applied to the RA1-RA4 inputs of the microprocessor, and the FB field bits are applied to the RB1-RB4 inputs of the microprocessor.

The OPFLD argument definition field at location 8300 has a divided 7-bit field: bit 3 and bits 16 thru 21. Each of these bits correspond to microprocessor control memory bits leading to the inputs of the microprocessor 110, and controls the ALU logic within the microprocessor.

Referring to locaton 17200, the FDFLD argument definition field includes three bits beginning with bit 22. These bits correspond to the microprocessor control memory bits 22, 23 and 24. Bits 22 and 23 are provided at the D2 and D1 outputs of PROM 181 of FIG. 2c, and bit 24 is provided at the D4 output of PROM 182. A right shift operation is indicated when bit 22 is at a logic one level, and bits 23 and 24 are at a logic zero level. A data bit received from DCE 16 thereby is shifted into the microprocessor 110. When bits 22, 23, and 24 each are at the logic one level, a left shift is indicated, and a receive bit is not shifted into the microprocessor 110. Any other combination of bits 22 and 23 merely inhibit the driver 127 as long as bit 24 is a logic one.

Referring to location 18500 of the firmware program of Appendix A, the RAFLD argument definition field includes four microprocessor control memory bits beginning with bit 8. The RA stands for the external RAM address, and refers to RAM 134. The microprocessor control memory bits 8-11 are provided respectively at the D4, D3, D2 and D1 outputs of PROM 185. The bits select a write address when information is being written into the RAM 134, and a read address when the information is being read from the RAM 134.

Referring to location 19900, the OBFFLD argument definition field refers to four microprocessor control memory bits 8-11 which are applied to the inputs of RAMs 26, 30, 34 and 35. More particularly, bit 8 is applied to the L2 input of RAM 34, bit 9 to the SEL 1 inputs of RAMs 26 and 30, bit 10 to the L1 input of RAM 34 and bit 11 to the L1 input of RAM 35.

At location 21200, an input buffer file field is shown which has a divided 4-bit field comprising microprocessor control memory bits 8, 9 and 26, 27 which are applied to the RAMs 26 and 30. More particularly, bits 8 and 9 are applied to the SEL 2 and SEL 1 inputs respectively of RAM 26 and RAM 30 of FIG. 2a. Bit 26 is applied to the F enable input of RAM 26, and bit 27 is applied to the F enable input of RAM 30.

Referring to location 22800 of the firmware program, a TSTFLD argument defination field is comprised of three bits beginning with bit 4. These bits correspond to the microprocessor control bits 4-6, which are applied respectively to lines 191, 190 and 189 of FIG. 2e to provide select control signals for the multiplexer 137. Referring to location 24700, the SUBFLD argument definition field also is comprised of the microprocessor control memory bits 4-6. The bits of the sub field argument definition field are applied to lines 191, 190 and 189 of FIG. 2e to provide inputs to decoder 154 of FIG. 2b.

The above-described fields are used in the definition of each of the microinstructions of locations 26000 through 27400. In the fields of each instruction, those numerals followed by the letter C are octal numbers, and those followed by the symbol # are hexidecimal numbers. Each of the instructions have a variable field known as the argument definition field, and a constant field. All of the instructions except for the TAMN instruction are single-cycle instructions. The TAMN instruction, however, is a two-cycle instruction in that execution of the next instruction is effected by the outcome of the TAMN instruction.

In loading an instruction set into the PROMs 180-186, each of the instructions are dispersed throughout the PROMs. More particularly, referring to location 75300 and the hexidecimal image field indicated therein, the letter C comprising bits 0-3 is located in PROM 183. The letter F comprising bits 4-7 is located in PROM 184, the hex numeral 2 in PROM 185, the hex numeral 0 in PROM 106, the F in PROM 180, the C in PROM 181 and the B is located in PROM 182. D4 output of each PROM is the leftmost bit, and the D1 output is the rightmost bit. By way of example, if the third hexadecimal digit is a D as shown in location 31100, the D4 through D1 outputs of PROM 185 have a logic level order of 1101, respectively.

Having described the invention in connection with certain specific embodiments thereof, it is to be understood that further modifications may now suggest themselves to those skilled in the art and it is intended to cover such modifications as fall within the scope of the appended claims.

```
                        PARAMETER SECTION

100      PARAMETERS    \TAB COLON ,7,12,19,27,44\;
200      MODEL HDLC-EIA-FIRMWARE-REV-00;
300          ROMDEF MAIN,28,1024,,$$ROS;
400      \ROS MICROINSTRUCTIONS.
500      MICROINSTRUCTIONS ARE CONTROLLED BY THE ROS WORD TYPE
600      FIELD (WTFLD). THEIR MNEMONICS ARE AS FOLLOWS
700
800          NAME  VALUE   DEFINITION
900          SC     0      SUBCOMMAND
1000         WER    1      WRITE EXTERNAL RAM
1100         WOB    2      WRITE OUTPUT BUFFER
1200         TAMN   3      TEST AND MODIFY NEXT MICRO
1300         MMP    4      MODIFY MICROPROCESSOR
1400         RIB    5      READ INPUT BUFFER
1500         RER    6      READ EXTERNAL RAM
1600         BR     7      BRANCH
1700         BRSC   7      BRANCH AND EXECUTE SUBCOMMAND\
1800
1900     \BRANCHFIELDS.
2000     THE VALUE OF THE BRANCHFIELD IS EQUAL TO THE VALUE OF THE
2100     ABSOLUTE ADDRESS OF THE ROS MICROINSTRUCTION BRANCHED TO.\
2200
2300         BRCHFLD  BRADDR,ABS,10/10;
2400
2500     \CONSTANT FIELD.\
2600
2700         CNSTFLD WTFLD ,0/3     \ROS WORD TYPE FIELD\;
2800         CNSTFLD K , 4/4        \ROS CONSTANT-4 BITS\;
2900         CNSTFLD ISCFLD , 7/1   \INHIBIT SUE FIELD\;
3000         CNSTFLD DCONFLD , 19/2 \ALU DATA CONTROL FIELD\;
3100         CNSTFLD IFWFLD , 20/5  \INHIBIT MICROPROCESSOR FILE WRITE\;
3200         CNSTFLD IFRFLD , 25/3  \INH EXT RAM AND IB FILE READ IF =7\;
3300         CNSTFLD IERFLD , 25/1  \INHIBIT EXTERNAL RAM\;
3400         CNSTFLD ALLBITS , 0/28 \FOR SETTING UNUSED LOCATIONS TO ZERO\;
3500
3600
3700     \MICROPROCESSOR REGISTER FILE.
3800
3900     THE MICROPROCESSOR CONTAINS A 16X4 DUAL PORT REGISTER
4000     FILE WHICH IS ADDRESSED BY ROS BITS 8-15.
4100
4200         BITS 8-11   FA  SELECTS THE A FILE ADDRESS
4300         BITS 12-15  FB  SELECTS THE B FILE ADDRESS
4400
4500     INFORMATION IS WRITTEN INTO THE MICROPROCESSOR FILE
4600     REGISTER SPECIFIED BY THE B FILE ADDRESS (FB)\
4700         ARGDEF      FAFLD   (8/4)
4800
4900         A0 /0#    A4 /4#    A8 /8#    AC /C#
5000         A1 /1#    A5 /5#    A9 /9#    AD /D#
5100         A2 /2#    A6 /6#    AA /A#    AE /E#
5200         A3 /3#    A7 /7#    AB /B#    AF /F#    ;
5300
5400         ARGDEF      FBFLD   (12/4)
5500
5600         B0 /0#    B4 /4#    B8 /8#    BC /C#
5700         B1 /1#    B5 /5#    B9 /9#    BD /D#
5800         B2 /2#    B6 /6#    BA /A#    BE /E#
5900         B3 /3#    B7 /7#    BB /B#    BF /F#    ;
6000     \MICROPROCESSOR ALU SOURCE OPERANDS AND FUNCTIONS.
6100
6200     THE MICROPROCESSOR CAN PERFORM LOGICAL AND ARITHMETIC
6300     FUNCTIONS ON ITS REGISTER FILE CONTENTS (ADDRESSED BY FA
6400     AND FB), ITS 4 BIT INTERNAL Q-REGISTER (Q), AND/OR A 4 BIT
6500     EXTERNAL DATA INPUT. THE EXTERNAL DATA IS EQUAL TO A 4 BIT
6600     BIT ROS CONSTANT FIELD (K) OR THE OUTPUT OF AN EXTERNAL REGISTER
6700     WHOSE ADDRESS IS CONTROLLED BY THE ROS MICROINSTRUCTION
6800     BEING EXECUTED.
6900         THE INTERNAL ALU FUNCTION TO BE PERFORMED IS CONTROLLED BY THE
7000     MICROPROCESSOR OPERATION FIELD (OPFLD). THE RESULTING ALU
7100     OUTPUT AND THE Q-REGISTER CAN BE SHIFTED LEFT OR RIGHT IF DESIRED
7200     UNDER THE CONTROL OF THE FILE DESTINATION FIELD
7300     (FDFLD). SHIFTING IS RESTRICTED TO DOUBLE PRECISION (8-BITS)
7400     WITH THE Q-REGISTER AND B FILE ADDRESS ALWAYS STORING THE
7500     RESULT.
7600         THE ALU FUNCTION OUTPUT CAN BE DELIVERED TO AN EXTERNAL
7700     REGISTER UNDER THE CONTROL OF THE ROS MICRO. THE SHIFTED
7800     RESULT CAN BE STORED ONLY INTERNALLY. THE "A" DATA
7900     OUTPUT CANNOT BE DELIVERED TO AN EXTERNAL REGISTER.\
```

PARAMETER SECTION

```
5000
8100            \ALU LOGIC AND ARITHMETIC FUNCTIONS. \
9200
8300            ARGDEF  OPFLD (3/1,16/6)
8400            \LOGICAL FUNCTIONS\
5500
5600            AORQ       /30C         \A LOGICAL OR Q\
8700            AORB       /31C         \A LOGICAL OR B\
8800            AANDQ      /40C         \A AND Q\
8900            AANDB      /41C         \A AND B\
9000            ANOTANDQ   /50C         \A NOT AND Q\
9100            ANOTANDB   /51C         \A NOT AND B\
9200            AXORQ      /60C         \A EXCLUSIVE OR Q\
9300            AXORB      /61C         \A EXCLUSIVE OR B\
9400            AXNORQ     /70C         \A EXCLUSIVE NOR Q\
9500            AXNORB     /71C         \A EXCLUSIVE NOR B\
9600
9700            DORA       /35C         \D OR A\
9800            DORQ       /36C         \D OR Q\
9900            DANDA      /45C         \D AND A\
10000           DANDQ      /46C         \D AND Q\
10100           DNOTANDA   /55C         \D NOT AND A\
10200           DNOTANDQ   /56C         \D NOT AND Q\
10300           DXORA      /65C         \D EXCLUSIVE OR A\
10400           DXORQ      /66C         \D EXCLUSIVE OR Q\
10500           DXNORA     /75C         \D EXCLUSIVE NOR A\
10600           DXNORQ     /76C         \D EXCLUSIVE NOR Q\
10700
10800           NOTQ       /72C         \Q INVERTED\
10900           NOTB       /73C         \B INVERTED\
11000           NOTA       /74C         \A INVERTED\
11100           NOTD       /77C         \D INVERTED\
11200
11300           ALUZ       /42C         \FORCE ALU OUTPUT TO ZERO\
11400
11500           \ARITHMETIC FUNCTIONS\
11600
11700           APQ        /00C         \A+Q\
11800           APB        /01C         \A+B\
11900           DPA        /05C         \D+A\
12000           DPQ        /06C         \D+Q\
12100
12200           Q          /02C         \PASS Q\
12300           B          /03C         \PASS B\
12400           A          /04C         \PASS A\
12500           D          /07C         \PASS D\
12600
12700           Q1C        /22C         \Q 1'S COMP.\
12800           B1C        /23C         \B 1'S COMP.\
12900           A1C        /24C         \A 1'S COMP.\
13000           D1C        /17C         \D 1'S COMP.\
13100
13200           Q2C        /122C        \Q 2'S COMP.\
13300           B2C        /123C        \B 2'S COMP.\
13400           A2C        /124C        \A 2'S COMP.\
13500           D2C        /117C        \D 2'S COMP.\
13600
13700           QM1        /12C         \Q-1\
13800           BM1        /13C         \B-1\
13900           AM1        /14C         \A-1\
14000           DM1        /27C         \D-1\
14100
14200           QP1        /102C        \Q+1\
14300           BP1        /103C        \B+1\
14400           AP1        /104C        \A+1\
14500           DP1        /107C        \D+1\
14600
14700           QMA        /110C        \Q-A\
14800           BMA        /111C        \B-A\
14900           AMD        /115C        \A-D\
15000           QMD        /116C        \Q-D\
15100           AMQ        /120C        \A-Q\
15200           AMB        /121C        \A-B\
15300           DMA        /125C        \D-A\
15400           DMQ        /126C        \D-Q\;
15500
15600
15700           \MICROPROCESSOR ALU DESTINATION CONTROL
15800  THE ALU OUTPUT OF THE MICROPROCESSOR WILL UNCONDITIONALLY
15900  GO TO ONE OF 4 PLACES INTERNALLY.
16000           MNEMONIC
16100
16200           QR   - ALU OUTPUT TO THE Q REGISTER.
16300           FR   - ALU OUTPUT TO THE FILE REGISTER.
16400           SRQF - ALU AND Q SHIFTED RIGHT (1) TO Q AND THE FILE.
16500                  THE RC DATA SHIFTS INTO THE MSB OF THE Q REG.
16600           SLQF - ALU AND Q ARE SHIFTED LEFT (1) TO Q AND THE FILE.
16700                  AN UNDEFINED IS SHIFTED INTO THE LSB OF FILE.
16800
16900                  IF NO MICROPROCESSOR REGISTER IS SPECIFIED THE
17000                  DEFAULT VALUE WILL UNCONDITIONALLY LOAD Q. \
17100
17200           ARGDEF FDFLD (22/3)
17300
17400           QR   /1C
17500           FR   /3C
17600           SRQF /4C
17700           SLQF /7C;
17800
17900           \ADDRESSING THE EXTERNAL RAM.
```

PARAMETER SECTION

```
18000        THE EXTERNAL RAM IS A 16X4 MEMORY USED AS AN
18100    EXTENSION OF THE MICROPROCESSOR REGISTER FILE.  IT IS WRITTEN
18200    AND READ BY USING THE WER AND RER MICROINSTRUCTIONS RESPECTIVELY.
18300    THE RAM ADDRESS IS CONTROLLED BY THE RAFLD IN THESE INSTRUCTIONS.\
18400
18500        ARGDEF RAFLD (8/4)
18600        R0 /0#     R4 /4#     R8 /8#     RC /C#
18700        R1 /1#     R5 /5#     R9 /9#     RD /D#
18800        R2 /2#     R6 /6#     RA /A#     RE /E#
18900        R3 /3#     R7 /7#     RB /B#     RF /F#     ;
19000
19100        \OUTPUT BUFFER FILE.
19200
19300        THE OUTPUT BUFFER FILE IS AN 8X4 REGISTER FILE
19400    USED TO STORE THE RECEIVE DATA BYTE AND THE TRANSMIT/RECEIVE
19500    STATUS.  THIS FILE IS WRITTEN FROM THE MICROPROCESSOR AND
19600    IS READ DIRECTLY BY THE MLCP OR HMLC.  THE WRITE ADDRESS IS
19700    CONTROLLED BY THE OBFFLD OF THE WOB MICROINSTRUCTION.\
19800
19900        ARGDEF OBFFLD (8/4)
20000
20100        WSTS /1#     \WRITE OUTPUT STATUS REGISTER.\
20200        WRDL /9#     \WRITE RECEIVE DATA LEFT HALF.\
20300        WRDR /A#     \WRITE RECEIVE DATA RIGHT HALF.\;
20400
20500        \INPUT BUFFER FILE.
20600        THE INPUT BUFFER FILE IS AN 8X4 REGISTER FILE USED TO STORE
20700    THE TRANSMIT DATA BYTE AND THE TRANSMIT/RECEIVE CONTROL
20800    WORDS.  THIS FILE IS WRITTEN DIRECTLY BY THE MLCP OR HMLC AND
20900    IS READ BY THE MICROPROCESSOR.  THE FILE READ ADDRESS IS
21000    CONTROLLED BY THE IBFFLD OF THE RIB MICROINSTRUCTION.\
21100
21200        ARGDEF IBFFLD (8/2,26/2)
21300        RTRC /5#     \READ TRANSMIT CONTROL WORD\
21400        RRCC /6#     \READ RECEIVE CONTROL WORD.\
21500        RTDL /9#     \READ TRANSMIT DATA LEFT HALF.\
21600        RTDR /A#     \READ TRANSMIT DATA RIGHT HALF.\;
21700
21800        \HDLC TEST FUNCTIONS.
21900        THE TEST AND MODIFY NEXT MICRO (TAMN)
22000    ALLOWS A HARDWARE FUNCTION TO BE TESTED AND THE RESULT
22100    SAVED FOR THE NEXT MICROINSTRUCTION.  IF THE TEST RESULT IS
22200    TRUE AND THE NEXT MICRO IS A BRANCH THEN THE BRANCH WILL
22300    NOT BE MADE (I.E. INC ROS ADDRESS).  ALSO IF THE TEST
22400    IS TRUE ANY MICROCOMMANDS EXTERNAL TO THE MICROPROCESSOR
22500    WILL BE INHIBITED.  THE FUNCTION TO BE TESTED IS SELECTED
22600    BY THE ROS TEST FIELD (TSTFLD).\
22700
22800        ARGDEF TSTFLD (4/3)
22900
23000            \BRANCH AND/OR EXECUTE NEXT IF\
23100
23200        TRDBE  /0C    \TRANSMIT BUFFER EMPTY =1\
23300        RCRSYN /1C    \RECEIVE RESYNC =1\
23400        TRSRQ  /2C    \TRANSMIT SERVICE REQUEST =0\
23500        RCSRQ  /3C    \RECEIVE SERVICE REQUEST =0\
23600        TRRDY  /4C    \TRANSMIT READY =0\
23700        RCRDY  /5C    \RECEIVER READY =0\
23800        ALUEZ  /6C    \ALU OUTPUT EQUALS ZERO.\
23900        CTSVTM /7C    \CLEAR TO SEND AND TEST MODE =0\;
24000
24100        \HDLC SUBCOMMANDS.
24200        HDLC SUBCOMMANDS ARE USED TO SET AND RESET HARDWARE CONTROL
24300    REGISTERS, LOAD THE TRANSMIT DATA BUFFER, AND TO GENERATE A
24400    TEST SYNC\
24500
24600
24700        ARGDEF SUBFLD (4/3)
24800
24900        STRDBE /0C    \SET TRANSMIT DATA BUFFER EMPTY.\
25000        RSRCRS /1C    \RESET RECEIVE RESYNC\
25100        STRSRQ /2C    \SET TRANSMIT SERVICE REQUEST.\
25200        SRCSRQ /3C    \SET RECEIVE SERVICE REQUEST.\
25300        RSTRRY /4C    \RESET TRANSMIT READY.\
25400        RSRCRY /5C    \RESET RECEIVE READY.\
25500        WRTRBB /6C    \WRITE TRANSMIT BIT BUFFER.\
25600        TSTSYN /7C    \GENERATE TEST SYNC PULSE.\;
```

DICTIONARY SECTION

```
25700
25800    DICTIONARY:
25900
26000    MICRO SC      (SUBFLD,FAFLD,FBFLD,OPFLD,FDFLD)
26100                  (WTFLD/0,ISCFLD/0,IFRFLD/7);
26200    MICRO WER     (RAFLD,FBFLD,OPFLD,FDFLD) (WTFLD/1,K/F#,DCONFLD/1,
26300                  IFRFLD/3);
26400    MICRO WOB     (K,OBFFLD,FBFLD,OPFLD,FDFLD) (WTFLD/2,IFRFLD/7);
26500    MICRO TAMN    (TSTFLD,FAFLD,FBFLD,DPFLD,FDFLD) (WTFLD/3,IFRFLD/7);
26600    MICRO MMP     (K,FAFLD,FBFLD,OPFLD,FDFLD) (WTFLD/4,IFRFLD/7);
26700    MICRO RIB     (IBFFLD,FBFLD,OPFLD,FDFLD) (WTFLD/5,K/F#,DCONFLD/3,
26800                  IERFLD/1);
26900    MICRO RER     (RAFLD,FBFLD,OPFLD,FDFLD) (WTFLD/6,K/F#,DCONFLD/3,
27000                  IFRFLD/3);
27100    MICRO BR      (BRADDR) (WTFLD/7,ISCFLD/1,IFWFLD/1,IFRFLD/7);
27200    MICRO BRSC    (BRADDR,SUBFLD) (WTFLD/7,ISCFLD/0,IFWFLD/1,
27300                  IFRFLD/7);
27400    MICRO ZERO    (ALLBITS/0000000#);
27500
27600
27700 SKIP HOF
```

DICTIONARY SECTION

```
27800
27900            \**** FIRMWARE REVISION LEVEL NOTES ****\
28000
28100
28200       \THE FIRMWARE REVISION LEVEL IS GENERATED IN
28300   THE OFF STATE CODING OF THE RECEIVE FLUSH CONTROL
28400   ROUTINE WHENEVER AN IDLE LINK STATE STATUS IS REPORTED.
28500   THIS EIGHT-BIT WORD IS LOADED INTO THE RECEIVE DATA BUFFER (RDB)
28600   TO BE READ BY THE USER.  BITS 0,1, AND 2 SPECIFY THE
28700   DECIMAL FRACTIONAL VALUE, AND BITS 3,4,5,6, AND 7
28800   SPECIFY THE WHOLE NUMBER VALUE.  AS AN EXAMPLE, A GENERATED
28900   REVISION OF 93 HEX (10010011) TRANSLATES INTO A REVISION
29000   OF 19.4 DECIMAL.\
29100
29200            \** CURRENT REVISION LEVEL..... 2.0 **\;
```

MICROPROGRAM SECTION

```
                                                    SEQUENCE: SSROS            ADDRESS   IMAGE
                                                                               (HEX)     (HEX)
29300
29400
29500
29600       MICROPROGRAM;
29700
29800            SSROS;
29900
30000            \***************************\
30100            \**                       **\
30200            \**  INITIALIZATION ROUTINE **\
30300            \**                       **\
30400            \***************************\
30500
30600
30700   SINITZ00   (000#)                                                       000    E100 10F
30800              BR       (SINITZ01)             \BR TO ADDRESS 1\;
30900   SINITZ01   WOB      (0,WSTS,B0,ALUZ,QR)    \RESET LR5\;                 001    4010 88F
31000   SINITZ04   MMP      (8,A0,B0,D,FR)         \LOAD 8 TO F0\;              002    8800 1DF
31100              WER      (R0,B0,B,QR)           \SET TBSC =8\;               003    2F80 OCB
31200   SINITZ07   WER      (R9,B0,ALUZ,QR)        \SET TFRCSTATE =OFF\;        004    2F90 88B
31300    $         MMP      (9#,A0,B0,D,QR)        \LOAD 9\;                    005    8900 1CF
31400   SINITZ08   WER      (RB,B0,Q,QR)           \SET TSRCSTATE =IDLE I\;     006    2FB0 08B
31500    $         MMP      (F#,A0,B0,D,QR)        \LOAD F\;                    007    8F00 1CF
31600   SINITZ09   WER      (RE,B0,Q,QR)           \SET TSR.RH =ABORT\;         008    2FE0 08B
31700   SINITZ10   WER      (RF,B0,Q,QR)           \SET TSR.LH =ABORT\;         009    2FF0 08B
31800    $         MMP      (0#,A7,B7,D,FR)        \SET RDBFFLG,TDBEFLG,        00A    8077 1DF
31900                                               RREQFLG,TREQFLG =0,0,0,0\;
32000    $         SC       (RSRCRY,A0,B0,Q,QR)    \RESET RC READY\;            00B    0A00 08F
32100    $         MMP      (0#,AF,BF,D,FR)        \SET RFR.LH =0000\;          00C    80FF 1DF
32200    $         MMP      (0#,AE,BE,D,FR)        \SET RFR.RH =0000\;          00D    80EE 1DF
32300    $         MMP      (8#,A4,B4,D,FR)        \SET RSRCSTATE =FIRST\;      00E    8844 1DF
32400    $         MMP      (8#,A6,B6,D,FR)        \SET RBSC =J(8)\;            00F    8866 1DF
32500    $         BRSC     (SINITZ16,STROBE)      \SET TRDBE.                  010    E001 20F
32600                                               BR TO RC INIT ROUTINE\;
32700
32800
32900   SKIP HOF;
33000
33100            \***************************\
33200            \**                       **\
33300            \**  RECEIVE INITIALIZATION ROUTINE **\
33400            \**                       **\
33500            \***************************\
33600
33700
33800   SINITZ15   MMP      (7#,A4,B4,D,FR)        \SET RSRCSTATE =OUTASYNC\;   011    8744 1DF
33900   SINITZ16   MMP      (5,A7,B7,DANDA,FR)     \RESET RCDBFFLG, RCREQFLG\;  012    8577 95F
34000    $         MMP      (0,A3,B3,ALUZ,FR)      \SET RFCSTATE =OFF\;         013    8033 89F
34100   SINITZ20   MMP      (3,A0,B2,D,FR)         \RESET RBFC, SET R3AC =3\;   014    8302 1DF
34200   SINITZ21   WER      (R5,B0,ALUZ,QR)        \RESET ROSD, RDHBT,          015    2F50 88B
34300                                               RILS, RILSFLG\;
34400    $         SC       (RSRCRS,A0,B0,ALUZ,FR) \RESET RCRSYN, SET F0 =0\;   016    0200 89F
34500    $         WER      (R6,B0,8,QR)           \INIT RC FLAGS REG\;         017    2F60 0CB
34600
34700
34800   SKIP HOF;
34900
35000            \***************************\
35100            \**                       **\
35200            \**  IDLE PROCESSING ROUTINE **\
35300            \**                       **\
35400            \***************************\
35500
35600
35700            \****** SHIFT REGISTER CONTROL ******\
35800
35900
36000   SIDLE000   TAMN     (RCRDY,A0,B0,Q,QR)     \TEST RC READY\;             018    6A00 08F
36100    $         BR       (SIDLE005)             \BI RESET (NOT READY)\;      019    E101 80F
36200    $         BRSC     (SRCSR000,RSRCRY)      \RESET RCRDY, BI SET\;       01A    EA16 10F
36300
36400   SIDLE005   TAMN     (TRRDY,A0,B0,Q,QR)     \TEST TR READY\;             01B    6800 08F
36500    $         BR       (SIDLE010)             \BI RESET (NOT READY)\;      01C    E101 E0F
36600    $         BRSC     (STRSRC00,RSTRRY)      \RESET TRRDY, BI SET\;       01D    E806 40F
36700
36800
36900   SIDLE010   TAMN     (TRSRQ,A0,B0,Q,QR)     \TEST TR SERVICE REQUEST\;   01E    6400 08F
37000    $         BR       (SIDLE015)             \BI TRSRQ RESET\;            01F    E102 10F
37100    $         BR       (SIDLE600)             \BI TRSRQ SET\;              020    E105 40F
37200   SIDLE015   TAMN     (RCSRQ,A0,B0,Q,QR)     \TEST RC SERVICE REQUEST\;   021    6600 08F
```

MICROPROGRAM SECTION
SEQUENCE: SSROS

| Line | Label | Op | Operands | Comment | Address (HEX) | Image (HEX) |
|---|---|---|---|---|---|---|
| 37300 | S | BR | (SIDLE200) | \BI RCSRQ RESET\; | 022 | E102 40F |
| 37400 | S | BR | (SIDLE700) | \BI RCSRQ SET\; | 023 | E105 FOF |
| 37500 | | | | | | |
| 37600 | | | | | | |
| 37700 | | | | | | |
| 37800 | | | \****** DATA TRANSFER REQUEST CONTROL ******\ | | | |
| 37900 | | | | | | |
| 38000 | | | | | | |
| 38100 | | | \TRSRQ AND RCSRQ BOTH RESET\ | | | |
| 38200 | SIDLE200 | TAMN | (RCRSYN,A0,B0,Q,QR) | \TEST RC RESYNC\; | 024 | 6200 08F |
| 38300 | S | BR | (SIDLE260) | \BI SET\; | 025 | E103 80F |
| 38400 | | | | | | |
| 38500 | | | \RECEIVE RESYNC RESET\ | | | |
| 38600 | S | MMP | (1#,A7,B7,DANDA,QR) | \EXTRACT TREQFLG\; | 026 | 8177 94F |
| 38700 | S | TAMN | (ALUEZ,A0,B0,Q,QR) | \TEST TREQFLG\; | 027 | 6C00 08F |
| 38800 | S | BR | (SIDLE240) | \BI =0\; | 028 | E103 00F |
| 38900 | | | | | | |
| 39000 | | | \TREQFLG =1\ | | | |
| 39100 | S | TAMN | (CTSVTM,A0,B0,Q,QR) | \TEST FOR CTS OR TEST MODE\; | 029 | 6E00 08F |
| 39200 | S | BR | (SIDLE220) | \BI RESET\; | 02A | E102 C0F |
| 39300 | | | \CTSVTM SET\ | | | |
| 39400 | S | BR | (STDRC000) | \GO TO TDRC ROUTINE\; | 02B | E114 80F |
| 39500 | | | \CTSVTM RESET\ | | | |
| 39600 | SIDLE220 | MMP | (8#,A7,B7,DANDA,QR) | \EXTRACT RDBFFLG\; | 02C | 8877 94F |
| 39700 | S | TAMN | (ALUEZ,A0,B0,Q,QR) | \TEST RDBFFLG\; | 02D | 6C00 08F |
| 39800 | S | BR | (SIDLE500) | \BI =0\; | 02E | E103 E0F |
| 39900 | S | BR | (SRDRC000) | \BI =1\; | 02F | E12C E0F |
| 40000 | | | | | | |
| 40100 | | | \TREQFLG =0\ | | | |
| 40200 | SIDLE240 | MMP | (8#,A7,B7,DANDA,QR) | \EXTRACT RDBFFLG\; | 030 | 8877 94F |
| 40300 | S | TAMN | (ALUEZ,A0,B0,Q,QR) | \TEST RDBFFLG\; | 031 | 6C00 08F |
| 40400 | S | BR | (SIDLE260) | \BI =0\; | 032 | E103 80F |
| 40500 | | | \RDBFFLG =1\ | | | |
| 40600 | S | MMP | (4#,A7,B7,DANDA,QR) | \EXTRACT TDBEFLG\; | 033 | 8477 94F |
| 40700 | S | TAMN | (ALUEZ,A0,B0,Q,QR) | \TEST TDBEFLG\; | 034 | 6C00 08F |
| 40800 | S | BR | (SRDRC000) | \GO TO RDRC ROUTINE IF =0\; | 035 | E12C E0F |
| 40900 | | | \TDBEFLG =1\ | | | |
| 41000 | S | MMP | (1#,A7,B7,DORA,FR) | \SET TREQFLG =1\; | 036 | 8177 75F |
| 41100 | S | BR | (SRDRC000) | \GO TO RDRC ROUTINE\; | 037 | E12C E0F |
| 41200 | | | | | | |
| 41300 | | | \RECEIVE RESYNC SET, OR TREQFLG =0 AND RDBFFLG =0\ | | | |
| 41400 | SIDLE260 | TAMN | (CTSVTM,A0,B0,Q,QR) | \TEST FOR CTS OR TEST MODE\; | 038 | 6E00 08F |
| 41500 | S | BR | (SIDLE500) | \BI RESET\; | 039 | E103 E0F |
| 41600 | | | \CTSVTM SET\ | | | |
| 41700 | S | MMP | (4#,A7,B7,DANDA,QR) | \EXTRACT TDBEFLG\; | 03A | 8477 94F |
| 41800 | S | TAMN | (ALUEZ,A0,B0,Q,QR) | \TEST TDBEFLG\; | 03B | 6C00 08F |
| 41900 | S | BR | (SIDLE500) | \BI =0\; | 03C | E103 E0F |
| 42000 | S | BR | (STDRC000) | \GO TO TDRC ROUTINE IF =1\; | 03D | E114 80F |
| 42100 | | | | | | |
| 42200 | | | | | | |
| 42300 | | | | | | |
| 42400 | | | \****** STATUS TRANSFER REQUEST CONTROL ******\ | | | |
| 42500 | | | | | | |
| 42600 | | | | | | |
| 42700 | | | \** TRSRQ RESET, RCSRQ RESET, NO DATA TRANSFER REQUESTS **\ | | | |
| 42800 | | | | | | |
| 42900 | SIDLE500 | TAMN | (RCRSYN,A0,B0,Q,QR) | \TEST RC RESYNC\; | 03E | 6200 08F |
| 43000 | S | BR | (SIDLE505) | \BI SET\; | 03F | E104 10F |
| 43100 | S | BR | (SRCFCR00) | \GO TO RFC ROUTINE IF RESET\; | 040 | E120 10F |
| 43200 | | | | | | |
| 43300 | | | \RECEIVE RESYNC SET\ | | | |
| 43400 | SIDLE505 | RIB | (RRCC,B0,D,QR) | \READ RC CONTROL WORD\; | 041 | AF40 1CE |
| 43500 | S | MMP | (1#,A0,B0,DANDQ,QR) | \EXTRACT RRO\; | 042 | 8100 98F |
| 43600 | S | TAMN | (ALUEZ,A0,B0,Q,QR) | \TEST RRO\; | 043 | 6C00 08F |
| 43700 | S | BR | (SIDLE560) | \BI =0 (NO OVERRIDE)\; | 044 | E105 00F |
| 43800 | | | | | | |
| 43900 | | | \RECEIVE RESYNC OVERRIDE =1 (OVERRIDE)\ | | | |
| 44000 | S | TAMN | (ALUEZ,A3,B3,AM1,QR) | \TEST RFCSTATE\; | 045 | 6C33 30F |
| 44100 | S | BR | (SIDLE540) | \BI =RESET STATUS (1)\; | 046 | E104 80F |
| 44200 | | | \RFCSTATE NOT=RESET STATUS, OR | | | |
| 44300 | | | RFCSTATE =RESET STATUS AND ROSD =1\ | | | |
| 44400 | SIDLE520 | RER | (R9,B0,NOTD,FR) | \READ TFRCSTATE TO F0\; | 047 | CF90 FDB |
| 44500 | S | TAMN | (ALUEZ,A0,B0,A,QR) | \TEST TFRCSTATE\; | 048 | 6C00 10F |
| 44600 | S | BRSC | (SIDLE000,RSRCRS) | \RESET RC RESYNC, DONE IF =OFF (0)\; | 049 | E201 80F |
| 44700 | | | | | | |
| 44800 | S | BRSC | (STFRC001,RSRCRS) | \RESET RC RESYNC AND GO TO TFRC ROUTINE IF NOT\; | 04A | E215 20F |
| 44900 | | | | | | |
| 45000 | | | \RFCSTATE =RESET STATUS\ | | | |
| 45100 | SIDLE540 | RER | (R5,B0,NOTD,QR) | \READ RC STATUS REG\; | 04B | CF50 FCB |
| 45200 | S | MMP | (8#,A0,B0,DANDQ,QR) | \EXTRACT ROSD\; | 04C | 8800 98F |
| 45300 | S | TAMN | (ALUEZ,A0,B0,Q,QR) | \TEST ROSD\; | 04D | 6C00 08F |
| 45400 | S | BR | (SRFRST08) | \GO TO RESET STATUS STATE IN RFC ROUTINE IF =0\; | 04E | E135 A0F |
| 45500 | | | | | | |
| 45600 | S | BR | (SIDLE520) | \BI =1\; | 04F | E104 70F |
| 45700 | | | | | | |
| 45800 | SIDLE560 | RER | (R9,B0,NOTD,FR) | \READ TFRCSTATE TO F0\; | 050 | CF90 FDB |
| 45900 | S | TAMN | (ALUEZ,A0,B0,A,QR) | \TEST TFRCSTATE\; | 051 | 6C00 10F |
| 46000 | S | BR | (SINIT215) | \GO TO RC INIT IF =OFF (0)\; | 052 | E101 10F |
| 46100 | S | BR | (STFRC001) | \GO TO TFRCROUTINE IF NOT\; | 053 | E115 20F |
| 46200 | | | | | | |
| 46300 | | | | | | |
| 46400 | | | \** TRSRQ SET (RCSRQ RESET) **\ | | | |
| 46500 | | | | | | |
| 46600 | SIDLE600 | TAMN | (RCRSYN,A0,B0,Q,QR) | \TEST RC RESYNC\; | 054 | 6200 08F |
| 46700 | S | BR | (SIDLE620) | \BI SET\; | 055 | E105 A0F |
| 46800 | | | | | | |
| 46900 | | | \RECEIVE RESYNC RESET\ | | | |
| 47000 | S | MMP | (4#,A0,B0,D,QR) | \SET QR =4\; | 056 | 8400 1CF |

MICROPROGRAM SECTION

SEQUENCE: SSROS

| | | | | ADDRESS (HEX) | IMAGE (HEX) |
|---|---|---|---|---|---|
| 47100 | S | TAMN (ALUEZ,A3,B3,AM0,QR) | \TEST RFCSTATE\; | 057 | 7C33 40F |
| 47200 | S | BR (SRFRJ000) | \GO TO RIGHT-JUSTIFY STATE | 058 | E12F B0F |
| 47300 | | | IN RFC ROUTINE IF | | |
| 47400 | | | R-J STATE (4)\; | | |
| 47500 | S | BR (SIDLE000) | \DONE IF NOT=RIGHT-JUSTIFY\; | 059 | E101 80F |
| 47600 | | | | | |
| 47700 | | \RECEIVE RESYNC SET\ | | | |
| 47800 | SIDLE620 | RIB (RRCC,B0,0,QR) | \READ RC CONTROL WORD\; | 05A | AF40 1CE |
| 47900 | | MMP (1#,A0,B0,DANDQ,QR) | \EXTRACT RRQ\; | 05B | 8100 98F |
| 48000 | S | TAMN (ALUEZ,A0,0,QR) | \TEST RRQ\; | 05C | 6C00 08F |
| 48100 | S | BR (SINITZ15) | \GO TO RC INIT IF =0\; | 05D | E101 10F |
| 48200 | S | BRSC (SIDLE000,RSRCRS) | \RESET RC RESYNC, DONE IF =1\; | 05E | E201 80F |
| 48300 | | | | | |
| 48400 | | | | | |
| 48500 | | | | | |
| 48600 | | \** RCSRQ SET (TRSRQ RESET) **\ | | | |
| 48700 | | | | | |
| 48800 | SIDLE700 | MMP (4#,A7,B7,DANDA,QR) | \EXTRACT TDBEFLG\; | 05F | 8477 94F |
| 48900 | S | TAMN (ALUEZ,A0,B0,0,QR) | \TEST TDBEFLG\; | 060 | 6C00 08F |
| 49000 | S | BR (SIDLE000) | \DONE IF =0\; | 061 | E101 80F |
| 49100 | | \TDBEFLG =1\ | | | |
| 49200 | S | MMP (1#,A7,B7,DORA,FR) | \SET TREQFLG =1\; | 062 | 8177 75F |
| 49300 | S | BR (SIDLE000) | \DONE\; | 063 | E101 80F |
| 49400 | | | | | |
| 49500 | SKIP HOF; | | | | |
| 49600 | | \*************************************\ | | | |
| 49700 | | \** **\ | | | |
| 49800 | | \** TRANSMIT SHIFT REGISTER CONTROL ROUTINE **\ | | | |
| 49900 | | \** **\ | | | |
| 50000 | | \*************************************\ | | | |
| 50100 | | | | | |
| 50200 | | | | | |
| 50300 | | \** INITIAL PROCESSING AND STATE SELECTION **\ | | | |
| 50400 | | | | | |
| 50500 | STRSRC00 | RER (RB,B0,NOTD,FR) | \READ TSRCSTATE TO F0\; | 064 | CFB0 FDB |
| 50600 | S | MMP (8#,A0,B0,DANDA,QR) | \EXTRACT MSB\; | 065 | 8800 94F |
| 50700 | S | TAMN (ALUEZ,A0,B0,0,QR) | \TEST MSB\; | 066 | 6C00 08F |
| 50800 | S | BR (STRFR000) | \BI =0 (NOT IDLE)\; | 067 | E106 90F |
| 50900 | S | BR (STRIDL00) | \BI =1 (IDLE I OR IDLE II)\; | 068 | E108 30F |
| 51000 | | | | | |
| 51100 | | | | | |
| 51200 | | \TSRCSTATE NOT=IDLE (TSRCSTATE MSB =0)\ | | | |
| 51300 | | | | | |
| 51400 | STRFR000 | RER (RC,B0,NOTD,FR) | \READ TSC TO F0\; | 069 | CFC0 FDB |
| 51500 | STRFR001 | RER (RE,B1,NOTD,FR) | \READ TSR.RH TO F1\; | 06A | CFE1 FDB |
| 51600 | STRFR002 | TAMN (ALUEZ,A0,B0,B,QR) | \TEST TSC =5 (0)\; | 06B | 6C00 0CF |
| 51700 | STRFR003 | BR (STRFR040) | \BR TO INSERT A ZERO\; | 06C | E107 EDF |
| 51800 | STRFR004 | RER (RD,B0,NOTD,QR) | \READ TBSC TO QR\; | 06D | CFD0 FCB |
| 51900 | STRFR005 | WER (RD,B0,QM1,QR) | \-1 TO TBSC\; | 06E | 2FD0 288 |
| 52000 | STRFR006 | MMP (1,A1,B0,DANDA,QR) | \EXTRACT LSB OF TSR\; | 06F | 8110 94F |
| 52100 | STRFR007 | SC (WRTRBB,A0,B0,QR) | \LOAD TSR07 TO TRBITB\; | 070 | 0C00 08F |
| 52200 | STRFR008 | TAMN (ALUEZ,A0,B0,0,QR) | \TEST TSR07 = 0\; | 071 | 6C00 08F |
| 52300 | STRFR009 | BR (STRFR050) | \BR TO RESET TSC\; | 072 | E107 F0F |
| 52400 | STRFR010 | WER (RC,B0,BP1,QR) | \UPDATE TSC, SAVE IN QR\; | 073 | 3FC0 0C8 |
| 52500 | STRFR011 | TAMN (ALUEZ,A0,B0,0,QR) | \TEST TSC =5 (0)\; | 074 | 6C00 08F |
| 52600 | STRFR012 | BR (SIDLE000) | \BR IF TSC =5 (0)\; | 075 | E101 80F |
| 52700 | | | | | |
| 52800 | | \CHECK BYTE BOUNDARY\; | | | |
| 52900 | | | | | |
| 53000 | STRFR020 | RER (RD,B0,NOTD,QR) | \READ TBSC TO QR\; | 076 | CFD0 FCB |
| 53100 | STRFR021 | TAMN (ALUEZ,A0,B0,0,QR) | \TBSC =0 IF BYTE BOUNDARY\; | 077 | 6C00 08F |
| 53200 | STRFR022 | BR (STRFR100) | \BR IF BYTE BOUNDARY\; | 078 | E108 20F |
| 53300 | | | | | |
| 53400 | | \NOT BYTE BOUNDARY - SHIFT TSR\; | | | |
| 53500 | | | | | |
| 53600 | STRFR030 | RER (RF,B0,NOTD,QR) | \LOAD TSR.LH TO QR\; | 079 | CFF0 FCB |
| 53700 | STRFR031 | MMP (0,A0,B1,B,SRQF) | \SHIFT TSR RIGHT 1\; | 07A | 8001 0E7 |
| 53800 | STRFR032 | WER (RF,B0,0,QR) | \RESTORE TSR.LH\; | 07B | 2FF0 088 |
| 53900 | STRFR033 | WER (RE,B1,B,QR) | \RESTORE TSR.RH\; | 07C | 2FE1 0C8 |
| 54000 | STRFR034 | BR (SIDLE000) | \DONE\; | 07D | E101 80F |
| 54100 | | | | | |
| 54200 | | \INSERT A ZERO - TSC =5\; | | | |
| 54300 | | | | | |
| 54400 | STRFR040 | SC (WRTRBB,A0,B0,ALUZ,QR) | \ZERO TO TRBITB AND QR\; | 07E | 0C00 88F |
| 54500 | | | | | |
| 54600 | | \RESET TSC THEN CHECK BYTE BOUNDARY\; | | | |
| 54700 | | | | | |
| 54800 | STRFR050 | MMP (B#,A0,B0,D,QR) | \LOAD B# TO QR\; | 07F | 8B00 1CF |
| 54900 | STRFR051 | WER (RC,B0,Q,QR) | \INIT TSC\; | 080 | 2FC0 088 |
| 55000 | STRFR052 | BR (STRFR020) | \BR TO CHECK TBSC\; | 081 | E107 60F |
| 55100 | | | | | |
| 55200 | | | | | |
| 55300 | | \BYTE BOUNDARY (TBSC =0, TSC NOT=5)\ | | | |
| 55400 | | | | | |
| 55500 | STRFR100 | RER (RB,B0,NOTD,FR) | \READ TSRCSTATE\; | 082 | CFB0 FDB |
| 55600 | S | TAMN (ALUEZ,A0,B0,A,FR) | \TEST TSRCSTATE\; | 083 | 6C00 11F |
| 55700 | S | BR (STRFR200) | \BI =TEXT (0)\; | 084 | E109 00F |
| 55800 | S | TAMN (ALUEZ,A0,B0,AM1,FR) | \TEST TSRCSTATE\; | 085 | 6C00 31F |
| 55900 | S | BR (STRFR200) | \BI =ADDRESS (1)\; | 086 | E109 00F |
| 56000 | | | | | |
| 56100 | | | | | |
| 56200 | | \TSRCSTATE NOT=ADDRESS, NOT=TEXT\ | | | |
| 56300 | | | | | |
| 56400 | | \(INITIALIZE TBSC, BRANCH PER TSRCSTATE.)\ | | | |
| 56500 | S | MMP (8,A0,B0,D,QR) | \LOAD AN 8 (TBSC)\; | 087 | 8800 1CF |
| 56600 | S | WER (RD,B0,Q,QR) | \SET TBSC =8\; | 088 | 2FD0 088 |
| 56700 | S | TAMN (ALUEZ,A0,B0,AM1,FR) | \TEST TSRCSTATE\; | 089 | 6C00 31F |
| 56800 | S | BR (STLTXT00) | \BI =LAST TEXT (2)\; | 08A | E113 80F |

MICROPROGRAM SECTION

SEQUENCE: SSROS

| Line | Label | Op | Operands | Comment | ADDRESS (HEX) | IMAGE (HEX) |
|---|---|---|---|---|---|---|
| 56900 | S | TAMN | (ALUEZ,A0,B0,AM1,FR) | \TEST TSRCSTATE\; | 08B | 6C00 31F |
| 57000 | S | BR | (STFCS100) | \BI =FCS I (3)\; | 08C | E114 00F |
| 57100 | S | TAMN | (ALUEZ,A0,B0,AM1,FR) | \TEST TSRCSTATE\; | 08D | 6C00 31F |
| 57200 | S | BR | (STFCS200) | \BI =FCS II (4)\; | 08E | E114 60F |
| 57300 | STRFR150 | BR | (STRFR150) | \ERROR HALT\; | 08F | E108 F0F |
| 57400 | | | | | | |
| 57500 | | | | | | |
| 57600 | | | \TSRCSTATE =ADDRESS, OR =TEXT\ | | | |
| 57700 | | | | | | |
| 57800 | STRFR200 | MMP | (4#,A7,B7,DANDA,QR) | \EXTRACT TDBEFLG\; | 090 | 8477 94F |
| 57900 | S | TAMN | (ALUEZ,A0,B0,Q,QR) | \TEST TDBEFLG\; | 091 | 6C00 08F |
| 58000 | S | TAMN | (TRDBE,A0,B0,Q,QR) | \IF TDBEFLG =0, TEST TRDBE\; | 092 | 6000 08F |
| 58100 | S | BR | (STUNDRNO) | \BI TDBEFLG =1, OR | 093 | E10A B0F |
| 58200 | | | | TRDBE =SET (UNDERRUN)\; | | |
| 58300 | | | | | | |
| 58400 | | | \NEXT DATA AVAILABLE (TDBEFLG =0, AND TRDBE =RESET)\ | | | |
| 58500 | | | \(COPY TDBB TO TSR)\ | | | |
| 58600 | S | RER | (R2,B0,NOTD,QR) | \READ TDBB.LH\; | 094 | CF20 FCB |
| 58700 | S | WER | (RF,B0,Q,QR) | \COPY TDBB.LH TO TSR.LH\; | 095 | 2FF0 088 |
| 58800 | S | RER | (R1,B0,NOTD,QR) | \READ TDBB.RH\; | 096 | CF10 FCB |
| 58900 | S | WER | (RE,B0,Q,QR) | \COPY TDBB.RH TO TSR.RH\; | 097 | 2FE0 088 |
| 59000 | | | \(TEST FOR LAST TEXT BYTE)\ | | | |
| 59100 | S | RER | (R0,B0,D,QR) | \READ TCWBB/NOT\; | 098 | CF00 1CB |
| 59200 | S | MMP | (1#,A0,B0,DANDQ,QR) | \EXTRACT TEOFS/NOT\; | 099 | 8100 98F |
| 59300 | S | TAMN | (ALUEZ,A0,B0,Q,QR) | \TEST TEOFS/NOT\; | 09A | 6C00 08F |
| 59400 | S | BR | (STRFR260) | \BI =0 (TEOFS =1)\; | 09B | E10A 70F |
| 59500 | | | | | | |
| 59600 | | | \NOT LAST TEXT BYTE (TEOFS =0)\ | | | |
| 59700 | | | \(COPY TDB TO TDBB)\ | | | |
| 59800 | S | RIB | (RTDL,B0,D,QR) | \READ TDB.LH\; | 09C | AF80 1CD |
| 59900 | S | WER | (R2,B0,Q,QR) | \COPY TDB.LH TO TDBB.LH\; | 09D | 2F20 088 |
| 60000 | S | RIB | (RTDR,B0,D,QR) | \READ TDB.RH\; | 09E | AF80 1CE |
| 60100 | S | WER | (R1,B0,Q,QR) | \COPY TDB.RH TO TDBB.RH\; | 09F | 2F10 088 |
| 60200 | S | MMP | (4#,A7,B7,OORA,FR) | \SET TDBEFLG =1\; | 0A0 | 8477 75F |
| 60300 | S | RER | (R8,B0,NOTD,FR) | \READ TSRCSTATE\; | 0A1 | CF80 FDB |
| 60400 | S | TAMN | (ALUEZ,A0,B0,A,FR) | \TEST TSRCSTATE\; | 0A2 | 6C00 11F |
| 60500 | S | BR | (STTXT000) | \BI =TEXT (0)\; | 0A3 | E111 40F |
| 60600 | S | TAMN | (ALUEZ,A0,B0,AM1,QR) | \TEST TSRCSTATE\; | 0A4 | 6C00 30F |
| 60700 | S | BR | (STADRS00) | \BI =ADDRESS (1)\; | 0A5 | E110 D0F |
| 60800 | STRFR240 | BR | (STRFR240) | \ERROR HALT\; | 0A6 | E10A 60F |
| 60900 | | | | | | |
| 61000 | | | \LAST TEXT BYTE (TEOFS =1)\ | | | |
| 61100 | STRFR260 | MMP | (2#,A0,B0,D,QR) | \LOAD 2 (TSRCSTATE)\; | 0A7 | 8200 1CF |
| 61200 | S | WER | (R8,B0,Q,QR) | \SET TSRCSTATE =LAST TEXT\; | 0A8 | 2F80 088 |
| 61300 | S | RER | (R0,B0,NOTD,FR) | \READ TCWBB TO F0\; | 0A9 | CF00 FDB |
| 61400 | S | BR | (STTXT010) | \BR TO CONVERT BYTE SIZE\; | 0AA | E111 70F |
| 61500 | | | | | | |
| 61600 | | | | | | |
| 61700 | | | \UNDERRUN (TDBEFLG =1, OR TRDBE =SET)\ | | | |
| 61800 | STUNDRNO | MMP | (A#,A7,B7,DANDA,FR) | \SET TDBEFLG,TREQFLG =0,0\; | 0AB | 8A77 95F |
| 61900 | S | MMP | (8,A0,B0,D,QR) | \LOAD 8 (TBSC)\; | 0AC | 8800 1CF |
| 62000 | S | WER | (R0,B0,Q,QR) | \SET TBSC =8\; | 0AD | 2F80 088 |
| 62100 | S | MMP | (3#,A0,B0,D,QR) | \LOAD 3 (TFRCSTATE)\; | 0AE | 8300 1CF |
| 62200 | S | WER | (R9,B0,Q,QR) | \SET TFRCSTATE =RPRT UNDRN\; | 0AF | 2F90 088 |
| 62300 | S | MMP | (9#,A0,B0,D,QR) | \LOAD 9 (TSRCSTATE)\; | 0B0 | 8900 1CF |
| 62400 | S | WER | (R8,B0,Q,QR) | \SET TSRCSTATE =IDLE I\; | 0B1 | 2F80 088 |
| 62500 | S | BR | (STIDL187) | \BR TO GENERATE ABORT SEQ\; | 0B2 | E10E 60F |
| 62600 | | | | | | |
| 62700 | | | | | | |
| 62800 | | | | | | |
| 62900 | | | | | | |
| 63000 | | | \****** IDLE I AND IDLE II STATES ******\ | | | |
| 63100 | | | | | | |
| 63200 | | | \*** INITIAL PROCESSING ***\ | | | |
| 63300 | | | | | | |
| 63400 | STIDL00 | RER | (RE,B1,NOTD,FR) | \LOAD TSR.RH TO F1\; | 0B3 | CFE1 FDB |
| 63500 | STIDL01 | SC | (WRTRBB,A0,B1,B,QR) | \LOAD TRBITB\; | 0B4 | 0C01 0CF |
| 63600 | STIDL02 | RER | (R0,B0,NOTD,QR) | \LOAD TBSC TO QR\; | 0B5 | CFD0 FCB |
| 63700 | STIDL03 | WER | (R0,B0,QM1,QR) | \DECREMENT AND RESTORE TBSC\; | 0B6 | 2FD0 288 |
| 63800 | STIDL04 | TAMN | (ALUEZ,A0,B0,Q,QR) | \TEST TBSC =0\; | 0B7 | 6C00 08F |
| 63900 | STIDL05 | BR | (STIDL10) | \BR IF TBSC =0\; | 0B8 | E108 A0F |
| 64000 | | | | | | |
| 64100 | | | \NOT BYTE BOUNDARY (NEW TBSC NCT=0)\ | | | |
| 64200 | STIDL06 | BR | (STRFR030) | \BR TO SHIFT TSR\; | 0B9 | E107 9DF |
| 64300 | | | | | | |
| 64400 | | | \BYTE BOUNDARY (NEW TBSC =3)\ | | | |
| 64500 | STIDL10 | MMP | (8,A0,B0,D,QR) | \LOAD 8 TO QR\; | 0BA | 8800 1CF |
| 64600 | STIDL11 | WER | (R0,B0,Q,QR) | \SET TBSC =8\; | 0BB | 2FD0 088 |
| 64700 | | MMP | (1#,A0,B0,DANDA,QR) | \EXTRACT TSRCSTATE.3 TO QR\; | 0BC | 8100 94F |
| 64800 | S | TAMN | (ALUEZ,A0,B0,Q,QR) | \TEST TSRCSTATE.3\; | 0BD | 6C00 08F |
| 64900 | S | BR | (STIDL200) | \BI =0 (IDLE II)\; | 0BE | E10E A0F |
| 65000 | | | | | | |
| 65100 | | | | | | |
| 65200 | | | | | | |
| 65300 | | | \*** IDLE I STATE ***\ | | | |
| 65400 | | | | | | |
| 65500 | S | RER | (R9,B0,NOTD,QR) | \READ TFRCSTATE\; | 0BF | CF90 FCB |
| 65600 | S | TAMN | (ALUEZ,A0,B0,Q,QR) | \TEST TFRCSTATE =OFF (0)\; | 0C0 | 6C00 08F |
| 65700 | S | BR | (STIDL105) | \BI =OFF\; | 0C1 | E10C 30F |
| 65800 | S | BR | (STIDL184) | \BI NOT=OFF\; | 0C2 | E10F 10F |
| 65900 | | | | | | |
| 66000 | | | \TFRCSTATE =OFF\ | | | |
| 66100 | STIDL105 | MMP | (4#,A7,B7,DANDA,QR) | \EXTRACT TDBEFLG\; | 0C3 | 8477 94F |
| 66200 | S | TAMN | (ALUEZ,A0,B0,Q,QR) | \TEST TDBEFLG\; | 0C4 | 6C00 08F |
| 66300 | S | BR | (STIDL110) | \BI =0\; | 0C5 | E10C 70F |
| 66400 | S | BR | (STIDL180) | \BI =1\; | 0C6 | E10D D0F |
| 66500 | | | | | | |
| 66600 | | | \TFRCSTATE =OFF, TDBEFLG =0\ | | | |
| 66700 | STIDL110 | TAMN | (TRSRQ,A0,B0,Q,QR) | \TEST TRSRQ\; | 0C7 | 6400 08F |

MICROPROGRAM SECTION

SEQUENCE: SSROS

```
                                                                            ADDRESS  IMAGE
                                                                            (HEX)    (HEX)
66800  S          BR    (STIDL120)              \BI =RESET\;                 0C8    E10C A0F
66900  S          BR    (STIDL180)              \BI =SET\;                   0C9    E10D 00F
67000
67100             \TFRCSTATE =OFF, TDBEFLG =0, TRSRQ =RESET\
67200  STIDL120   TAMN  (ALUEZ,A3,B3,A,QR)      \TEST RFCSTATE\;             0CA    6C33 10F
67300  S          BR    (STIDL125)              \BI =OFF (0)\;               0CB    E10D 10F
67400
67500             \RFCSTATE NOT=OFF\
67600  S          RIB   (RTRC,80,D,QR)          \READ TCWB (LR6 BITS 0-3)\;  0CC    AF40 1CD
67700  S          MMP   (2#,A0,B0,DANDQ,QR)     \EXTRACT TBS2\;              0CD    8200 98F
67800  S          TAMN  (ALUEZ,A0,B0,Q,QR)      \TEST TBS2\;                 0CE    6C00 08F
67900  S          BR    (STIDL180)              \BI =0 (TO SEND FILL)\;      0CF    E10D 00F
68000  S          BR    (STIDL125)              \BI =1 (TO CONTINUE)\;       0D0    E10D 10F
68100
68200             \TFRCSTATE =OFF, TDBEFLG =OFF, TRSRQ =RESET,
68300             AND RFCSTATE =OFF, OR TBS2 =1\
68400  STIDL125   MMP   (4#,A7,B7,DORA,FR)      \SET TDBEFLG =1\;            0D1    8477 75F
68500  S          TAMN  (TRDBE,A0,B0,Q,QR)      \TEST TRDBE\;                0D2    6000 08F
68600  S          BR    (STIDL180)              \BI =SET\;                   0D3    E10D 00F
68700
68800             \FIRST OCTET IN TDB (TRDBE =RESET)\
68900             \(COPY TDB TO TDBB)\
69000  S          RIB   (RTDL,80,D,QR)          \READ TDB.LH\;               0D4    AF80 1CD
69100  S          WER   (R2,B0,Q,QR)            \COPY TDB.LH TO TDBB.LH\;    0D5    2F20 08B
69200  S          RIB   (RTDR,B0,D,QR)          \READ TDB.RH\;               0D6    AF80 1CE
69300  S          WER   (R1,B0,Q,QR)            \COPY TDB.RH TO TDBB.RH\;    0D7    2F10 08B
69400             \(CONTINUE)\
69500  S          RIB   (RTRC,B0,D,QR)          \READ TCWB (LR6 BITS 0-3)\;  0D8    AF40 1CD
69600  S          WER   (R0,B0,Q,QR)            \COPY TCWB TO TCWBB\;        0D9    2F00 08B
69700  S          MMP   (8#,A0,B0,D,QR)         \LOAD 8\;                    0DA    8800 1CF
69800  S          WER   (RB,B0,Q,QR)            \SET TSRCSTATE =IDLE II (8)\;0DB    2FB0 08B
69900  S          BR    (STIDL184)              \BR TO GENERATE FLAG SEQ\;   0DC    E10E 10F
70000
70100
70200             \ANOTHER INTERFRAME FILL SEQUENCE MUST BE GENERATED\
70300  STIDL180   RIB   (RTRC,B0,D,QR)          \READ TR CONTROL WORD\;      0DD    AF40 1CD
70400  S          MMP   (1#,A0,B0,DANDQ,QR)     \EXTRACT TIFM\;              0DE    8100 98F
70500  S          TAMN  (ALUEZ,A0,B0,Q,QR)      \TEST TIFM\;                 0DF    6C00 08F
70600  S          BR    (STIDL187)              \BI =0 (ABORT MODE)\;        0E0    E10E 60F
70700
70800             \INTERFRAME FILL SEQUENCE =FLAG (TIFM =1)\
70900  STIDL184   MMP   (7#,A0,B0,D,QR)         \LOAD 0111\;                 0E1    8700 1CF
71000  S          WER   (RF,B0,Q,QR)            \SET TSR.LH =0111\;          0E2    2FF0 08B
71100  S          MMP   (E#,A0,B0,D,QR)         \LOAD 1110\;                 0E3    8E00 1CF
71200  S          WER   (RE,B0,Q,QR)            \SET TSR.RH =1110\;          0E4    2FE0 08B
71300  S          BR    (SIDLE000)              \DONE\;                      0E5    E101 80F
71400
71500             \INTERFRAME FILL SEQUENCE =ABORT (TIFM =0)\
71600  STIDL187   MMP   (F#,A0,B0,D,QR)         \LOAD 1111\;                 0E6    8F00 1CF
71700  S          WER   (RF,B0,Q,QR)            \SET TSR.LH =1111\;          0E7    2FF0 08B
71800  S          WER   (RE,B0,Q,QR)            \SET TSR.RH =1111\;          0E8    2FE0 08B
71900  S          BR    (SIDLE000)              \DONE\;                      0E9    E101 80F
72000
72100
72200
72300             \***  IDLE II STATE  ***\
72400
72500  STIDL200   MMP   (4#,A7,B7,DANDA,QR)     \EXTRACT TDBEFLG\;           0EA    B477 94F
72600  S          TAMN  (ALUEZ,A0,B0,Q,QR)      \TEST TDBEFLG\;              0EB    6C00 08F
72700  S          BR    (STIDL205)              \BI =0\;                     0EC    E10E E0F
72800  S          BR    (STIDL184)              \BI =1\;                     0ED    E10E 10F
72900
73000             \TDBEFLG =0\
73100  STIDL205   TAMN  (TRSRQ,A0,B0,Q,QR)      \TEST TRSRQ\;                0EE    6400 08F
73200  S          BR    (STIDL210)              \BI =RESET\;                 0EF    E10F 10F
73300  S          BR    (STIDL184)              \BI =SET\;                   0F0    E10E 10F
73400
73500             \TDBEFLG =0, TRSRQ =RESET\
73600  STIDL210   TAMN  (ALUEZ,A3,B3,A,QR)      \TEST RFCSTATE\;             0F1    6C33 10F
73700  S          BR    (STIDL215)              \BI =OFF (0)\;               0F2    E10F 80F
73800
73900             \RFCSTATE NOT=OFF\
74000  S          RER   (R0,B0,NOTD,QR)         \READ TCWBB\;                0F3    CF00 FCB
74100  S          MMP   (2#,A0,B0,DANDQ,QR)     \EXTRACT TBS2S\;             0F4    8200 98F
74200  S          TAMN  (ALUEZ,A0,B0,Q,QR)      \TEST TBS2S\;                0F5    6C00 08F
74300  S          BR    (STIDL184)              \BI =0 (TO SEND FLAG)\;      0F6    E10E 10F
74400  S          BR    (STIDL215)              \BI =1 (TO CONTINUE)\;       0F7    E10F 80F
74500
74600             \TDBEFLG =0, TRSRQ =RESET, RFCSTATE =OFF, OR TBS2 =1\
74700  STIDL215   MMP   (4#,A7,B7,DORA,FR)      \SET TDBEFLG =1\;            0F8    8477 75F
74800  S          TAMN  (TRDBE,A0,B0,Q,QR)      \TEST TRDBE\;                0F9    6000 08F
74900  S          BR    (STIDL250)              \BI =SET\;                   0FA    E110 A0F
75000
75100             \SECOND OCTET IN TDB (TRDBE =RESET)\
75200             \(COPY TDBB TO TSR)\
75300  S          RER   (R2,B0,NOTD,QR)         \READ TDBB.LH\;              0FB    CF20 FCB
75400  S          WER   (RF,B0,Q,QR)            \COPY TDBB.LH TO TSR.LH\;    0FC    2FF0 08B
75500  S          RER   (R1,B0,NOTD,QR)         \READ TDBB.RH\;              0FD    CF10 FCB
75600  S          WER   (RE,B0,Q,QR)            \COPY TDBB.RH TO TSR.RH\;    0FE    2FE0 08B
75700             \(COPY TDB TO TDBB)\
75800  S          RIB   (RTDL,B0,D,QR)          \READ TDB.LH\;               0FF    AF80 1CD
75900  S          WER   (R2,B0,Q,QR)            \COPY TDB.LH TO TDBB.LH\;    100    2F20 08B
76000  S          RIB   (RTDR,B0,D,QR)          \READ TDB.RH\;               101    AF80 1CE
76100  S          WER   (R1,B0,Q,QR)            \COPY TDB.RH TO TDBB.RH\;    102    2F10 08B
76200  S          RIB   (RTRC,B0,D,QR)          \READ TR CONTROL WORD\;      103    AF40 1CD
76300  S          WER   (R0,B0,Q,QR)            \UPDATE TCWBB\;              104    2F00 08B
76400  S          MMP   (8#,A0,B0,D,QR)         \LOAD 8\;                    105    8800 1CF
76500  S          WER   (RC,B0,Q,QR)            \SET TSC =0 (8)\;            106    2FC0 08B
```

MICROPROGRAM SECTION

SEQUENCE: SSROS

| Line | Label | Op | Operands | Comment | Addr (HEX) | Image (HEX) |
|---|---|---|---|---|---|---|
| 76600 | S | MMP | (1#,A0,B0,D,QR) | \LOAD 1\; | 107 | 8100 1CF |
| 76700 | S | WER | (R0,B0,Q,QR) | \SET TSRCSTATE =ADRS (1)\; | 108 | 2F80 088 |
| 76800 | S | BR | (SIDLE000) | \DONE\; | 109 | E101 80F |
| 76900 | | | | | | |
| 77000 | | | | | | |
| 77100 | | | \USER HAS CHANGED MIND (TRDBE =SET)\ | | | |
| 77200 | STIDL250 | MMP | (9#,A0,B0,D,QR) | \LOAD 9\; | 10A | 8900 1CF |
| 77300 | S | WER | (R0,B0,Q,QR) | \SET TSRCSTATE =IDLE I (9)\; | 10B | 2F80 088 |
| 77400 | S | BR | (STIDL180) | \BR TO GENERATE NEXT INTERFRAME FILL SEQUENCE\; | 10C | E10D D0F |
| 77500 | | | | | | |
| 77600 | | | | | | |
| 77700 | | | | | | |
| 77800 | | | | | | |
| 77900 | | | | | | |
| 78000 | | | \****** ADDRESS STATE ******\ | | | |
| 78100 | | | | | | |
| 78200 | | | | | | |
| 78300 | | | \(SECOND OCTET JUST LOADED INTO TSR. | | | |
| 78400 | | | THIRD BYTE JUST LOADED INTO TCBB)\ | | | |
| 78500 | STADRS00 | MMP | (8,A0,B0,D,QR) | \LOAD 8\; | 10D | 8800 1CF |
| 78600 | S | WER | (R0,B0,Q,QR) | \SET TBSC =8\; | 10E | 2F80 088 |
| 78700 | S | MMP | (0#,A0,B0,D,QR) | \LOAD 0\; | 10F | 8000 1CF |
| 78800 | S | WER | (R0,B0,Q,QR) | \SET TSRCSTATE =TEXT\; | 110 | 2F80 088 |
| 78900 | S | RIB | (RTRC,B0,D,QR) | \READ TR CONTROL WORD\; | 111 | AF40 1CD |
| 79000 | S | WER | (R0,B0,Q,QR) | \UPDATE TCWBB\; | 112 | 2F00 088 |
| 79100 | S | BR | (SIDLE000) | \DONE\; | 113 | E101 80F |
| 79200 | | | | | | |
| 79300 | | | | | | |
| 79400 | | | | | | |
| 79500 | | | \****** TEXT STATE ******\ | | | |
| 79600 | | | | | | |
| 79700 | | | | | | |
| 79800 | | | \(NTH (N=3, =4, .... , =NEXT TO LAST TEXT) BYTE | | | |
| 79900 | | | JUST LOADED INTO TSR)\ | | | |
| 80000 | STTXT000 | RER | (R0,B0,NOTD,FR) | \READ TCWBB TO F0\; | 114 | CF00 FDB |
| 80100 | S | RIB | (RTRC,B0,D,QR) | \READ TR CONTROL WORD\; | 115 | AF40 1CD |
| 80200 | S | WER | (R0,B0,Q,QR) | \UPDATE TCWBB (FOR NEXT BYTE BOUNDARY)\; | 116 | 2F00 088 |
| 80300 | | | | | | |
| 80400 | | | | | | |
| 80500 | | | \CONVERSION OF BYTE SIZE\ | | | |
| 80600 | STTXT010 | MMP | (0,A0,B0,A,SRQF) | \SHIFT TCWBB (OLD) RIGHT 1\; | 117 | 8000 127 |
| 80700 | S | MMP | (8#,A0,B0,DORA,FR) | \SET MSB =1\; | 118 | 8800 75F |
| 80800 | S | TAMN | (ALUEZ,A0,B0,AP1,FR) | \TEST TBSS\; | 119 | 7C00 11F |
| 80900 | S | BR | (STTXT028) | \BI =111\; | 11A | E113 50F |
| 81000 | S | TAMN | (ALUEZ,A0,B0,AP1,FR) | \TEST T3SS\; | 11B | 7C00 11F |
| 81100 | S | BR | (STTXT024) | \BI =110\; | 11C | E112 D0F |
| 81200 | S | TAMN | (ALUEZ,A0,B0,AP1,FR) | \TEST TBSS\; | 11D | 7C00 11F |
| 81300 | S | BR | (STTXT027) | \BI =101\; | 11E | E113 30F |
| 81400 | S | TAMN | (ALUEZ,A0,B0,AP1,FR) | \TEST TBSS\; | 11F | 7C00 11F |
| 81500 | S | BR | (STTXT023) | \BI =100\; | 120 | E112 80F |
| 81600 | S | TAMN | (ALUEZ,A0,B0,AP1,FR) | \TEST TBSS\; | 121 | 7C00 11F |
| 81700 | S | BR | (STTXT026) | \BI =011\; | 122 | E113 10F |
| 81800 | S | TAMN | (ALUEZ,A0,B0,AP1,FR) | \TEST TBSS\; | 123 | 7C00 11F |
| 81900 | S | BR | (STTXT022) | \BI =010\; | 124 | E112 90F |
| 82000 | S | TAMN | (ALUEZ,A0,B0,AP1,FR) | \TEST TBSS\; | 125 | 7C00 11F |
| 82100 | S | BR | (STTXT025) | \BI =001\; | 126 | E112 F0F |
| 82200 | | | | | | |
| 82300 | | | | | | |
| 82400 | | | \TBS =000 (BYTE SIZE =5)\ | | | |
| 82500 | STTXT021 | MMP | (5,A0,B0,D,FR) | \LOAD 5\; | 127 | 8500 1DF |
| 82600 | S | BR | (STTXT040) | \BR TO FINISH UP\; | 128 | E113 60F |
| 82700 | | | | | | |
| 82800 | | | \TBS =010 (BYTE SIZE =6)\ | | | |
| 82900 | STTXT022 | MMP | (6,A0,B0,D,FR) | \LOAD 6\; | 129 | 8600 1DF |
| 83000 | S | BR | (STTXT040) | \BR TO FINISH UP\; | 12A | E113 60F |
| 83100 | | | | | | |
| 83200 | | | \TBS =100 (BYTE SIZE =7)\ | | | |
| 83300 | STTXT023 | MMP | (7,A0,B0,D,FR) | \LOAD 7\; | 12B | 8700 1DF |
| 83400 | S | BR | (STTXT040) | \BR TO FINISH UP\; | 12C | E113 60F |
| 83500 | | | | | | |
| 83600 | | | \TBS =110 (BYTE SIZE =8)\ | | | |
| 83700 | STTXT024 | MMP | (8,A0,B0,D,FR) | \LOAD 8\; | 12D | 8800 1DF |
| 83800 | S | BR | (STTXT040) | \BR TO FINISH UP\; | 12E | E113 60F |
| 83900 | | | | | | |
| 84000 | | | \TBS =001 (BYTE SIZE =1)\ | | | |
| 84100 | STTXT025 | MMP | (1,A0,B0,D,FR) | \LOAD 1\; | 12F | 8100 1DF |
| 84200 | S | BR | (STTXT040) | \BR TO FINISH UP\; | 130 | E113 60F |
| 84300 | | | | | | |
| 84400 | | | \TBS =011 (BYTE SIZE =2)\ | | | |
| 84500 | STTXT026 | MMP | (2,A0,B0,D,FR) | \LOAD 2\; | 131 | 8200 1DF |
| 84600 | S | BR | (STTXT040) | \BR TO FINISH UP\; | 132 | E113 60F |
| 84700 | | | | | | |
| 84800 | | | \TBS =101 (BYTE SIZE =3)\ | | | |
| 84900 | STTXT027 | MMP | (3,A0,B0,D,FR) | \LOAD 3\; | 133 | 8300 1DF |
| 85000 | S | BR | (STTXT040) | \BR TO FINISH UP\; | 134 | E113 60F |
| 85100 | | | | | | |
| 85200 | | | \TBS =111 (BYTE SIZE =4)\ | | | |
| 85300 | STTXT028 | MMP | (4,A0,B0,D,FR) | \LOAD 4\; | 135 | 8400 1DF |
| 85400 | | | | | | |
| 85500 | | | \(FINISH UP)\ | | | |
| 85600 | STTXT040 | WER | (R0,B0,B,QR) | \SET TBSC =BYTE SIZE\; | 136 | 2F00 0CB |
| 85700 | S | BR | (SIDLE000) | \DONE\; | 137 | E101 80F |
| 85800 | | | | | | |
| 85900 | | | | | | |
| 86000 | | | | | | |
| 86100 | | | \****** LAST TEXT STATE ******\ | | | |
| 86200 | | | | | | |
| 86300 | | | | | | |

MICROPROGRAM SECTION
SEQUENCE: SSROS

| ADDRESS (HEX) | IMAGE (HEX) |
|---|---|

```
86400           \TRANSMISSION OF LAST TEXT BYTE COMPLETE\
86500           \(FIRST HALF FCS IN TDB)\
86600  STLTXT00  MMP    (4#,A7,B7,DORA,FR)        \SET TDBEFLG =1\;            138   8477 75F
86700     S      MMP    (3#,A0,B0,D,FR)           \LOAD 3 (TSRCSTATE) TO FO\;  139   8300 1DF
86800
86900           \(UPDATE TSRCSTATE REG, COPY TDB TO TSR)\
87000           \(SHARED CODING)\
87100  STLTXT20  WER    (RB,B0,B,QR)              \UPDATE TSRCSTATE REG\;      13A   2F80 0CB
87200     S      RIB    (RTDL,B0,D,QR)            \READ TDB.LH\;               13B   AF80 1CD
87300     S      WER    (RF,B0,Q,QR)              \COPY TDB.LH TO TSR.LH\;     13C   2FF0 088
87400     S      RIB    (RTDR,B0,D,QR)            \READ TDB.RH\;               13D   AF80 1CE
87500     S      WER    (RE,B0,Q,QR)              \COPY TDB.RH TO TSR.RH\;     13E   2FE0 088
87600     S      BR     (SIDLE000)                \DONE\;                      13F   E101 80F
87700
87800
87900
88000           \****** FCS I STATE ******\
88100
88200
88300           \TRANSMISSION OF FIRST HALF FCS COMPLETE\
88400  STFCS100  MMP    (4#,A7,B7,DANDA,QR)       \EXTRACT TDBEFLG\;           140   8477 94F
88500     S      TAMN   (ALUEZ,A0,B0,Q,QR)        \TEST TDBEFLG\;              141   6C00 08F
88600     S      TAMN   (TRDBE,A0,B0,Q,QR)        \IF TDBEFLG=0, TEST TRDBE\;  142   6000 08F
88700     S      BR     (STUNDRNO)                \BI TDBEFLG =1, OR           143   E10A 80F
88800                                              TRDBE =SET (UNDERRUN)\;
88900
89000           \SECOND HALF FCS IN TDB  (TDBEFLG =0, AND TRDBE =RESET)\
89100     S      MMP    (4#,A0,B0,D,FR)           \LOAD 4 (TSRCSTATE) TO FO\;  144   8400 1DF
89200     S      BR     (STLTXT20)                \BR TO SHARED CODING         145   E113 A0F
89300                                              IN LAST TEXT STATE\;
89400
89500
89600
89700           \****** FCS II STATE ******\
89800
89900
90000           \TRANSMISSION OF SECOND HALF FCS COMPLETE\
90100  STFCS200  MMP    (2#,A0,B0,D,QR)           \LOAD 2 (TFRCSTATE)\;        146   8200 1CF
90200     S      WER    (R9,B0,Q,QR)              \SET TFRCSTATE =REPORT EOF\; 147   2F90 088
90300     S      MMP    (9#,A0,B0,D,QR)           \LOAD 9 (TSRCSTATE)\;        148   8900 1CF
90400     S      WER    (RB,B0,Q,QR)              \SET TSRCSTATE =IDLE I\;     149   2FB0 088
90500     S      BR     (STIDL184)                \BR TO GENERATE FLAG SEQ\;   14A   E10E 10F
90600
90700  SKIP HOF;
90800           \****************************************************\
90900           \**                                                **\
91000           \** TRANSMIT DATA REQUEST CONTROL ROUTINE          **\
91100           \**                                                **\
91200           \****************************************************\
91300
91400
91500
91600  STDRC000  WOB    (0,WSTS,B0,ALUZ,QR)       \SET TEOF,UNDRN =0,0\;       14B   4010 88F
91700     S      MMP    (A#,A7,B7,DANDA,FR)       \SET TDBEFLG,TREQFLG =0,0\;  14C   8A77 95F
91800     S      SC     (STRDBE,A0,B0,Q,QR)       \SET TRDBE\;                 14D   0000 08F
91900     S      BRSC   (SIDLE000,STRSRQ)         \SET TRSRQ, DONE\;           14E   E401 80F
92000
92100  SKIP HOF;
92200           \****************************************************\
92300           \**                                                **\
92400           \** TRANSMIT FRAME REPORT CONTROL ROUTINE          **\
92500           \**                                                **\
92600           \****************************************************\
92700
92800
92900           \**  INITIAL PROCESSING AND STATE SELECTION  **\
93000
93100
93200  STFRC000  RER    (R9,B0,NOTD,FR)           \READ TFRCSTATE TO FO\;      14F   CF90 FDB
93300     S      TAMN   (ALUEZ,A0,B0,A,QR)        \TEST TFRCSTATE\;            150   6C00 10F
93400     S      BR     (SIDLE000)                \BI =OFF (0)\;               151   E101 80F
93500
93600           \TFRCSTATE NOT =OFF\
93700  STFRC001  TAMN   (ALUEZ,A0,B0,AM1,FR)      \TEST TFRCSTATE\;            152   6C00 31F
93800     S      BR     (STFRCRSO)                \BI =RESET STATUS (1)\;      153   E115 80F
93900
94000           \TFRCSTATE =REPORT EOF, OR =REPORT UNDERRUN\
94100     S      MMP    (1#,A0,B0,D,QR)           \SET TFRCSTATE =RST STATUS\; 154   8100 1CF
94200     S      WER    (R9,B0,Q,QR)              \UPDATE TFRCSTATE REG\;      155   2F90 088
94300     S      TAMN   (ALUEZ,A0,B0,AM1,FR)      \TEST TFRCSTATE\;            156   6C00 31F
94400     S      BR     (STFRCREO)                \BI =REPORT EOF (2)\;        157   E115 D0F
94500     S      TAMN   (ALUEZ,A0,B0,AM1,FR)      \TEST TFRCSTATE\;            158   6C00 31F
94600     S      BR     (STFRCRU0)                \BI =REPORT UNDRN (3)\;      159   E115 F0F
94700  STFRC010  BR     (STFRC010)                \ERROR HALT\;                15A   E115 A0F
94800
94900
95000
95100           \****** RESET STATUS STATE ******\
95200
95300
95400  STFRCRSO  WER    (R9,B0,ALUZ,QR)           \SET TFRCSTATE =OFF\;        15B   2F90 888
95500     S      BRSC   (SIDLE000,STRDBE)         \SET TRDBE, DONE\;           15C   E001 80F
95600
95700
95800
95900           \****** REPORT END OF FRAME STATE ******\
96000
96100
```

MICROPROGRAM SECTION

SEQUENCE: SSROS

| | | | | | ADDRESS (HEX) | IMAGE (HEX) |
|---|---|---|---|---|---|---|
| 96200 | STFRCRE0 | WOB | (8#,WSTS,B0,D,QR) | \SET TEOF,UNDRN =1,0\; | 15D | 4810 1CF |
| 96300 | $ | BRSC | (SIDLE000,STRSRQ) | \SET TRSRQ, DONE\; | 15E | E401 80F |

\**** REPORT UNDERRUN STATE ****\

| 97000 | STFRCRUD | WOB | (1#,WSTS,B0,D,QR) | \SET TEOF,UNDRN =0,1\; | 15F | 4110 1CF |
| 97100 | $ | BRSC | (SIDLE000,STRSRQ) | \SET TRSRQ, DONE\; | 160 | E401 80F |

SKIP HOF;

\*********************************\
\                             \
\ RECEIVE SHIFT REGISTER CONTROL ROUTINE \
\                             \
\*********************************\

\ INITIAL PROCESSING \

| 98400 | SRCSR000 | TAMN | (ALUEZ,A0,B5,B,QR) | \TEST R5C =5 (0)\; | 161 | 6C05 0CF |
| 98500 | SRCSR001 | BR | (SRCSR080) | \BR IF R5C =5 - INIT R5C\; | 162 | E118 C0F |
| 98600 | SRCSR002 | MMP | (0,A0,B6,BP1,FR) | \INCREMENT RBSC\; | 163 | 9006 0DF |
| 98700 | SRCSR003 | MMP | (4#,A4,B0,DXORA,QR) | \SET UP FOR RSRCSTATE =OVRN WAIT TEST\; | 164 | 8440 D4F |
| 98900 | SRCSR004 | TAMN | (ALUEZ,A0,B0,Q,QR) | \TEST RSRCSTATE =OVRN WAIT\; | 165 | 6C00 08F |
| 99000 | SRCSR005 | BR | (SRCSR032) | \BR IF OVRN WAIT\; | 166 | E117 A0F |
| 99100 | SRCSR006 | MMP | (3,A2,B0,DANDA,FR) | \EXTRACT RBAC\; | 167 | 8320 95F |
| 99200 | SRCSR007 | TAMN | (ALUEZ,A0,B0,BM1,FR) | \TEST RBAC =1\; | 168 | 6C00 2DF |
| 99300 | SRCSR008 | BR | (SRCSR024) | \BR IF RBAC =1\; | 169 | E117 20F |
| 99400 | SRCSR009 | TAMN | (ALUEZ,A0,B0,BM1,FR) | \TEST RBAC =2\; | 16A | 6C00 2DF |
| 99500 | SRCSR010 | BR | (SRCSR028) | \BR IF RBAC =2\; | 16B | E117 60F |
| 99600 | SRCSR011 | TAMN | (ALUEZ,A0,B0,BM1,FR) | \TEST RBAC =3\; | 16C | 6C00 2DF |
| 99700 | SRCSR012 | BR | (SRCSR036) | \BR IF RBAC =3\; | 16D | E117 E0F |

\SHIFT RSR07-31\;

| 100100 | SRCSR020 | MMP | (0,A0,B9,B,QR) | \LOAD RBR.LH TO QR\; | 16E | 8009 0CF |
| 100200 | SRCSR021 | MMP | (0,A0,B8,B,SRQF) | \SHIFT INTO RBR.RH\; | 16F | 8008 0E7 |
| 100300 | SRCSR022 | MMP | (0,A0,BA,B,QR) | \LOAD RFCSR.RQ TO QR\; | 170 | 800A 0CF |
| 100400 | SRCSR023 | MMP | (0,A0,B9,B,SRQF) | \SHIFT INTO RBR.LH\; | 171 | 8009 0E7 |
| 100500 | SRCSR024 | MMP | (0,A0,BB,B,QR) | \LOAD RFCSR.RCQ TO QR\; | 172 | 800B 0CF |
| 100600 | SRCSR025 | MMP | (0,A0,BA,B,SRQF) | \SHIFT INTO RFCSR.RQ\; | 173 | 800A 0E7 |
| 100700 | SRCSR026 | MMP | (0,A0,BC,B,QR) | \LOAD RFCSR.LCQ TO QR\; | 174 | 800C 0CF |
| 100800 | SRCSR027 | MMP | (0,A0,BB,B,SRQF) | \SHIFT INTO RFCSR.RCQ\; | 175 | 800B 0E7 |
| 100900 | SRCSR028 | MMP | (0,A0,BD,B,QR) | \LOAD RFCSR.LQ TO QR\; | 176 | 800D 0CF |
| 101000 | SRCSR029 | MMP | (0,A0,BC,B,SRQF) | \SHIFT INTO RFCSR.LCQ\; | 177 | 800C 0E7 |
| 101100 | SRCSR030 | MMP | (0,A0,BE,B,QR) | \LOAD RFR.RH TO QR\; | 178 | 800E 0CF |
| 101200 | SRCSR031 | MMP | (0,A0,BD,B,SRQF) | \SHIFT INTO RFCSR.LQ\; | 179 | 800D 0E7 |

\UPDATE R5C FOR ZERO DELETION CONTROL\;

| 101600 | SRCSR032 | MMP | (1,AE,B0,DANDA,QR) | \EXTRACT RSR07 TO QR\; | 17A | 81E0 94F |
| 101700 | SRCSR033 | TAMN | (ALUEZ,A0,B0,Q,QR) | \TEST RSR07 =0\; | 17B | 6C00 08F |
| 101800 | SRCSR034 | BR | (SRCSR080) | \BR TO INIT R5C\; | 17C | E118 C0F |
| 101900 | SRCSR035 | MMP | (0,A0,B5,BP1,FR) | \INCREMENT R5C\; | 17D | 9005 0DF |

\INPUT NEXT DATA BIT\;

| 102300 | SRCSR036 | MMP | (0,A0,BF,B,QR) | \LOAD RFR.LH TO QR\; | 17E | 800F 0CF |
| 102400 | SRCSR037 | MMP | (0,A0,BE,B,SRQF) | \SHIFT INTO RFR.RH\; | 17F | 800E 0E7 |
| 102500 | SRCSR038 | MMP | (0,A0,BF,Q,FR) | \LOAD RFR.LH WITH NEXT BIT\; | 180 | 800F 09F |

\(CHECK RFR (RSR00-07) FOR FLAG OR ABORT SEQUENCE)\

| 102900 | SRSRC039 | TAMN | (ALUEI,AE,B1,NOTA,FR) | \TEST RFR.RH =1111\; | 181 | 6CE1 F1F |
| 103000 | $ | BR | (SRSRC060) | \BI =1111\; | 182 | E118 90F |
| 103100 | $ | TAMN | (ALUEI,A1,B1,AM1,FR) | \TEST FOR =1110\; | 183 | 6C11 31F |
| 103200 | $ | BR | (SRSRC050) | \BI =1110\; | 184 | E118 60F |
| 103300 | $ | BR | (SRSRC500) | \BI NOT=1110 (CANNOT BE FLAG OR ABORT SEQUENCE)\; | 185 | E118 E0F |

\RFR.RH (RSR04-07) =1110\
\(TEST RFR.LH (RSR00-03))\

| 103800 | SRSRC050 | MMP(7#,AF,B0,DXORA,QR) | | \SET QR =0 IF RFR.LH =0111\; | 186 | 87F0 D4F |
| 103900 | $ | TAMN | (ALUEZ,A0,B0,Q,QR) | \TEST QR =0\; | 187 | 6C00 08F |
| 104000 | $ | BR | (SRSRC600) | \BI QR =0 (FLAG SEQ RCVD)\; | 188 | E11D 10F |

\RFR.RH =1111, OR RFR.RH =1110 AND RFR.LH NOT=0111\

| 104300 | SRSRC060 | TAMN | (ALUEZ,AF,BF,NOTA,QR) | \TEST RFR.LH =1111\; | 189 | 6CFF F0F |
| 104400 | $ | BR | (SRSRC800) | \BI =1111 (ABORT SEQ RCVD)\; | 18A | E11E 40F |
| 104500 | $ | BR | (SRSRC500) | \BI NOT=1111\; | 18B | E118 E0F |

\INITIALIZE R5C AND RETURN\;

| 105000 | SRCSR080 | MMP | (8#,A0,B5,D,FR) | \SET R5C =0 (8)\; | 18C | 8805 10F |
| 105100 | SRCSR081 | BR | (SRCSR036) | \BR TO INPUT NEXT DATA BIT\; | 18D | E117 E0F |

\* NEITHER FLAG NOR ABORT SEQUENCE RECEIVED *\

| 105900 | SRSRC500 | TAMN | (ALUEZ,A5,B5,A,QR) | \TEST R5C =5(0)\; | 18E | 6C55 10F |
| 106000 | $ | BR | (SIDLE000) | \DONE IF =5\; | 18F | E101 80F |

MICROPROGRAM SECTION

SEQUENCE: SSROS

| Line | Label | Op | Operands | Comment | Address (HEX) | Image (HEX) |
|---|---|---|---|---|---|---|
| 106100 | | | | | | |
| 106200 | | | \RSC NOT =5\ | | | |
| 106300 | S | TAMN | (ALUEZ,A4,B4,B,QR) | \TEST RSRCSTATE =TEXT(0)\; | 190 | 6C44 0CF |
| 106400 | S | BR | (SRSRC550) | \BI =TEXT\; | 191 | E11A 1DF |
| 106500 | | | | | | |
| 106600 | | | | | | |
| 106700 | | | \* RSRCSTATE NOT=TEXT *\ | | | |
| 106800 | | | | | | |
| 106900 | S | TAMN | (ALUEZ,A6,B6,B,QR) | \TEST RBSC =8(0)\; | 192 | 6C66 0CF |
| 107000 | S | BR | (SRSRC510) | \BI =8\; | 193 | E119 5DF |
| 107100 | | | | | | |
| 107200 | | | \NOT BYTE BOUNDARY (RBSC NOT=8)\ | | | |
| 107300 | S | BR | (SIDLE000) | \DONE\; | 194 | E101 80F |
| 107400 | | | | | | |
| 107500 | | | \BYTE BOUNDARY (RBSC =8)\ | | | |
| 107600 | SRSRC510 | MMP | (8,A6,B6,D,FR) | \SET RBSC =0(8)\; | 195 | 8866 1DF |
| 107700 | | | | | | |
| 107800 | | | \(BRANCH PER RSRCSTATE)\ | | | |
| 107900 | S | TAMN | (ALUEZ,A6,B1,AM1,FR) | \TEST FOR INSYNC STATE\; | 196 | 6C41 31F |
| 108000 | S | BR | (SRINS000) | \BI =INSYNC(1)\; | 197 | E120 E0F |
| 108100 | S | TAMN | (ALUEZ,A1,B1,AM1,FR) | \TEST FOR ADDRESS STATE\; | 198 | 6C11 31F |
| 108200 | S | BR | (SRADR000) | \BI =ADDRESS(2)\; | 199 | E121 80F |
| 108300 | S | TAMN | (ALUEZ,A1,B1,AM1,FR) | \TEST FOR CONTROL STATE\; | 19A | 6C11 31F |
| 108400 | S | BR | (SRCNT000) | \BI =CONTROL(3)\; | 19B | E122 30F |
| 108500 | S | TAMN | (ALUEZ,A1,B1,AM1,FR) | \TEST FOR OVRN WAIT STATE\; | 19C | 6C11 31F |
| 108600 | S | BR | (SROVW000) | \BI =OVRN WAIT(4)\; | 19D | E125 A0F |
| 108700 | S | TAMN | (ALUEZ,A1,B1,AM1,FR) | \TEST FOR OVERRUN STATE\; | 19E | 6C11 31F |
| 108800 | S | BR | (SIDLE000) | \BI =OVERRUN(5)\; | 19F | E101 80F |
| 108900 | S | BR | (SRFST000) | \BI =ABORT(6), =OUTASYNC(7), OR =FIRST(8) STATE\; | 1A0 | E11F 70F |
| 109000 | | | | | | |
| 109100 | | | | | | |
| 109200 | | | | | | |
| 109300 | | | | | | |
| 109400 | | | \* RSRCSTATE =TEXT *\ | | | |
| 109500 | | | | | | |
| 109600 | SRSRC550 | RIB | (RRCC,B1,D,FR) | \READ RC LR6 BITS 4-7 TO F1\; | 1A1 | AF41 1DE |
| 109700 | | MMP | (8#,A1,B1,DANDA,QR) | \EXTRACT RBS0\; | 1A2 | 8811 94F |
| 109800 | S | TAMN | (ALUEZ,A0,B0,0,QR) | \TEST RBS0\; | 1A3 | 6C00 08F |
| 109900 | S | BR | (SRSRC552) | \BI =0\; | 1A4 | E118 00F |
| 110000 | | | | | | |
| 110100 | | | \RBS0 =1\ | | | |
| 110200 | | MMP | (4#,A1,B1,DANDA,QR) | \EXTRACT RBS1\; | 1A5 | 8411 94F |
| 110300 | S | TAMN | (ALUEZ,A0,B0,0,QR) | \TEST RBS1\; | 1A6 | 6C00 08F |
| 110400 | S | BR | (SRSRC551) | \BI =0\; | 1A7 | E11A C0F |
| 110500 | | | | | | |
| 110600 | | | \RBS0 =1, RBS1 =1\ | | | |
| 110700 | | MMP | (2#,A1,B1,DANDA,QR) | \EXTRCAT RBS2\; | 1A8 | 8211 94F |
| 110800 | S | TAMN | (ALUEZ,A0,B0,0,QR) | \TEST RBS2\; | 1A9 | 6C00 08F |
| 110900 | S | BR | (SRSRC568) | \BI =0 (RBS =110 (8))\; | 1AA | E118 80F |
| 111000 | S | BR | (SRSRC564) | \BI =1 (RBS =111 (4))\; | 1AB | E11C A0F |
| 111100 | | | | | | |
| 111200 | | | \RBS0 =1, RBS1 =0\ | | | |
| 111300 | SRSRC551 | MMP | (2#,A1,B1,DANDA,QR) | \EXTRACT RBS2\; | 1AC | 8211 94F |
| 111400 | S | TAMN | (ALUEZ,A0,B0,0,QR) | \TEST RBS2\; | 1AD | 6C00 08F |
| 111500 | S | BR | (SRSRC567) | \BI =0 (RBS =100 (7))\; | 1AE | E11C 60F |
| 111600 | S | BR | (SRSRC568) | \BI =1 (RBS =101 (8))\; | 1AF | E118 80F |
| 111700 | | | | | | |
| 111800 | | | \RBS0 =0\ | | | |
| 111900 | SRSRC552 | MMP | (4#,A1,B1,DANDA,QR) | \EXTRACT RBS1\; | 1B0 | 8411 94F |
| 112000 | S | TAMN | (ALUEZ,A0,B0,0,QR) | \TEST RBS1\; | 1B1 | 6C00 08F |
| 112100 | S | BR | (SRSRC553) | \BI =0\; | 1B2 | E118 70F |
| 112200 | | | | | | |
| 112300 | | | \RBS0 =0, RBS1 =1\; | | | |
| 112400 | S | MMP | (2#,A1,B1,DANDA,QR) | \EXTRACT RBS2\; | 1B3 | 8211 94F |
| 112500 | | TAMN | (ALUEZ,A0,B0,0,QR) | \TEST RBS2\; | 1B4 | 6C00 08F |
| 112600 | S | BR | (SRSRC566) | \BI =0 (RBS =010 (6))\; | 1B5 | E11C 20F |
| 112700 | S | BR | (SRSRC568) | \BI =1 (RBS =011 (8))\; | 1B6 | E118 80F |
| 112800 | | | | | | |
| 112900 | | | \RBS0 =0, RBS1 =0\ | | | |
| 113000 | SRSRC553 | MMP | (2#,A1,B1,DANDA,QR) | \EXTRACT RBS2\; | 1B7 | 8211 94F |
| 113100 | | TAMN | (ALUEZ,A0,B0,0,QR) | \TEST RBS2\; | 1B8 | 6C00 08F |
| 113200 | S | BR | (SRSRC565) | \BI =0 (RBS =000 (5))\; | 1B9 | E118 E0F |
| 113300 | S | BR | (SRSRC568) | \BI =1 (RBS =001 (8))\; | 1BA | E118 80F |
| 113400 | | | | | | |
| 113500 | | | | | | |
| 113600 | | | | | | |
| 113700 | | | \RBS =001, =011, =101, OR =110 (BYTE SIZE =8)\ | | | |
| 113800 | SRSRC568 | TAMN | (ALUEZ,A6,B6,A,QR) | \TEST RBSC =8(0)\; | 1BB | 6C66 10F |
| 113900 | S | BR | (SRTXT000) | \BI =8 (BYTE BOUNDARY)\; | 1BC | E124 60F |
| 114000 | S | BR | (SIDLE000) | \DONE IF NOT=8 (NOT BYTE BOUNDARY)\; | 1BD | E101 80F |
| 114100 | | | | | | |
| 114200 | | | | | | |
| 114300 | | | \RBS =000 (BYTE SIZE =5)\ | | | |
| 114400 | SRSRC565 | MMP | (D#,A0,B0,D,FR) | \SET F0 =5(1101)\; | 1BE | 8D00 1DF |
| 114500 | S | TAMN | (ALUEZ,A0,B6,BMA,QR) | \TEST RBSC =5\; | 1BF | 7C06 24F |
| 114600 | S | BR | (SRTXT000) | \BI =5 (BYTE BOUNDARY)\; | 1C0 | E124 60F |
| 114700 | S | BR | (SRSRC570) | \BI NOT=5 (NOT BYTE BNDRY)\; | 1C1 | E11C E0F |
| 114800 | | | | | | |
| 114900 | | | \RBS =010 (BYTE SIZE =6)\ | | | |
| 115000 | SRSRC566 | MMP | (E#,A0,B0,D,FR) | \SET F0 =6(1110)\; | 1C2 | 8E00 1DF |
| 115100 | S | TAMN | (ALUEZ,A0,B6,BMA,QR) | \TEST RBSC =6\; | 1C3 | 7C06 24F |
| 115200 | S | BR | (SRTXT000) | \BI =6 (BYTE BOUNDARY)\; | 1C4 | E124 60F |
| 115300 | S | BR | (SRSRC570) | \BI NOT=6 (NOT BYTE BNDRY)\; | 1C5 | E11C E0F |
| 115400 | | | | | | |
| 115500 | | | \RBS =100 (BYTE SIZE =7)\ | | | |
| 115600 | SRSRC567 | MMP | (F#,A0,B0,D,FR) | \SET F0 =7(1111)\; | 1C6 | 8F00 1DF |
| 115700 | S | TAMN | (ALUEZ,A0,B6,BMA,QR) | \TEST RBSC =7\; | 1C7 | 7C06 24F |
| 115800 | S | BR | (SRTXT000) | \BI =7 (BYTE BOUNDARY)\; | 1C8 | E124 60F |
| 115900 | S | BR | (SRSRC570) | \BI NOT=7 (NOT BYTE BNDRY)\; | 1C9 | E11C E0F |

MICROPROGRAM SECTION
SEQUENCE: SSROS

ADDRESS IMAGE
(HEX)   (HEX)

```
116000
116100
116200           \RBS =111 (BYTE SIZE =4)\
116300  SRSRC564  MMP    (C#,A0,B0,D,FR)        \SET FO =4(1100)\;              1CA  8C00 10F
116400  $         TAMN   (ALUEZ,A0,B6,BMA,QR)   \TEST RBSC =4\;                 1C8  7C06 24F
116500  $         BR     (SRTXT000)             \BI =7 (BYTE BOUNDARY)\;        1CC  E124 60F
116600  $         BR     (SRSRC570)             \BI NOT=4 (NOT BYTE BNDRY)\;    1CD  E11C E0F
116700
116800
116900           \NOT BYTE BOUNDARY AND BYTE SIZE NOT=8\
117000  SRSRC570  TAMN   (ALUEZ,A6,B6,A,QR)     \TEST RBSC =8(0)\;              1CE  6C66 10F
117100  $         BR     (SSOVRN00)             \BR TO SET OVRN SUBR IF =8      1CF  E12C A0F
117200                                          (OVERRUN ERROR BECAUSE BYTE
117300                                           SIZE SWITCH TOO LATE)\;
117400
117500           \ALL SEEMS WELL (RBSC NOT=8)\
117600  $         BR     (SIDLE000)             \DONE\;                         1D0  E101 80F
117700
117800
117900
118000
118100           \*** FLAG SEQUENCE RECEIVED  ***\
118200
118300           \(BRANCH PER RSRCSTATE)\
118400  SRSRC600  TAMN   (ALUEZ,A4,B1,A,FR)     \TEST FOR TEXT STATE\;          1D1  6C41 11F
118500  $         BR     (SREOF00)              \BI =TEXT(0)\;                  1D2  E128 70F
118600  $         TAMN   (ALUEZ,A1,B1,BM1,FR)   \TEST FOR INSYNC STATE\;        1D3  6C11 20F
118700  $         BR     (SSISYN00)             \BI =INSYNC(1)\;                1D4  E127 C0F
118800  $         TAMN   (ALUEZ,A1,B1,BM1,FR)   \TEST FOR ADDRESS STATE\;       1D5  6C11 20F
118900  $         BR     (SSISYN00)             \BI =ADDRESS(2)\;               1D6  E127 C0F
119000  $         TAMN   (ALUEZ,A1,B1,BM1,FR)   \TEST FOR CONTROL STATE\;       1D7  6C11 20F
119100  $         BR     (SRCNT600)             \BI =CONTROL(3)\;               1D8  E123 50F
119200  $         TAMN   (ALUEZ,A1,B1,BM1,FR)   \TEST FOR OVRN WAIT STATE\;     1D9  6C11 20F
119300  $         BR     (SROVW600)             \BI =OVRN WAIT(4)\;             1DA  E125 F0F
119400  $         TAMN   (ALUEZ,A1,B1,BM1,FR)   \TEST FOR OVERRUN STATE\;       1DB  6C11 20F
119500  $         BR     (SROVR600)             \BI =OVERRUN(5)\;               1DC  E126 60F
119600  $         TAMN   (ALUEZ,A1,B1,BM1,FR)   \TEST FOR ABORT STATE\;         1DD  6C11 20F
119700  $         BR     (SRABT600)             \BI =ABORT(6)\;                 1DE  E11F D0F
119800  $         TAMN   (ALUEZ,A1,B1,BM1,FR)   \TEST FOR OUTASYNC STATE\;      1DF  6C11 20F
119900  $         BR     (SRABT600)             \BI =OUTASYNC(7)\;              1E0  E11F D0F
120000  $         TAMN   (ALUEZ,A1,B1,BM1,FR)   \TEST FOR FIRST STATE\;         1E1  6C11 20F
120100  $         BR     (SRFST600)             \BI =FIRST(8)\;                 1E2  E11F 90F
120200  SRSRC620  BR     (SRSRC620)             \BR TO * (ERROR HALT)\;         1E3  E11E 30F
120300
120400
120500
120600
120700           \*** ABORT SEQUENCE RECEIVED  ***\
120800
120900           \(BRANCH PER RSRCSTATE)\
121000  SRSRC800  TAMN   (ALUEZ,A4,B1,A,FR)     \TEST FOR TEXT STATE\;          1E4  6C41 11F
121100  $         BR     (SREOFA00)             \BI =TEXT(0)\;                  1E5  E128 10F
121200  $         TAMN   (ALUEZ,A1,B1,BM1,FR)   \TEST FOR INSYNC STATE\;        1E6  6C11 20F
121300  $         BR     (SSABRT00)             \BI =INSYNC(1)\;                1E7  E127 80F
121400  $         TAMN   (ALUEZ,A1,B1,BM1,FR)   \TEST FOR ADDRESS STATE\;       1E8  6C11 20F
121500  $         BR     (SSABRT00)             \BI =ADDRESS(2)\;               1E9  E127 80F
121600  $         TAMN   (ALUEZ,A1,B1,BM1,FR)   \TEST FOR CONTROL STATE\;       1EA  6C11 20F
121700  $         BR     (SRCNT800)             \BI =CONTROL(3)\;               1EB  E124 10F
121800  $         TAMN   (ALUEZ,A1,B1,BM1,FR)   \TEST FOR OVRN WAIT STATE\;     1EC  6C11 20F
121900  $         BR     (SSABRT00)             \BI =OVRN WAIT (4)\;            1ED  E127 80F
122000  $         TAMN   (ALUEZ,A1,B1,BM1,FR)   \TEST FOR OVERRUN STATE\;       1EE  6C11 20F
122100  $         BR     (SROVR800)             \BI =OVERRUN(5)\;               1EF  E127 00F
122200  $         TAMN   (ALUEZ,A1,B1,BM1,FR)   \TEST FOR ABORT STATE\;         1F0  6C11 20F
122300  $         BR     (SRABT800)             \BI =ABORT(6)\;                 1F1  E11F F0F
122400  $         TAMN   (ALUEZ,A1,B1,BM1,FR)   \TEST FOR OUTASYNC STATE\;      1F2  6C11 20F
122500  $         BR     (SRFST800)             \BI =OUTASYNC(7)\;              1F3  E11F E0F
122600  $         TAMN   (ALUEZ,A1,B1,BM1,FR)   \TEST FOR FIRST STATE\;         1F4  6C11 20F
122700  $         BR     (SRFST800)             \BI =FIRST(8)\;                 1F5  E11F E0F
122800  SRSRC820  BR     (SRSRC820)             \BR TO * (ERROR HALT)\;         1F6  E11F 60F
122900
123000
123100
123200
123300           \****** FIRST, OUTASYNC OR ABORT STATE ******\
123400
123500
123600           \*** BYTE BOUNDARY  ***\
123700
123800  SRFST000  MMP    (7#,A4,B4,D,FR)        \SET RSRCSTATE =OUTASYNC\;      1F7  8744 10F
123900  $         BR     (SIDLE000)             \DONE\;                         1F8  E101 80F
124000
124100
124200           \*** FLAG RECEIVED IN FIRST STATE  ***\
124300
124400  SRFST600  TAMN   (ALUEZ,A6,B6,A,QR)     \TEST RBSC =8(0)\;              1F9  6C66 10F
124500  $         BR     (SSISYN00)             \BR TO SET INSYNC SUBR          1FA  E127 C0F
124600                                          IF =8\;
124700           \RBSC NOT=8\
124800  $         MMP    (7#,A4,B4,D,FR)        \SET RSRCSTATE =OUTASYNC\;      1FB  8744 10F
124900  $         BR     (SIDLE000)             \DONE\;                         1FC  E101 80F
125000
125100
125200           \*** FLAG RECEIVED IN OUTASYNC OR ABORT STATE  ***\
125300
125400  SRABT600  BR     (SSISYN00)             \BR TO SET INSYNC SUBR\;        1FD  E127 C0F
125500
125600
125700           \*** ABORT RECEIVED IN FIRST OR OUTASYNC STATE  ***\
125800
```

MICROPROGRAM SECTION

SEQUENCE: SSROS

```
                                                                                    ADDRESS  IMAGE
                                                                                    (HEX)    (HEX)
125900  SRFST800   BR     (SSABRT00)             \BR TO SET ABORT SUBR\;             1FE     E127 80F
126000
126100
126200
126300
126400             \*** ABORT RECEIVED IN ABORT STATE ***\
126400  SRABT800   TAMN   (ALUEZ,A6,B6,A,QR)     \TEST RBSC =8(0)\;                  1FF     6C66 10F
126500  $          BR     (SRABT805)             \BI =8\;                            200     E120 20F
126600  $          BR     (SIDLE000)             \DONE IF NOT=8\;                    201     E101 80F
126700
126800             \RBSC =8\
126900  SRABT805   MMP    (8,A6,B6,D,FR)         \SET RBSC =0 (8)\;                  202     8866 1DF
127000  SRCABT14   MMP    (1,AE,80,DANDA,QR)     \EXTRACT RSR07\;                    203     81E0 94F
127100  SRCABT15   TAMN   (ALUEZ,A0,80,Q,QR)     \TEST RSR07 =0\;                    204     6C00 08F
127200  SRCABT16   BR     (SIDLE000)             \DONE IF RSR07 =0\;                 205     E101 80F
127300
127400             \RSR07 =1\
127500  SRCABT17   RER    (R5,80,NOTD,FR)        \READ RC STATUS REG\;               206     CF50 FDB
127600  SRCABT18   MMP    (2,A0,80,DANDA,QR)     \EXTRACT RILS\;                     207     8200 94F
127700  SRCABT19   TAMN   (ALUEZ,A0,80,Q,QR)     \TEST RILS =0\;                     208     6C00 08F
127800  SRCABT20   BR     (SRABT810)             \BR IF RILS =0\;                    209     E120 80F
127900
128000             \RILS =1\
128100  SRCABT21   BR     (SIDLE000)             \DONE\;                             20A     E101 80F
128200
128300             \RILS =0\;
128400  SRABT810   MMP    (3#,A0,B0,DORA,FR)     \SET RILS,RILSFLG =1,1\;            20B     8300 75F
128500  SRCABT23   WER    (R5,80,B,QR)           \UPDATE RC STATUS REG\;             20C     2F50 0C8
128600  SRCABT24   BR     (SIDLE000)             \DONE\;                             20D     E101 80F
128700
128800
128900
129000             \****** INSYNC STATE ******\
129100
129200             \*** BYTE BOUNDARY ***\
129300
129400  SRINS000   MMP    (3,A2,B0,DANDA,FR)     \EXTRACT RBAC\;                     20E     8320 95F
129500  SRCINS02   MMP    (0,A0,B0,ALUZ,QR)      \ZERO QR\;                          20F     8000 88F
129600  SRCINS03   MMP    (0,A2,B1,A,SLQF)       \SHIFT RBFC MSB TO QR LSB\;         210     8021 15F
129700  SRCINS04   MMP    (0,A0,B1,B,SLQF)       \SHIFT RBFC LSB TO QR LSB\;         211     8001 0FF
129800  SRCINS05   TAMN   (ALUEZ,A0,B0,QMA,QR)   \TEST RBAC =RBFC\;                  212     7C00 20F
129900  SRCINS06   BR     (SRINS030)             \BR IF EQUAL\;                      213     E121 A0F
130000
130100             \RBAC NOT=RBFC\
130200  SRCINS07   MMP    (0,A0,B2,BM1,FR)       \DECREMENT RBAC\;                   214     8002 2DF
130300  SRCINS08   TAMN   (ALUEZ,A0,80,BM1,QR)   \TEST ORIGINAL RBAC =1\;            215     6C00 2CF
130400  $          BR     (SRINS020)             \BI =1 (NEW RBAC =0)\;              216     E121 80F
130500
130600             \RBAC NOT=0\;
130700  SRCINS10   BR     (SIDLE000)             \DONE\;                             217     E101 80F
130800
130900             \RBAC =0\
131000  SRINS020   MMP    (2#,A4,B4,D,FR)        \SET RSRCSTATE =ADDRESS\;           218     8244 1DF
131100  $          BR     (SIDLE000)             \DONE\;                             219     E101 80F
131200
131300             \OVERRUN DETECTED\;
131400
131500  SRINS030   BR     (SSOVRNW0)             \BR TO SET OVRN WAIT SUBR\;         21A     E12C 50F
131600
131700
131800
131900             \****** ADDRESS STATE ******\
132000
132100
132200             \*** BYTE BOUNDARY (1ST OCTET IN RBR) ***\
132300
132400  SRADR000   TAMN   (ALUEZ,A3,B3,A,QR)     \TEST RFCSTATE =OFF\;               21B     6C33 10F
132500  $          BR     (SRADR010)             \BI =OFF\;                          21C     E121 E0F
132600
132700             \OVERRUN (RFCSTATE NOT=OFF)\
132800  $          BR     (SSOVRNW0)             \BR TO SET OVRN WAIT SUBR\;         21D     E12C 50F
132900
133000             \NO OVERRUN (RFCSTATE =OFF)\
133100  SRADR010   WOB    (0,WRDL,B9,B,QR)       \COPY RBR.LH TO RDB.LH\;            21E     4099 0CF
133200  $          WOB    (0,WRDR,B8,B,QR)       \COPY RBR.RH TO RDB.RH\;            21F     40A8 0CF
133300  $          MMP    (8#,A7,B7,DORA,FR)     \SET RDBFFLG =1\;                   220     8877 75F
133400  $          MMP    (3#,A4,B4,D,FR)        \SET RSRCSTATE =CONTROL\;           221     8344 1DF
133500  $          BR     (SIDLE000)             \DONE\;                             222     E101 80F
133600
133700
133800
133900             \****** CONTROL STATE ******\
134000
134100
134200             \*** BYTE BOUNDARY (2ND OCTET IN RBR) ***\
134300
134400  SRCNT000   MMP    (8#,A7,B7,DANDA,QR)    \EXTRACT RDBFFLG\;                  223     8877 94F
134500  $          TAMN   (ALUEZ,A0,80,Q,QR)     \TEST RDBFFLG =0\;                  224     6C00 08F
134600  $          BR     (SRCNT010)             \BI =0\;                            225     E122 A0F
134700
134800             \OVERRUN (FIRST TRANSFER NOT STARTED (RDBFFLG =1))\
134900  $          RER    (R5,80,NOTD,QR)        \READ RC STATUS REG\;               226     CF50 FCB
135000  $          MMP    (8#,A0,B0,DANDQ,QR)    \SET RDHBT =0\;                     227     8800 98F
135100  $          WER    (R5,80,Q,QR)           \UPDATE RC STATUS REG\;             228     2F50 088
135200  $          BR     (SSOVRN00)             \BR TO SET OVERRUN SUBR\;           229     E12C A0F
135300
135400             \FIRST DATA TRANSFER STARTED (RDBFFLG =0)\
135500  SRCNT010   RER    (R5,80,NOTD,QR)        \READ RC STATUS REG\;               22A     CF50 FCB
135600  $          MMP    (4#,A0,B0,DORA,QR)     \SET RDHBT =1\;                     22B     8400 78F
135700  $          WER    (R5,80,Q,QR)           \UPDATE RC STATUS REG\;             22C     2F50 088
135800  $          TAMN   (RCSRQ,A0,80,Q,QR)     \TEST RC SERV REQ\;                 22D     6600 08F
```

MICROPROGRAM SECTION

SEQUENCE: SSROS

| | | | | | ADDRESS (HEX) | IMAGE (HEX) |
|---|---|---|---|---|---|---|
| 135900 | S | | BR | (SRCNT020) | \BI RESET\; | 22E | E123 00F |
| 136000 | | | | | | | |
| 136100 | | | \OVERRUN (FIRST TRANSFER NOT FINISHED (RCSRQ SET))\ | | | | |
| 136200 | S | | BR | (SSOVRN00) | \BR TO SET OVERRUN SUBR\; | 22F | E12C A0F |
| 136300 | | | | | | | |
| 136400 | | | \NO OVERRUN (FIRST TRANSFER FINISHED | | | | |
| 136500 | | | (RDBFFLG =0, AND RCSRQ RESET))\ | | | | |
| 136600 | | SRCNT020 | WOB | (0,WRDL,B9,8,QR) | \COPY RBR.LH TO RDB.LH\; | 230 | 4099 0CF |
| 136700 | | | WOB | (0,WRDR,B8,8,QR) | \COPY RBR.RH TO RDB.RH\; | 231 | 40A8 0CF |
| 136800 | S | | MMP | (8#,A7,B7,DORA,FR) | \SET RDBFFLG =1\; | 232 | 8877 75F |
| 136900 | S | | MMP | (0#,A4,B4,D,FR) | \SET RSRCSTATE =TEXT\; | 233 | 8044 1DF |
| 137000 | S | | BR | (SIDLE000) | \DONE\; | 234 | E101 80F |
| 137100 | | | | | | | |
| 137200 | | | | | | | |
| 137300 | | | \*** FLAG SEQUENCE RECEIVED ***\ | | | | |
| 137400 | | | | | | | |
| 137500 | | SRCNT600 | TAMN | (ALUEZ,A6,B6,A,QR) | \TEST RBSC =8(0)\; | 235 | 6C66 10F |
| 137600 | S | | BR | (SREOFF00) | \BR TO EOFF SUBR IF =8 | 236 | E128 70F |
| 137700 | | | | | (32 BITS = VALID FRAME)\; | | |
| 137800 | | | | | | | |
| 137900 | | | \INVALID (SHORT) FRAME (RBSC NOT=8)\ | | | | |
| 138000 | S | | MMP | (8#,A7,B7,DANDA,QR) | \EXTRACT RDBFFLG\; | 237 | 8877 94F |
| 138100 | S | | TAMN | (ALUEZ,A0,B0,Q,QR) | \TEST RDBFFLG =0\; | 238 | 6C00 08F |
| 138200 | S | | BR | (SRCNT620) | \BI =0\; | 239 | E123 C0F |
| 138300 | | | | | | | |
| 138400 | | | \NO STATUS REPORT REQD (NO DATA TRANSFERRED (RDBFFLG =1))\ | | | | |
| 138500 | S | | MMP | (5#,A7,B7,DANDA,FR) | \SET RDBFFLG,RREQFLG =0,0\; | 23A | 8577 95F |
| 138600 | S | | BR | (SSISYN00) | \BR TO SET INSYNC SUBR\; | 23B | E127 C0F |
| 138700 | | | | | | | |
| 138800 | | | \STATUS REPORT REQUIRED (DATA TRANSFERRED (RDBFFLG =0))\ | | | | |
| 138900 | | SRCNT620 | RER | (R5,B0,NOTD,FR) | \READ RC STATUS REG\; | 23C | CF50 FDB |
| 139000 | S | | MMP | (C#,A0,B0,DANDA,FR) | \SET RILS,RILSFLG =0,0\; | 23D | 8C00 95F |
| 139100 | S | | WER | (R5,B0,B,QR) | \UPDATE RC STATUS REG\; | 23E | 2F50 0CB |
| 139200 | S | | MMP | (8#,A3,B3,D,FR) | \SET RFCSTATE =FLAG SHORT\; | 23F | 8B33 1DF |
| 139300 | S | | BR | (SSISYN00) | \BR TO SET INSYNC SUBR\; | 240 | E127 C0F |
| 139400 | | | | | | | |
| 139500 | | | | | | | |
| 139600 | | | \*** ABORT SEQUENCE RECEIVED ***\ | | | | |
| 139700 | | | | | | | |
| 139800 | | SRCNT800 | MMP | (8#,A7,B7,DANDA,QR) | \EXTRACT RDBFFLG\; | 241 | 8877 94F |
| 139900 | S | | TAMN | (ALUEZ,A0,B0,Q,QR) | \TEST RDBFFLG\; | 242 | 6C00 08F |
| 140000 | S | | BR | (SREOFA00) | \BR TO EOFA SUBR IF =0 | 243 | E128 10F |
| 140100 | | | | | (DATA TRANSFERRED, | | |
| 140200 | | | | | STATUS REPORT REQUIRED)\; | | |
| 140300 | | | | | | | |
| 140400 | | | \NO STATUS REPORT REQD (NO DATA TRANSFERRED (RDBFFLG =1))\ | | | | |
| 140500 | S | | MMP | (5#,A7,B7,DANDA,FR) | \SET RDBFFLG,RREQFLG =0,0\; | 244 | 8577 95F |
| 140600 | S | | BR | (SSABRT00) | \BR TO SET ABORT SUBR\; | 245 | E127 80F |
| 140700 | | | | | | | |
| 140800 | | | | | | | |
| 140900 | | | | | | | |
| 141000 | | | \****** TEXT STATE ******\ | | | | |
| 141100 | | | | | | | |
| 141200 | | | | | | | |
| 141300 | | | \*** BYTE BOUNDARY ***\ | | | | |
| 141400 | | | | | | | |
| 141500 | | SRTXT000 | MMP | (8#,A7,B7,DANDA,QR) | \EXTRACT RDBFFLG\; | 246 | 8877 94F |
| 141600 | S | | TAMN | (ALUEZ,A0,B0,Q,QR) | \TEST RDBFFLG\; | 247 | 6C00 08F |
| 141700 | S | | BR | (SRTXT020) | \BI =0\; | 248 | E124 A0F |
| 141800 | | | | | | | |
| 141900 | | | \OVERRUN (PREVIOUS TRANSFER NOT STARTED (RDBFFLG =1))\ | | | | |
| 142000 | S | | BR | (SSOVRN00) | \BR TO SET OVRN SUBR\; | 249 | E12C A0F |
| 142100 | | | | | | | |
| 142200 | | | \FIRST DATA TRANSFER STARTED (RDBFFLG =0)\ | | | | |
| 142300 | | SRTXT020 | TAMN | (RCSRQ,A0,B0,Q,QR) | \TEST RC SERV REQ\; | 24A | 6600 08F |
| 142400 | S | | BR | (SRTXT040) | \BI RESET\; | 24B | E124 D0F |
| 142500 | | | | | | | |
| 142600 | | | \OVERRUN (PREVIOUS TRANSFER NOT FINISHED (RCSRQ SET))\ | | | | |
| 142700 | S | | BR | (SSOVRN00) | \BR TO SET OVRN SUBR\; | 24C | E12C A0F |
| 142800 | | | | | | | |
| 142900 | | | \NO OVERRUN (PREVIOUS TRANSFER FINISHED | | | | |
| 143000 | | | (RDBFFLG =0, AND RCSRQ RESET))\ | | | | |
| 143100 | | SRTXT040 | TAMN | (ALUEZ,A6,B6,A,QR) | \TEST RBSC =8(0)\; | 24D | 6C66 10F |
| 143200 | S | | BR | (SRTXT100) | \BI =8 (NO R-J REQD)\; | 24E | E125 50F |
| 143300 | | | | | | | |
| 143400 | | | \RIGHT-JUSTIFICATION LOOP\ | | | | |
| 143500 | | SRTXT044 | MMP | (0,A9,B9,8,QR) | \LOAD RBR.LH INTO QR\; | 24F | 8099 0CF |
| 143600 | S | | MMP | (0,A8,B8,B,SRQF) | \SHIFT RDB RIGHT 1 BIT\; | 250 | 8088 0E7 |
| 143700 | | | MMP | (7#,A9,B9,DANDQ,FR) | \SET MSB OF RBR =0 | 251 | 8799 99F |
| 143800 | | | | | RESTORE RBR.LH\; | | |
| 143900 | | | TAMN | (ALUEZ,A6,B6,AP1,FR) | \+1 TO RBSC AND TEST =8(0)\; | 252 | 7C66 11F |
| 144000 | S | | BR | (SRTXT100) | \BI RBSC =8\; | 253 | E125 50F |
| 144100 | S | | BR | (SRTXT044) | \BI RBSC NOT=8 | 254 | E124 F0F |
| 144200 | | | | | TO DO NEXT SHIFT\; | | |
| 144300 | | | | | | | |
| 144400 | | | \NO RIGHT-JUSTIFICATION REQD OR RIGHT-JUSTIFICATION CMPLT\ | | | | |
| 144500 | | SRTXT100 | WOB | (0,WRDL,B9,8,QR) | \COPY RBR.LH TO RDB.LH\; | 255 | 4099 0CF |
| 144600 | S | | WOB | (0,WRDR,B8,8,QR) | \COPY RBR.RH TO RDB.RH\; | 256 | 40A8 0CF |
| 144700 | S | | MMP | (8#,A7,B7,DORA,FR) | \SET RDBFFLG =1\; | 257 | 8877 75F |
| 144800 | S | | MMP | (8,A6,B6,D,FR) | \SET RBSC =0(8)\; | 258 | 8866 1DF |
| 144900 | S | | BR | (SIDLE000) | \DONE\; | 259 | E101 80F |
| 145000 | | | | | | | |
| 145100 | | | | | | | |
| 145200 | | | \****** OVERRUN WAIT STATE ******\ | | | | |
| 145300 | | | | | | | |
| 145400 | | | | | | | |
| 145500 | | | | | | | |
| 145600 | | | \*** BYTE BOUNDARY ***\ | | | | |

MICROPROGRAM SECTION
SEQUENCE: SSROS

```
                                                                                    ADDRESS  IMAGE
                                                                                    (HEX)    (HEX)
145700
145800   SROVW000   MMP    (3#,A2,B0,DANDA,FR)      \EXTRACT RBAC\;                 25A   8320 95F
145900   $          TAMN   (ALUEZ,A0,B0,A,QR)       \TEST RBAC =0\;                 25B   6C00 10F
146000   $          BR     (SSOVRN05)               \BR TO SET OVRN SUBR IF         25C   E12C 80F
146100                                                RBAC =0 (>32 BITS)\;
146200
146300              \FRAME NOT YET 32 BITS  (RBAC NOT=0)\
146400   $          MMP    (0,A2,B2,AM1,FR)         \DECREMENT RBAC\;               25D   8022 31F
146500   $          BR     (SIDLE000)               \DONE\;                         25E   E101 80F
146600
146700
146800              \*** FLAG SEQUENCE RECEIVED ***\
146900
147000   SROVW600   TAMN   (ALUEZ,A6,B6,A,QR)       \TEST RBSC =8(0)\;              25F   6C66 10F
147100   $          BR     (SROVW620)               \BI =B\;                        260   E126 20F
147200
147300              \NO OVERRUN (SHORT FRAME (RBSC NOT=8))\
147400   $          BR     (SSISYN00)               \BR TO SET INSYNC SUBR\;        261   E127 C0F
147500
147600              \RBSC =8\
147700   SROVW620   MMP    (3#,A2,B0,DANDA,FR)      \EXTRACT RBAC\;                 262   8320 95F
147800   $          TAMN   (ALUEZ,A0,B0,A,QR)       \TEST RBAC =0\;                 263   6C00 10F
147900   $          BR     (SROVW600)               \BI =0 (VALID FRAME)\;          264   E126 60F
148000
148100              \NO OVERRUN (SHORT FRAME (RBAC NOT=0))\
148200   $          BR     (SSISYN00)               \BR TO SET INSYNC SUBR\;        265   E127 C0F
148300
148400
148500
148600              \****** OVERRUN STATE ******\
148700
148800
148900              \*** FLAG SEQUENCE RECIEVED ***\
149000
149100   SROVR600   RER    (R5,B1,NOTD,FR)          \READ RC STATUS REG TO F1\;     266   CF51 F0B
149200   $          TAMN   (ALUEZ,A3,B3,A,QR)       \TEST RFCSTATE =OFF\;           267   6C33 10F
149300   $          BR     (SROVR620)               \BI =OFF\;                      268   E126 C0F
149400
149500              \PROCESSING OF PREVIOUS FRAME NOT DONE (RFCSTATE NOT =OFF)\
149600   $          MMP    (8#,A1,B1,DORA,QR)       \SET ROSD =1\;                  269   8811 74F
149700   $          WER    (R5,B0,Q,QR)             \UPDATE RC STATUS REG\;         26A   2F50 08B
149800   $          BR     (SSISYN00)               \BR TO SET INSYNC SUBR\;        26B   E127 C0F
149900
150000              \PROCESSING OF PREVIOUS FRAME DONE (RFCSTATE =OFF)\
150100   SROVR620   MMP    (C#,A1,B1,DANDA,QR)      \SET RILS,RILSFLG =0,0\;        26C   8C11 94F
150200   $          WER    (R5,B0,Q,QR)             \UPDATE RC STATUS REG\;         26D   2F50 08B
150300   $          MMP    (A#,A3,B3,D,FR)          \SET RFCSTATE =FLAG OVRN\;      26E   8A33 10F
150400   $          BR     (SSISYN00)               \BR TO SET INSYNC SUBR\;        26F   E127 C0F
150500
150600
150700              \*** ABORT SEQUENCE RECEIVED ***\
150800
150900   SROVR800   RER    (R5,B1,NOTD,FR)          \READ RC STATUS REG TO F1\;     270   CF51 F0B
151000   $          MMP    (4#,A1,B1,DANDA,QR)      \EXTRACT RDHBT\;                271   8411 94F
151100   $          TAMN   (ALUEZ,A0,B0,Q,QR)       \TEST RDHBT\;                   272   6C00 08F
151200   $          BR     (SSABRT00)               \BR TO SET ABORT SUBR IF =0     273   E127 80F
151300                                                (NO DATA TRANSFERRED, NO
151400                                                STATUS REPORT REQUIRED)\;
151500
151600              \STATUS REPORT REQD (DATA WAS TRANSFERRED (RDHBT =1))\
151700   $          MMP    (C#,A1,B1,DANDA,QR)      \SET RILS,RILSFLG =0,0\;        274   8C11 94F
151800   $          WER    (R5,B0,Q,QR)             \UPDATE RC STATUS REG\;         275   2F50 08B
151900   $          MMP    (9#,A3,B3,D,FR)          \SET RFCSTATE =ABRT OVERRUN\;   276   8933 10F
152000   $          BR     (SSABRT00)               \BR TO SET ABORT SUBR\;         277   E127 80F
152100
152200
152300
152400
152500
152600
152700              \****** RSRC SUBROUTINES ******\
152800
152900
153000              \** SET RSRCSTATE =ABORT SUBROUTINE **\
153100
153200   SSABRT00   MMP    (6#,A0,B4,D,FR)          \SET RSRCSTATE =ABORT\;         278   8604 10F
153300   SSABRT01   MMP    (3,A2,B2,DORA,FR)        \SET RBAC =3\;                  279   8322 75F
153400   $          MMP    (8,A6,B6,D,FR)           \SET RBSC =0(8)\;               27A   8866 10F
153500   SSABRT06   BR     (SIDLE000)               \DONE\;                         27B   E101 80F
153600
153700
153800              \** SET RSRCSTATE =INSYNC SUBROUTINE **\
153900
154000   SSISYN00   MMP    (1#,A0,B4,D,FR)          \SET RSRCSTATE =INSYNC\;        27C   8104 10F
154100   $          MMP    (3,A2,B2,DORA,FR)        \SET RBAC =3\;                  27D   8322 75F
154200   $          MMP    (8,A6,B6,D,FR)           \SET RBSC =0(8)\;               27E   8866 10F
154300   $          MMP    (8#,A5,B5,D,FR)          \SET RSC =0(8)\;                27F   8855 10F
154400   $          BR     (SIDLE000)               \DONE\;                         280   E101 80F
154500
154600
154700              \** END OF FRAME ABORT SUBROUTINE **\
154800
154900   SREOFA00   MMP    (8#,A0,B3,D,FR)          \SET RFCSTATE =ABORT\;          281   8803 10F
155000   $          MMP    (5#,A7,B7,DANDA,FR)      \SET RDBFFLG,RREQFLG =0,0\;     282   8577 95F
155100   $          RER    (R5,B1,NOTD,FR)          \READ RC STATUS REG\;           283   CF51 F0B
155200   $          MMP    (C#,A1,B1,DANDA,QR)      \SET RILS,RILSFLG =0,0\;        284   8C11 94F
155300   $          WER    (R5,B0,Q,QR)             \UPDATE RC STATUS REG\;         285   2F50 08B
155400   $          BR     (SSABRT00)               \BR TO SET ABORT SUBROUTINE\;   286   E127 80F
155500
155600
```

MICROPROGRAM SECTION
SEQUENCE: SSROS

| Line | Label | Op | Operands | Comment | ADDRESS (HEX) | IMAGE (HEX) |
|---|---|---|---|---|---|---|
| 155700 | | | \** END OF FRAME FLAG SUBROUTINE **\ | | | |
| 155800 | | | | | | |
| 155900 | SREOFF00 | MMP | (C#,A2,B2,DORA,FR) | \SET RBFC =5\; | 287 | 8C22 75F |
| 156000 | S | WER | (R8,B6,B,QR) | \COPY R3SC TO RLBSR\; | 288 | 2F86 0C8 |
| 156100 | S | RER | (R5,B1,NOTD,FR) | \READ RC STATUS REG\; | 289 | CF51 FD8 |
| 156200 | S | MMP | (C#,A1,B1,DANDA,QR) | \SET RILS,RILSFLG =0,0\; | 28A | 8C11 94F |
| 156300 | S | WER | (R5,B0,Q,QR) | \UPDATE RC STATUS REG\; | 28B | 2F50 088 |
| 156400 | S | TAMN | (ALUEZ,A6,B6,A,QR) | \TEST RBSC =8(0)\; | 28C | 6C66 10F |
| 156500 | S | BR | (SREOFF80) | \BI =8 (NO R-J REQD)\; | 28D | E12C 30F |
| 156600 | | | | | | |
| 156700 | | | \A TEST FOR PARTIAL BYTE, AND | | | |
| 156800 | | | RIGHT-JUSTIFICATION REQUIRED (RBSC NOT=8)\ | | | |
| 156900 | | | | | | |
| 157000 | | | \(TEST FOR PARTIAL BYTE)\ | | | |
| 157100 | S | RIB | (RRCC,B1,D,FR) | \READ RC LR6 BITS 6-7 TO F1\; | 28E | AF41 10E |
| 157200 | S | MMP | (8#,A1,B1,DANDA,QR) | \EXTRACT RBS0\; | 28F | 8811 94F |
| 157300 | S | TAMN | (ALUEZ,A0,B0,Q,QR) | \TEST RBS0\; | 290 | 6C00 08F |
| 157400 | S | BR | (SREOFF02) | \BI =0\; | 291 | E129 D0F |
| 157500 | | | | | | |
| 157600 | | | \RBS0 =1\ | | | |
| 157700 | S | MMP | (4#,A1,B1,DANDA,QR) | \EXTRACT RBS1\; | 292 | 8411 94F |
| 157800 | S | TAMN | (ALUEZ,A0,B0,Q,QR) | \TEST RBS1\; | 293 | 6C00 08F |
| 157900 | S | BR | (SREOFF01) | \BI =0\; | 294 | E129 90F |
| 158000 | | | | | | |
| 158100 | | | \RBS0 =1, RBS1 =1\ | | | |
| 158200 | S | MMP | (2#,A1,B1,DANDA,QR) | \EXTRACT RBS2\; | 295 | 8211 94F |
| 158300 | S | TAMN | (ALUEZ,A0,B0,Q,QR) | \TEST RBS2\; | 296 | 6C00 08F |
| 158400 | S | BR | (SREOFF20) | \BI =0 (RBS =110 (8))\; | 297 | E128 80F |
| 158500 | S | BR | (SREOFF14) | \BI =1 (RBS =111 (4))\; | 298 | E12A 80F |
| 158600 | | | | | | |
| 158700 | | | \RBS0 =1, RBS1 =0\ | | | |
| 158800 | SREOFF01 | MMP | (2#,A1,B1,DANDA,QR) | \EXTRACT RBS2\; | 299 | 8211 94F |
| 158900 | S | TAMN | (ALUEZ,A0,B0,Q,QR) | \TEST RBS2\; | 29A | 6C00 08F |
| 159000 | S | BR | (SREOFF17) | \BI =0 (RBS =100 (7))\; | 29B | E128 40F |
| 159100 | S | BR | (SREOFF20) | \BI =1 (RBS =101 (8))\; | 29C | E128 80F |
| 159200 | | | | | | |
| 159300 | | | \RBS0 =0\ | | | |
| 159400 | SREOFF02 | MMP | (4#,A1,B1,DANDA,QR) | \EXTRACT RBS1\; | 29D | 8411 94F |
| 159500 | S | TAMN | (ALUEZ,A0,B0,Q,QR) | \TEST RBS1\; | 29E | 6C00 08F |
| 159600 | S | BR | (SREOFF03) | \BI =0\; | 29F | E12A 40F |
| 159700 | | | | | | |
| 159800 | | | \RBS0 =0, RBS1 =1\; | | | |
| 159900 | S | MMP | (2#,A1,B1,DANDA,QR) | \EXTRACT RBS2\; | 2A0 | 8211 94F |
| 160000 | S | TAMN | (ALUEZ,A0,B0,Q,QR) | \TEST RBS2\; | 2A1 | 6C00 08F |
| 160100 | S | BR | (SREOFF16) | \BI =0 (RBS =010 (6))\; | 2A2 | E128 00F |
| 160200 | S | BR | (SREOFF20) | \BI =1 (RBS =011 (8))\; | 2A3 | E128 80F |
| 160300 | | | | | | |
| 160400 | | | \RBS0 =0, RBS1 =0\ | | | |
| 160500 | SREOFF03 | MMP | (2#,A1,B1,DANDA,QR) | \EXTRACT RBS2\; | 2A4 | 8211 94F |
| 160600 | S | TAMN | (ALUEZ,A0,B0,Q,QR) | \TEST RBS2\; | 2A5 | 6C00 08F |
| 160700 | S | BR | (SREOFF15) | \BI =0 (RBS =000 (5))\; | 2A6 | E12A C0F |
| 160800 | S | BR | (SREOFF20) | \BI =1 (RBS =001 (8))\; | 2A7 | E128 80F |
| 160900 | | | | | | |
| 161000 | | | | | | |
| 161100 | | | \RBS NOT=8\ | | | |
| 161200 | | | \RBS =111 (BYTE SIZE =4)\ | | | |
| 161300 | SREOFF14 | MMP | (C#,A0,B0,D,FR) | \SET F0 =4(1100)\; | 2A8 | 8C00 1DF |
| 161400 | S | TAMN | (ALUEZ,A0,B6,BMA,QR) | \TEST RBSC =4\; | 2A9 | 7C06 24F |
| 161500 | S | BR | (SREOFF21) | \BI =4 (FULL BYTE)\; | 2AA | E128 80F |
| 161600 | S | BR | (SREOFF20) | \BI NOT=4 (PARTIAL BYTE)\; | 2AB | E128 80F |
| 161700 | | | | | | |
| 161800 | | | \RBS =000 (BYTE SIZE =5)\ | | | |
| 161900 | SREOFF15 | MMP | (D#,A0,B0,D,FR) | \SET F0 =5(1101)\; | 2AC | 8D00 1DF |
| 162000 | S | TAMN | (ALUEZ,A0,B6,BMA,QR) | \TEST RBSC =5\; | 2AD | 7C06 24F |
| 162100 | S | BR | (SREOFF21) | \BI =5 (FULL BYTE)\; | 2AE | E128 80F |
| 162200 | S | BR | (SREOFF20) | \BI NOT=5 (PARTIAL BYTE)\; | 2AF | E128 80F |
| 162300 | | | | | | |
| 162400 | | | \RBS =010 (BYTE SIZE =6)\ | | | |
| 162500 | SREOFF16 | MMP | (E#,A0,B0,D,FR) | \SET F0 =6(1110)\; | 2B0 | 8E00 1DF |
| 162600 | S | TAMN | (ALUEZ,A0,B6,BMA,QR) | \TEST RBSC =6\; | 2B1 | 7C06 24F |
| 162700 | S | BR | (SREOFF21) | \BI =6 (FULL BYTE)\; | 2B2 | E128 80F |
| 162800 | S | BR | (SREOFF20) | \BI NOT=6 (PARTIAL BYTE)\; | 2B3 | E128 80F |
| 162900 | | | | | | |
| 163000 | | | \RBS =100 (BYTE SIZE =7)\ | | | |
| 163100 | SREOFF17 | MMP | (F#,A0,B0,D,FR) | \SET F0 =7(1111)\; | 2B4 | 8F00 1DF |
| 163200 | S | TAMN | (ALUEZ,A0,B6,BMA,QR) | \TEST RBSC =7\; | 2B5 | 7C06 24F |
| 163300 | S | BR | (SREOFF21) | \BI =7 (FULL BYTE)\; | 2B6 | E128 80F |
| 163400 | S | BR | (SREOFF20) | \BI NOT=7 (PARTIAL BYTE)\; | 2B7 | E128 80F |
| 163500 | | | | | | |
| 163600 | | | | | | |
| 163700 | | | \PARTIAL BYTE\ | | | |
| 163800 | SREOFF20 | RER | (R6,B1,NOTD,FR) | \READ RC FLAGS REG\; | 2B8 | CF61 FD8 |
| 163900 | S | MMP | (1#,A1,B1,DORA,QR) | \SET RPBFLG =1\; | 2B9 | 8111 74F |
| 164000 | S | WER | (R6,B0,Q,QR) | \UPDATE RC FLAGS REG\; | 2BA | 2F60 088 |
| 164100 | | | | | | |
| 164200 | | | | | | |
| 164300 | | | \(RIGHT-JUSTIFY)\ | | | |
| 164400 | SREOFF21 | MMP | (0,A9,B9,B,QR) | \LOAD RBR.LH INTO QR\; | 2BB | 8099 0CF |
| 164500 | S | MMP | (0,A8,B8,B,SRQF) | \SHIFT RDB RIGHT 1 BIT\; | 2BC | 8088 0E7 |
| 164600 | S | MMP | (7#,A9,B9,DANDQ,FR) | \SET MSB OF RBR =0, RESTORE RBR.LH\; | 2BD | 8799 99F |
| 164700 | | | | | | |
| 164800 | S | TAMN | (ALUEZ,A6,B6,AP1,FR) | \+1 TO RBSC AND TEST =8(0)\; | 2BE | 7C66 11F |
| 164900 | S | BR | (SREOFF80) | \BI =8\; | 2BF | E12C 30F |
| 165000 | | | | | | |
| 165100 | | | \RIGHT-JUSTIFICATION MUST BE FINISHED BY RFC ROUTINE\ | | | |
| 165200 | S | WER | (R7,B6,B,QR) | \COPY RBSC TO RLBSC\; | 2C0 | 2F76 0C8 |
| 165300 | S | MMP | (4#,A3,B3,D,FR) | \SET RFCSTATE =RGHT-JUSTIFY\; | 2C1 | 8433 1DF |
| 165400 | S | BR | (SSISYN00) | \BR TO SET INSYNC SUBR\; | 2C2 | E127 C0F |
| 165500 | | | | | | |
| 165600 | | | | | | |

MICROPROGRAM SECTION

SEQUENCE: SSROS

| | | | | ADDRESS (HEX) | IMAGE (HEX) |
|---|---|---|---|---|---|
| 165700 | | \NO RIGHT-JUSTIFICATION REQD, OR R-J FINISHED\ | | | |
| 165800 | SREOFFB0 | MMP | (5#,A3,B3,0,FR) \SET RFCSTATE =LAST DATA\; | 2C3 | 8533 1DF |
| 165900 | S | BR | (SSISYN00) \BR TO SET INSYNC SUBR\; | 2C4 | E127 C0F |
| 166000 | | | | | |
| 166100 | | | | | |
| 166200 | | \** SET RSRCSTATE =OVERRUN WAIT SUBROUTINE **\ | | | |
| 166300 | | | | | |
| 166400 | SSOVRNW0 | RER | (R5,B1,NOTD,FR) \READ RC STATUS REG\; | 2C5 | CF51 FDB |
| 166500 | S | MMP | (0#,A1,B1,DANDA,QR) \SET RDHBT =0\; | 2C6 | 8011 94F |
| 166600 | S | WER | (R5,B0,Q,QR) \UPDATE RC STATUS REGISTER\; | 2C7 | 2F50 0BB |
| 166700 | S | MMP | (4#,A4,B4,D,FR) \SET RSRCSTATE =OVRN WAIT\; | 2C8 | 8444 1DF |
| 166800 | S | BR | (SIDLE000) \DONE\; | 2C9 | E101 80F |
| 166900 | | | | | |
| 167000 | | | | | |
| 167100 | | \** SET RSRCSTATE =OVERRUN SUBROUTINE **\ | | | |
| 167200 | | | | | |
| 167300 | SSOVRN00 | MMP | (5#,A7,B7,DANDA,FR) \SET RDBFFLG,RREQFLG =0,0\; | 2CA | 8577 95F |
| 167400 | SSOVRN05 | MMP | (3,A2,B2,OORA,FR) \SET RBAC =3\; | 2CB | 8322 75F |
| 167500 | S | MMP | (5#,A4,B4,D,FR) \SET RSRCSTATE =OVERRUN\; | 2CC | 8544 1DF |
| 167600 | S | BR | (SIDLE000) \DONE\; | 2CD | E101 80F |
| 167700 | | | | | |
| 167800 | | | | | |
| 167900 | SKIP HOF; | | | | |
| 168000 | | \*******************************\ | | | |
| 168100 | | \** **\ | | | |
| 168200 | | \** RECEIVE DATA REQUEST CONTROL ROUTINE **\ | | | |
| 168300 | | \** **\ | | | |
| 168400 | | \*******************************\ | | | |
| 168500 | | | | | |
| 168600 | SRDRC000 | WOB | (0,WSTS,B0,ALUZ,QR) \SET STATUS BYTE =3000\; | 2CE | 4010 88F |
| 168700 | S | MMP | (5#,A7,B7,DANDA,FR) \SET RDBFFLG,RREQFLG =0,0\; | 2CF | 8577 95F |
| 168800 | S | BRSC | (SIDLE000,SRCSRQ) \SET RCSRQ, DONE\; | 2D0 | E601 80F |
| 168900 | | | | | |
| 169000 | SKIP HOF; | | | | |
| 169100 | | \*******************************\ | | | |
| 169200 | | \** **\ | | | |
| 169300 | | \** RECEIVE FLUSH CONTROL ROUTINE **\ | | | |
| 169400 | | \** **\ | | | |
| 169500 | | \*******************************\ | | | |
| 169600 | | | | | |
| 169700 | SRCFCR00 | TAMN | (ALUEZ,A5,B0,A,FR) \TEST RFCSTATE\; | 2D1 | 6C30 11F |
| 169800 | SRCFCR01 | BR | (SRFOFF00) \BR IF OFF (0)\; | 2D2 | E12F 00F |
| 169900 | SRCFCR02 | TAMN | (ALUEZ,A0,B0,BM1,FR) \TEST RFCSTATE\; | 2D3 | 6C00 2DF |
| 170000 | SRCFCR03 | BR | (SRFRST00) \BR IF RESET STATUS (1)\; | 2D4 | E135 20F |
| 170100 | SRCFCR05 | TAMN | (ALUEZ,A0,B0,BM1,FR) \TEST RFCSTATE\; | 2D5 | 6C00 2DF |
| 170200 | SRCFCR06 | BR | (SRFSCS00) \BR IF SECOND FCS (2)\; | 2D6 | E134 C0F |
| 170300 | SRCFCR07 | TAMN | (ALUEZ,A0,B0,BM1,FR) \TEST RFCSTATE\; | 2D7 | 6C00 2DF |
| 170400 | SRCFCR08 | BR | (SRFFCS00) \BR IF FIRST FCS (3)\; | 2D8 | E134 60F |
| 170500 | SRCFCR09 | TAMN | (ALUEZ,A0,B0,BM1,FR) \TEST RFCSTATE\; | 2D9 | 6C00 2DF |
| 170600 | S | BR | (SRFJ000) \BR IF RIGHT-JUSTIFY (4)\; | 2DA | E12F 80F |
| 170700 | SRCFCR11 | TAMN | (ALUEZ,A0,B0,BM1,FR) \TEST RFCSTATE\; | 2DB | 6C00 2DF |
| 170800 | SRCFCR12 | BR | (SRFLDT00) \BR IF LAST DATA (5)\; | 2DC | E130 F0F |
| 170900 | | | | | |
| 171000 | | \RFCSTATE =ABORT, =ABORT OVERRUN, | | | |
| 171100 | | =FLAG OVERRUN, OR =FLAG SHORT\ | | | |
| 171200 | S | RER | (R6,B1,NOTD,FR) \READ RC FLAGS REG TO F1\; | 2DD | CF61 FDB |
| 171300 | S | MMP | (2#,A1,B1,DANDA,QR) \EXTRACT RFCFLG\; | 2DE | 8211 06F |
| 171400 | S | TAMN | (ALUEZ,A0,B0,Q,QR) \TEST RFCFLG =0\; | 2DF | 6C00 08F |
| 171500 | S | BR | (SRCFCR50) \BI =0\; | 2E0 | E12E C0F |
| 171600 | | | | | |
| 171700 | | \SECOND PASS (RFCFLG =1)\ | | | |
| 171800 | S | MMP | (1#,A3,B3,D,FR) \SET NEXT RFCSTATE =RESET STATUS\; | 2E1 | 8135 1DF |
| 171900 | | | | | |
| 172000 | S | MMP | (2#,A0,B0,AMD,FR) \SET TEST RFCSTATE =RFCSTATE-2\; | 2E2 | 9200 35F |
| 172100 | | | | | |
| 172200 | S | TAMN | (ALUEZ,A0,B0,BM1,FR) \TEST (ORIG) RFCSTATE\; | 2E3 | 6C00 2DF |
| 172300 | S | BR | (SRFABT00) \BI =ABORT (8)\; | 2E4 | E135 F0F |
| 172400 | S | TAMN | (ALUEZ,A0,B0,BM1,FR) \TEST RFCSTATE\; | 2E5 | 6C00 2DF |
| 172500 | S | BR | (SRFAB000) \BI =ABRT OVRN (9)\; | 2E6 | E136 10F |
| 172600 | S | TAMN | (ALUEZ,A0,B0,BM1,FR) \TEST RFCSTATE\; | 2E7 | 6C00 2DF |
| 172700 | S | BR | (SRFFG000) \BI =FLAG OVRN (A)\; | 2E8 | E136 30F |
| 172800 | S | TAMN | (ALUEZ,A0,B0,BM1,FR) \TEST RFCSTATE\; | 2E9 | 6C00 2DF |
| 172900 | S | BR | (SRFFGS00) \BI =FLAG SHORT (B)\; | 2EA | E136 50F |
| 173000 | SRCFCR30 | BR | (SRCFCR30) \ERROR HALT\; | 2EB | E12E 80F |
| 173100 | | | | | |
| 173200 | | \FIRST PASS (RFCFLG =0)\ | | | |
| 173300 | SRCFCR50 | MMP | (2#,A1,B1,OORA,QR) \SET RFCFLG =1\; | 2EC | 8211 74F |
| 173400 | S | WER | (R6,B0,Q,QR) \UPDATE RC FLAGS REG\; | 2ED | 2F60 0BB |
| 173500 | S | WOB | (3#,WSTS,B0,0,QR) \SET RLBS,REOF =1,1 (001,1)\; | 2EE | 4310 1CF |
| 173600 | S | BRSC | (SIDLE000,SRCSRQ) \SET RCSRQ, DONE\; | 2EF | E601 80F |
| 173700 | | | | | |
| 173800 | | | | | |
| 173900 | | | | | |
| 174000 | | \****** OFF STATE ******\ | | | |
| 174100 | | | | | |
| 174200 | SRFOFF00 | RER | (R5,B1,NOTD,FR) \READ RC STATUS REG\; | 2F0 | CF51 FDB |
| 174300 | S | MMP | (1#,A1,B1,DANDA,QR) \EXTRACT RILSFLG\; | 2F1 | 8111 94F |
| 174400 | S | TAMN | (ALUEZ,A0,B0,Q,QR) \TEST RILSFLG\; | 2F2 | 6C00 08F |
| 174500 | S | BR | (STFRC000) \DONE IF =0. GO TO TFRC ROUTINE\; | 2F3 | E114 F0F |
| 174600 | | | | | |
| 174700 | | | | | |
| 174800 | | \IDLE LINK STATE STATUS REPORT REQUIRED (RILSFLG =1)\ | | | |
| 174900 | S | MMP | (0#,A1,B1,DANDA,QR) \SET RILSFLG =0\; | 2F4 | 8E11 94F |
| 175000 | S | WER | (R5,B0,Q,QR) \UPDATE RC STATUS REG\; | 2F5 | 2F50 0BB |
| 175100 | S | MMP | (1#,A5,B3,D,FR) \SET RFCSTATE =RESET STATUS\; | 2F6 | 8133 1DF |
| 175200 | S | WOB | (4#,WSTS,B0,D,QR) \SET SF,ABRT/IDLE,OVRN,REOF =0,1,0,0\; | 2F7 | 4410 1CF |
| 175300 | | | | | |
| 175400 | | \(GENERATE FIRMWARE REVISION LEVEL TO RDB)\ | | | |
| 175500 | | \(CURRENT REVISION LEVEL IS 2.0)\ | | | |
| 175600 | S | WOB | (2#,WRDR,B0,D,QR) \FIRM REV TO RDB,R4\; | 2F8 | 42A0 1CF |

MICROPROGRAM SECTION

SEQUENCE: SSROS

```
                                                                              ADDRESS  IMAGE
                                                                              (HEX)    (HEX)
175700   S        WOB    (0#,WRDL,B0,D,QR)          \FIRM REV TO RDB_LH\;     2F9   4090 1CF
175800   S        BRSC   (SIDLE000,SRCSRQ)          \SET RCSRQ, DONE\;        2FA   E601 80F
175900
176000
176100            \****** RIGHT-JUSTIFY STATE ******\
176200
176300
176400   SRFRJ000 RER    (R7,B1,NOTD,FR)            \READ RLBSC TO F1\;       2FB   CF71 FDB
176500   S        MMP    (0,A9,B9,B,QR)             \LOAD RBR_LH INTO 2R\;    2FC   8099 OCF
176600   S        MMP    (0,A8,B8,B,SRQF)           \SHIFT RDB RIGHT 1 BIT\;  2FD   8088 OE7
176700   S        MMP    (7#,A9,B9,DANDQ,FR)        \SET MSB OF RBR =0.       2FE   8799 99F
176800                                               RESTORE RBR_LH\;
176900   S        TAMN   (ALUEZ,A1,B1,AP1,FR)       \+1 TO RLBSC AND TEST =8(0)\; 2FF 7C11 11F
177000   S        BR     (SRFRJ200)                 \B1 =8\;                  300   E130 80F
177100            \MORE R-J REQUIRED (RLBSC NOT=8)\
177200   S        MMP    (0,A9,B9,B,QR)             \LOAD RBR_LH INTO 2R\;    301   8099 OCF
177300   S        MMP    (0,A8,B8,B,SRQF)           \SHIFT RDB RIGHT 1 BIT\;  302   8088 OE7
177400   S        MMP    (7#,A9,B9,DANDQ,FR)        \SET MSB OF RBR =0.       303   8799 99F
177500                                               RESTORE RBR_LH\;
177600   S        TAMN   (ALUEZ,A1,B1,AP1,FR)       \+1 TO RLBSC AND TEST =8(0)\; 304 7C11 11F
177700   S        BR     (SRFRJ200)                 \B1 =8\;                  305   E130 80F
177800            \MORE R-J REQUIRED (RLBSC NOT=2)\
177900   S        MMP    (0,A9,B9,B,QR)             \LOAD RBR_LH INTO 2R\;    306   8099 OCF
178000   S        MMP    (0,A8,B8,B,SRQF)           \SHIFT RDB RIGHT 1 BIT\;  307   8088 OE7
178100   S        MMP    (7#,A9,B9,DANDQ,FR)        \SET MSB OF RBR =0.       308   8799 99F
178200                                               RESTORE RBR_LH\;
178300   S        TAMN   (ALUEZ,A1,B1,AP1,FR)       \+1 TO RLBSC AND TEST =8(0)\; 309 7C11 11F
178400   S        BR     (SRFRJ200)                 \B1 =8\;                  30A   E130 80F
178500
178600            \MORE R-J REQD NEXT PASS (RLBSC NOT=8)\
178700   S        WER    (R7,B1,B,QR)               \RESAVE RLBSC\;           30B   2F71 0CB
178800   S        BR     (SIDLE000)                 \DONE\;                   30C   E101 80F
178900
179000            \R-J COMPLETE (RLBSC =8)\
179100   SRFRJ200 MMP    (5#,A3,B3,D,FR)            \SET RFCSTATE =LAST DATA\; 30D  8533 1DF
179200   S        BR     (SIDLE000)                 \DONE\;                   30E   E101 80F
179300
179400
179500
179600            \****** LAST DATA STATE ******\
179700
179800
179900   SRFLDT00 RER    (R6,B1,NOTD,FR)            \READ RC FLAGS REG TO F1\; 30F  CF61 FDB
180000   S        MMP    (2#,A1,B1,DANDA,QR)        \EXTRACT RFCFLG\;         310   8211 94F
180100   S        TAMN   (ALUEZ,A0,B0,Q,QR)         \TEST RFCFLG\;            311   6C00 08F
180200   S        BR     (SRFLDT09)                 \B1 =0\;                  312   E131 50F
180300
180400            \SECOND PASS (RFCFLG =1)\
180500   S        WOB    (1#,WSTS,B0,D,QR)          \SET RLBS,REOF =0,1\;     313   4110 1CF
180600   S        BRSC   (SRFLDT80,SRCSRQ)          \SET RCSRQ, BR TO         314   E634 10F
180700                                               SHARED CODING BELOW\;
180800
180900            \FIRST PASS (RFCFLG =0)\
181000            \(CONVERT RLBSR)\
181100   SRFLDT09 RER    (R8,B0,NOTD,FR)            \READ RLBSR TO F0\;       315   CF80 FDB
181200   S        TAMN   (ALUEZ,A0,B0,A,QR)         \TEST RLBSR\;             316   6C00 10F
181300   S        BR     (SRFLDT18)                 \B1 =0000\;               317   E133 50F
181400   S        TAMN   (ALUEZ,A0,B0,AP1,FR)       \TEST RLBSR\;             318   7C00 11F
181500   S        BR     (SRFLDT17)                 \B1 =1111\;               319   E133 30F
181600   S        TAMN   (ALUEZ,A0,B0,AP1,FR)       \TEST RLBSR\;             31A   7C00 11F
181700   S        BR     (SRFLDT16)                 \B1 =1110\;               31B   E133 10F
181800   S        TAMN   (ALUEZ,A0,B0,AP1,FR)       \TEST RLBSR\;             31C   7C00 11F
181900   S        BR     (SRFLDT15)                 \B1 =1101\;               31D   E132 F0F
182000   S        TAMN   (ALUEZ,A0,B0,AP1,FR)       \TEST RLBSR\;             31E   7C00 11F
182100   S        BR     (SRFLDT14)                 \B1 =1100\;               31F   E132 D0F
182200   S        TAMN   (ALUEZ,A0,B0,AP1,FR)       \TEST RLBSR\;             320   7C00 11F
182300   S        BR     (SRFLDT13)                 \B1 =1011\;               321   E132 B0F
182400   S        TAMN   (ALUEZ,A0,B0,AP1,FR)       \TEST RLBSR\;             322   7C00 11F
182500   S        BR     (SRFLDT12)                 \B1 =1010\;               323   E132 90F
182600   S        TAMN   (ALUEZ,A0,B0,AP1,FR)       \TEST RLBSR\;             324   7C00 11F
182700   S        BR     (SRFLDT11)                 \B1 =1001\;               325   E132 70F
182800   SRFLDTXX BR     (SRFLDTXX)                 \ERROR HALT\;             326   E132 60F
182900
183000            \RLBSR =1001 (LBS =1)\
183100   SRFLDT11 MMP    (3#,A0,B0,D,FR)            \SET F0 =0011\;           327   8300 1DF
183200   S        BR     (SRFLDT30)                 \BR TO RLBSR CONVERTED\;  328   E133 70F
183300
183400            \RLBSR =1010 (LBS =2)\
183500   SRFLDT12 MMP    (7#,A0,B0,D,FR)            \SET F0 =0111\;           329   8700 1DF
183600   S        BR     (SRFLDT30)                 \BR TO RLBSR CONVERTED\;  32A   E133 70F
183700
183800            \RLBSR =1011 (LBS =3)\
183900   SRFLDT13 MMP    (B#,A0,B0,D,FR)            \SET F0 =1011\;           32B   8B00 1DF
184000   S        BR     (SRFLDT30)                 \BR TO RLBSR CONVERTED\;  32C   E133 70F
184100
184200            \RLBSR =1100 (LBS =4)\
184300   SRFLDT14 MMP    (F#,A0,B0,D,FR)            \SET F0 =1111\;           32D   8F00 1DF
184400   S        BR     (SRFLDT30)                 \BR TO RLBSR CONVERTED\;  32E   E133 70F
184500
184600            \RLBSR =1101 (LBS =5)\
184700   SRFLDT15 MMP    (1#,A0,B0,D,FR)            \SET F0 =0001\;           32F   8100 1DF
184800   S        BR     (SRFLDT30)                 \BR TO RLBSR CONVERTED\;  330   E133 70F
184900
185000            \RLBSR =1110 (LBS =6)\
185100   SRFLDT16 MMP    (5#,A0,B0,D,FR)            \SET F0 =0101\;           331   8500 1DF
185200   S        BR     (SRFLDT30)                 \BR TO RLBSR CONVERTED\;  332   E133 70F
185300
185400            \RLBSR =1111 (LBS =7)\
185500   SRFLDT17 MMP    (9#,A0,B0,D,FR)            \SET F0 =1001\;           333   8900 1DF
185600   S        BR     (SRFLDT30)                 \BR TO RLBSR CONVERTED\;  334   E133 70F
185700
185800            \RLBSR =0000 (LBS =8)\
```

MICROPROGRAM SECTION

SEQUENCE: SSROS

```
                                                                              ADDRESS  IMAGE
                                                                              (HEX)    (HEX)
185900  SRFLDT18  MMP   (0#,A0,B0,D,FR)        \SET FO =1101\;                 335     8000  1DF
186000  $         BR    (SRFLDT30)             \BR TO RLBSR CONVERTED\;        336     E133  70F
186100
186200
186300            \RLBSR CONVERTED\
186400  SRFLDT30  WOB   (0,WSTS,B0,B,QR)       \COPY FO TO RLBS,REOF\;         337     4010  0CF
186500  $         WOB   (0,WRDL,B9,B,QR)       \COPY RBR.LH TO RDB.LH\;        338     4099  0CF
186600  $         WOB   (0,WRDR,B8,B,QR)       \COPY RBR.RH TO RDB.RH\;        339     40A8  0CF
186700  $         SC    (SRCSRQ,A0,B0,Q,QR)    \SET RC SERVICE REQUEST\;       33A     0600  08F
186800  $         MMP   (1#,A1,B1,DANDA,QR)    \EXTRACT RPBFLG\;               33B     8111  94F
186900  $         TAMN  (ALUEZ,A0,B0,Q,QR)     \TEST RPBFL\;                   33C     6C00  08F
187000  $         BR    (SRFLDT80)             \B1 =0\;                        33D     E134  10F
187100
187200            \RPBFLG =1\
187300  $         MMP   (2#,A1,B1,DORA,QR)     \SET RFCFLG =1\;                33E     8211  74F
187400  $         WER   (R6,B0,Q,QR)           \UPDATE RC FLAGS REG\;          33F     2F60  08B
187500  $         BR    (SIDLE000)             \DONE\;                         340     E101  80F
187600
187700            \RPBFLG =0, OR END OF 2ND PASS\
187800  SRFLDT80  MMP   (0,A0,B9,A,FR)         \COPY RFCSR.LQ TO RBR.LH\;      341     8009  11F
187900  $         MMP   (0,AC,B8,A,FR)         \COPY RFCSR.LCQ TO RBR.RH\;     342     80C8  11F
188000  $         MMP   (4,A2,B2,AMD,FR)       \SET RBFC =RBFC-1\;             343     9422  35F
188100  $         MMP   (3#,A3,B3,D,FR)        \SET RFCSTATE =FIRST FCS\;      344     8333  1DF
188200  $         BR    (SIDLE000)             \DONE\;                         345     E101  80F
188300
188400
188500
188600
188700            \****** FIRST FCS STATE ******\
188800
188900  SRFFCS00  WOB   (0,WRDL,B8,B,QR)       \RFCSR.RCQ TO RDB.LH\;          346     4098  0CF
189000  SRFFCS01  WOB   (0,WRDR,BA,B,QR)       \RFCSR.RQ TO RDB.RH\;           347     40AA  0CF
189100  SRFFCS02  MMP   (2,A0,B3,D,FR)         \SET RFCSTATE =SECOND FCS\;     348     8203  1DF
189200  SRFFCS03  MMP   (4,A2,B2,AMD,FR)       \DECREMENT RBFC\;               349     9422  35F
189300  $         WOB   (0#,WSTS,B0,D,QR)      \SET SF,ABRT/IDLE,OVRN,REOF     34A     4010  1CF
189400                                           =0,0,0,0\;
189500  SRFFCS05  BRSC  (SIDLE000,SRCSRQ)      \SET RC SERVICE REQ, DONE\;     34B     E601  80F
189600
189700
189800
189900            \****** SECOND FCS STATE ******\
190000
190100  SRFSCS00  MMP   (1,A0,B3,D,FR)         \SET RFCSTATE =RESET STATUS\;   34C     8103  1DF
190200  $         WOB   (0,WRDL,B9,B,QR)       \COPY RBR.LH TO RDB.LH\;        34D     4099  0CF
190300  $         WOB   (0,WRDR,B8,B,QR)       \COPY RBR.RH TO RDB.RH\;        34E     40A8  0CF
190400  $         WOB   (0#,WSTS,B0,D,QR)      \SET SF,ABRT/IDLE,OVRN,REOF     34F     4010  1CF
190500                                           =0,0,0,0\;
190600  $         MMP   (3#,A2,B2,DANDA,FR)    \SET RBFC =0\;                  350     8322  95F
190700  SRFSCS09  BRSC  (SIDLE000,SRCSRQ)      \SET RC SERVICE REQ, DONE\;     351     E601  80F
190800
190900
191000
191100            \****** RESET STATUS STATE ******\
191200
191300  SRFRST00  RER   (R5,B0,NOTD,FR)        \READ RC STATUS REG\;           352     CF50  FDB
191400  SRFRST01  MMP   (8,A0,B0,DANDA,QR)     \EXTRACT ROSD\;                 353     8800  94F
191500  SRFRST02  TAMN  (ALUEZ,A0,B0,Q,QR)     \TEST ROSD\;                    354     6C00  08F
191600  SRFRST03  BR    (SRFRST08)             \BR IF ROSD =0\;                355     E135  A0F
191700
191800            \ROSD =1\
191900  SRFRST04  MMP   (7,A0,B0,DANDA,QR)     \RESET ROSD\;                   356     8700  94F
192000  SRFRST05  WER   (R5,B0,Q,QR)           \UPDATE RC STATUS REG\;         357     2F50  08B
192100  $         WOB   (2#,WSTS,B0,D,QR)      \SET SF,ABRT/IDLE,OVRN,REOF     358     4210  1CF
192200                                           =0,0,1,0\;
192300  SRFRST07  BRSC  (SIDLE000,SRCSRQ)      \SET RC SERVICE REQ, DONE\;     359     E601  80F
192400
192500            \ROSD =0\
192600  SRFRST08  RER   (R6,B1,NOTD,FR)        \READ RC FLAGS REG\;            35A     CF61  FDB
192700  $         MMP   (C#,A1,B1,DANDA,QR)    \SET RFCFLG,RPBFLG =0,0\;       35B     8C11  94F
192800  $         WER   (R6,B0,Q,QR)           \UPDATE RC FLAGS REG\;          35C     2F60  08B
192900  $         MMP   (0,A0,B3,ALUZ,FR)      \SET RFCSTATE =OFF\;            35D     8003  89F
193000  $         BR    (SIDLE000)             \DONE\;                         35E     E101  80F
193100
193200
193300            \****** ABORT STATE ******\
193400
193500  SRFABT00  WOB   (4#,WSTS,B0,D,QR)      \SET SF,ABRT/IDLE,OVRN,REOF     35F     4410  1CF
193600                                           =0,1,0,0\;
193700  SRFABT01  BRSC  (SIDLE000,SRCSRQ)      \SET RC SERVICE REQ, DONE\;     360     E601  80F
193800
193900
194000            \****** ABORT OVERRUN STATE ******\
194100
194200  SRFABO00  WOB   (6#,WSTS,B0,D,QR)      \SET SF,ABRT/IDLE,OVRN,REOF     361     4610  1CF
194300                                           =0,1,1,0\;
194400  $         BRSC  (SIDLE000,SRCSRQ)      \SET RC SERVICE REQ, DONE\;     362     E601  80F
194500
194600
194700            \****** FLAG OVERRUN STATE ******\
194800
194900  SRFFGO00  WOB   (2#,WSTS,B0,D,QR)      \SET SF,ABRT/IDLE,OVRN,REOF     363     4210  1CF
195000                                           =0,0,1,0\;
195100  $         BRSC  (SIDLE000,SRCSRQ)      \SET RC SERVICE REQ, DONE\;     364     E601  80F
195200
195300
195400
195500            \****** FLAG SHORT STATE ******\
195600
```

```
                              MICROPROGRAM SECTION
                                                                    ADDRESS   IMAGE
                               SEQLENCE:  SSROS                     (HEX)    (HEX)
195700   SRFFGS00   MOB   (BM,MSTS,BO,D,QR)   \SET SF,ABRT/IDLE,JVRN,REOF    365    4810 1CF
195800                                        =1,0,0,0\;
195900   S          BRSC  (SIDLE000,SRCSRQ)   \SET RC SERVICE REQ, DONE\;    366    E601 8DF
196000
196100
196200   SUNUSED    ZERO                      \SET UNUSED LOC'S TO ZERO\;
                              THERE ARE NO SEVERE MESSAGES IN THE ABOVE FILE.
                              THERE ARE NO WARNING MESSAGES IN THE ABOVE FILE.
```

What is claimed is:

1. A hardware/firmware communication control logic system for accommodting the concurrent bidirectional transfer of data messages between a communications processor and different terminal devices via a communication channel which comprises:

(a) memory means in electrical communication with said communications processor for storing said data messages and status and control information exchanged between said communications processor and said control logic system;

(b) firmware control means in electrical communication with said memory means and responsive to stored control information received from said communicatons processor for supplying microinstruction sequences to control the operation of said control logic system;

(c) microprocessor logic control means in electrical communication with said firmware control means and said memory means for modifying said microinstruction sequences and serializing and deserializing said data messages;

(d) interface logic means in electrical communication with said microprocessor logic control means and said firmware control means for supplying interrupt service requests and control information to said communications processor, said communications channel, and said control logic system; and (e) said firmware control means operating in response to said control information from said processor to adapt the functions of said control logic system to the requirements of said different terminal devices.

2. A hardware/firmware communication control logic system for accommodating the concurrent bidirectional transfer of data messages between a communications processor and a communication line, which comprises:

(a) first memory means in electrical communication with said communications processor for storing control and data information;

(b) second memory means in electrical communication with said communications processor for storing status and data information;

(c) processor decoder means responsive to said communications processor for issuing commands to control the writing of control and data information into said first memory means, and the reading of data and status information from said second memory means;

(d) interrupt control logic means in electrical communication with said comunications processor and said processor decoder means for issuing interrupts to request data, control and status information from said communications processor;

(e) logic resynchronization means in electrical communication with said processor decoder means for initializing said control logic system to receive data information from said communication line;

(f) microprocessor means in electrical communication with said first and said second memory for serializing data from said communications processor and deserializing data from said communication line;

(g) firmware control store memory means in electrical communication with said microprocessor means, and said first and said second memory means for controlling the operation of said control logic system;

(h) address counter means responsive to said communications processor for addressing said firmware control store memory means to provide a sequence of microinstructions;

(i) firmware instruction decoder means in electrical communication with said microprocessor means and said firmware control store memory means for controlling the writing of data into said second memory means, the loading of data into said mircoprocessor means, and the updating of said address counter means;

(j) microprogram subcommand generator means responsive to said firmware control store memory means and said firmware instruction decoder means for controlling the operation of said interrupt control logic means and said logic resynchronization means;

(k) multiplexer means responsive to said firmware control store memory means and in electrical communication with said microprocessor means, said interrupt control logic means and said logic resynchronization means for controlling the modification of microinstructions in said firmware instruction decoder means;

(1) communication line interface logic means in electrical communication with said microprocessor means, said microprogram subcommand generator means and said communication line for signalling the occurrence of a transmit data bit or a receive data bit to said multiplexer means;

(m) line control logic means responsive to said processor decoder means and said communications processor for supplying control signals to said communication line, said resynchronization means, and said interrupt control logic means.

3. A hardware/firmware comunication control logic system for accommodating the concurrent bidirectional transfer of message data between a communications processor and a communication channel which comprises:

(a) memory means in electrical communication with said communications processor for storing message data to be transmitted to said channel and status and control information exchanged between said communications processor and said control logic system;

(b) firmware control means responsive to said communications processor and in electrical communication with said memory means for supplying microinstruction sequences to control the operation of said control logic system;

(c) microprocessor logic control means in electrical communication with said firmware control means and said memory means for modifying said microinstruction sequences and serializing and deserializing said data messages;

(d) underrun means for providing a no data indication;

(e) means responsive to said firmware control means for actuating said underrun means when said memory means is emptied of message data during a transmit operation; and (f) means responsive to said underrun means for signalling said communications processor of an underrun condition prior to the transfer of additional message data from said processor.

4. A hardware/firmware communication control logic system for accommodating the concurrent bidirectional transfer of message data between a communications processor and a communication channel which comprises:

(a) memory means in electrical communication with said communications processor for storing said message data and status and control information exchanged between said communications processor and said control logic system;

(b) firmware control means responsive to said communications processor and in electrical communication with said memory means for supplying microinstruction sequences to control the operation of said control logic system;

(c) microprocessor logic control means in electrical communication with said firmware control means and said memory means for modifying said microinstruction sequences and serializing and deserializing said data messages;

(d) receive means controlled by said firmware control means for receiving message data from said communication channel and transferring said data to said memory means and then to said communications processor;

(e) overrun means for providing a data present indication;

(f) means responsive to said firmware control means for actuating said overrun means when said memory contains message data which has not been transferred to said communications processor; and (g) further means responsive to said firmware control means for signalling said communications processor of an overrun condition if said overrun means is actuated when said receive means is operated to transfer data to said memory means.

* * * * *

UNITED STATES PATENT AND TRADEMARK OFFICE
CERTIFICATE OF CORRECTION

PATENT NO. : 4,254,462

DATED : March 3, 1981

INVENTOR(S) : James C. Raymond et al.

It is certified that error appears in the above-identified patent and that said Letters Patent are hereby corrected as shown below:

In Column 64, Claim 2, Line 13, after the word "memory" add the word
-- means --.

Signed and Sealed this

Second Day of June 1981

[SEAL]

Attest:

RENE D. TEGTMEYER

Attesting Officer

Acting Commissioner of Patents and Trademarks